(12) United States Patent
Lukas et al.

(10) Patent No.: US 12,137,074 B2
(45) Date of Patent: *Nov. 5, 2024

(54) METHOD AND SYSTEM FOR ORGANIZING AND INTERACTING WITH MESSAGES ON DEVICES

(71) Applicants: DEBORAH A. LAMBERT AS TRUSTEE OF THE DEBORAH A. LAMBERT IRREVOCABLE TRUST FOR MARK LAMBERT, Tarpon Springs, FL (US); Whitehead Investments, LLC, Tarpon Sprins, FL (US)

(72) Inventors: Erik N. Lukas, Beverly Shores, IN (US); Gregory O. Peet, Dewey, AZ (US)

(73) Assignees: Deborah A. Lambert, Tarpon Springs, FL (US), as Trustee of the Deborah A. Lambert Irrevocable Trust for Mark Lambert; Whitehead Investments, LLC, Tarpon Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,493

(22) Filed: Feb. 13, 2023

(65) Prior Publication Data

US 2023/0198932 A1    Jun. 22, 2023

Related U.S. Application Data

(63) Continuation of application No. 17/521,631, filed on Nov. 8, 2021, now Pat. No. 11,606,327, which is a
(Continued)

(51) Int. Cl.
*H04L 51/42* (2022.01)
*G06F 3/0488* (2022.01)
*H04M 1/72436* (2021.01)

(52) U.S. Cl.
CPC ............ *H04L 51/42* (2022.05); *G06F 3/0488* (2013.01); *H04M 1/72436* (2021.01); *H04M 2250/22* (2013.01)

(58) Field of Classification Search
None
See application file for complete search history.

(56) References Cited

U.S. PATENT DOCUMENTS 7,802,184 B1 *  9/2010  Battilana ............... G06F 40/274
                                                      715/256
8,689,116 B2    4/2014  Guzman et al.
(Continued)

FOREIGN PATENT DOCUMENTS

| AU | 2013259637 A1 | 12/2014 |
| EP | 2584440 A1 | 4/2013 |
| EP | 2787426 A1 | 10/2014 |

OTHER PUBLICATIONS

Ferreira et al., "ARTHE: Experiencing Projected Augmented Reality with THings of the Everyday", Feb. 13, 2014, IEEE, 2013 IEEE 10th International Conference on Ubiquitous Intelligence and Computing and 2013 IEEE 10th International Conference on Autonomic and Trusted Computing (pp. 495-501) (Year: 2014).*

(Continued)

*Primary Examiner* — Davoud A Zand
(74) *Attorney, Agent, or Firm* — Perkins Coie LLP; Alberto Araiza

(57) ABSTRACT

A method performed by a mobile device includes causing display of graphical tiles on a display of the mobile device and detecting a gesture while displaying the graphical tiles. The gesture includes an indication to move a particular graphical tile among the graphical tiles. In response to the gesture, the mobile device can automatically move another graphical tile to accommodate the new location of the particular graphical tile and cause display of the graphical
(Continued)

tiles arranged in a new order that includes the particular graphical tile in the new location.

20 Claims, 64 Drawing Sheets

Related U.S. Application Data continuation of application No. 16/840,080, filed on Apr. 3, 2020, now Pat. No. 11,171,907, which is a continuation of application No. 15/250,715, filed on Aug. 29, 2016, now Pat. No. 10,623,361.

(60) Provisional application No. 62/210,922, filed on Aug. 27, 2015.

(56) References Cited

U.S. PATENT DOCUMENTS

| | | | |
|---|---|---|---|
| 8,949,734 B2 | 2/2015 | Stallings et al. | |
| 9,753,635 B2 | 9/2017 | Heo et al. | |
| 2006/0026535 A1* | 2/2006 | Hotelling | G06F 3/0488 715/863 |
| 2008/0055269 A1 | 3/2008 | Lemay et al. | |
| 2008/0062141 A1 | 3/2008 | Chandhri | |
| 2008/0122796 A1 | 5/2008 | Jobs et al. | |
| 2008/0165136 A1 | 7/2008 | Christie et al. | |
| 2008/0168349 A1 | 7/2008 | Lamiraux et al. | |
| 2008/0174570 A1 | 7/2008 | Jobs et al. | |
| 2009/0005011 A1 | 1/2009 | Christie et al. | |
| 2009/0177981 A1 | 7/2009 | Christie et al. | |
| 2010/0137031 A1 | 6/2010 | Griffin | |
| 2010/0185989 A1 | 7/2010 | Shiplacoff et al. | |
| 2010/0211535 A1 | 8/2010 | Rosenberger | |
| 2010/0309417 A1 | 12/2010 | Kosugi et al. | |
| 2011/0167380 A1 | 7/2011 | Stallings et al. | |
| 2011/0239153 A1* | 9/2011 | Carter | G06F 3/04812 715/856 |
| 2012/0311508 A1 | 12/2012 | Fleizach | |
| 2013/0057588 A1 | 3/2013 | Leonard et al. | |
| 2013/0227483 A1 | 8/2013 | Thorsander et al. | |
| 2014/0004834 A1 | 1/2014 | Mian et al. | |
| 2014/0143738 A1 | 5/2014 | Underwood, IV et al. | |
| 2014/0173457 A1 | 6/2014 | Wang et al. | |
| 2014/0282151 A1 | 9/2014 | Harvey | |
| 2014/0282214 A1 | 9/2014 | Shirzadi et al. | |
| 2014/0304651 A1 | 10/2014 | Johansson et al. | |
| 2014/0313142 A1* | 10/2014 | Yairi | H04M 1/724 345/173 |
| 2014/0373057 A1 | 12/2014 | Hoffert et al. | |
| 2015/0145887 A1 | 5/2015 | Forutanpour et al. | |
| 2015/0220238 A1 | 8/2015 | Heo et al. | |
| 2015/0286285 A1* | 10/2015 | Pantelopoulos | G06F 3/048 345/156 |
| 2015/0350143 A1 | 12/2015 | Yang et al. | |
| 2015/0363481 A1 | 12/2015 | Haynes | |
| 2016/0357724 A1 | 12/2016 | Stein et al. | |
| 2017/0063767 A1 | 3/2017 | Lukas et al. | |

OTHER PUBLICATIONS

International Search Report and Written Opinion PCT/US2016/049322 dated Nov. 24, 2016, pp. 1-10.

Ferreira , et al., "ARTHE: Experiencing Projected Augmented Reality with THings of the Everyday", 2013 IEEE 10th International Conference on Ubiquitous Intelligence and Computing and 2013 IEEE 10th International Conference on Autonomic and Trusted Computing, pp. 495-501.

Saddik, Abdulmotaleb El, et al., "Remote rendering based Second Life mobile client system to control smart home appliances", A. El Saddik, "Remote rendering based Second Life mobile client system to control smart home appliances," 2011 IEEE International Conference on Virtual Environments, Human-Computer Interfaces and Measurement Systems Proceedings, 2011, pp. 1-4;, Sep. 1, 2011.

* cited by examiner

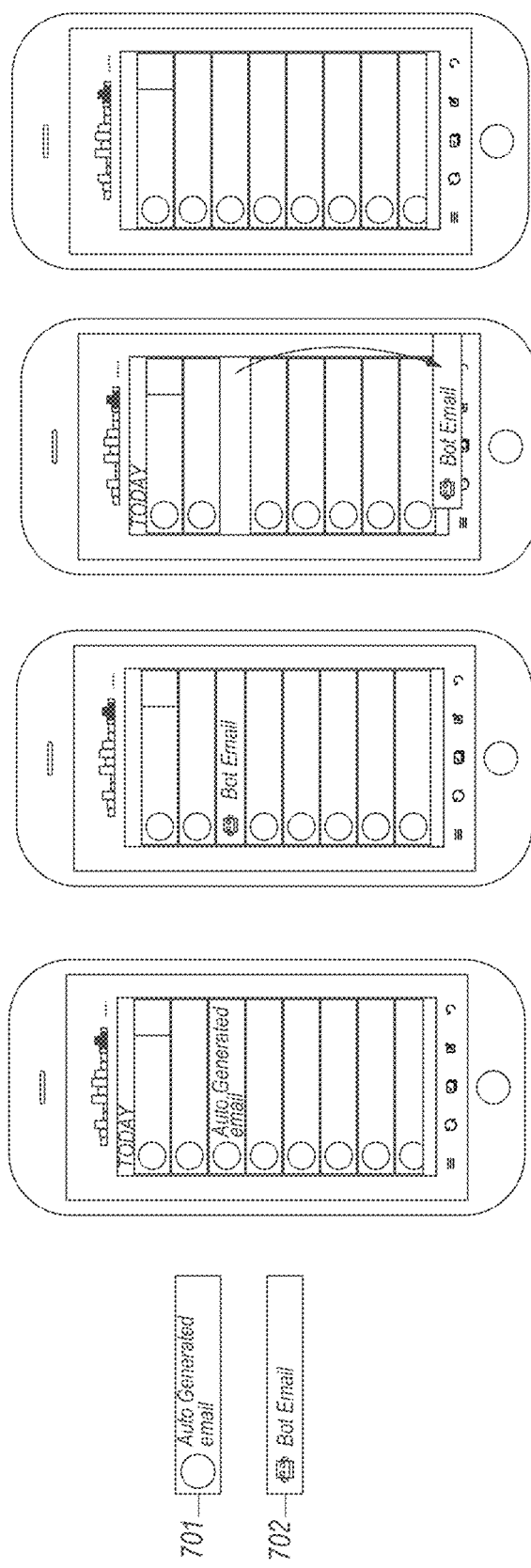

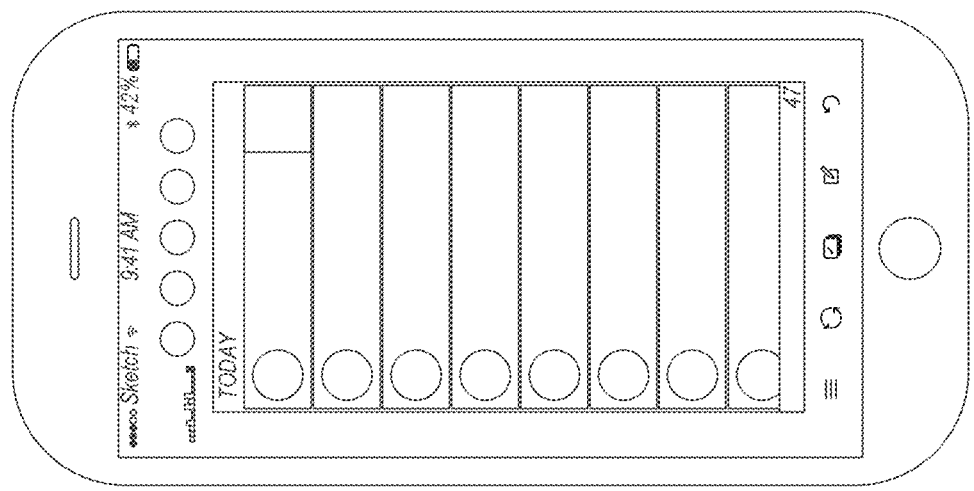
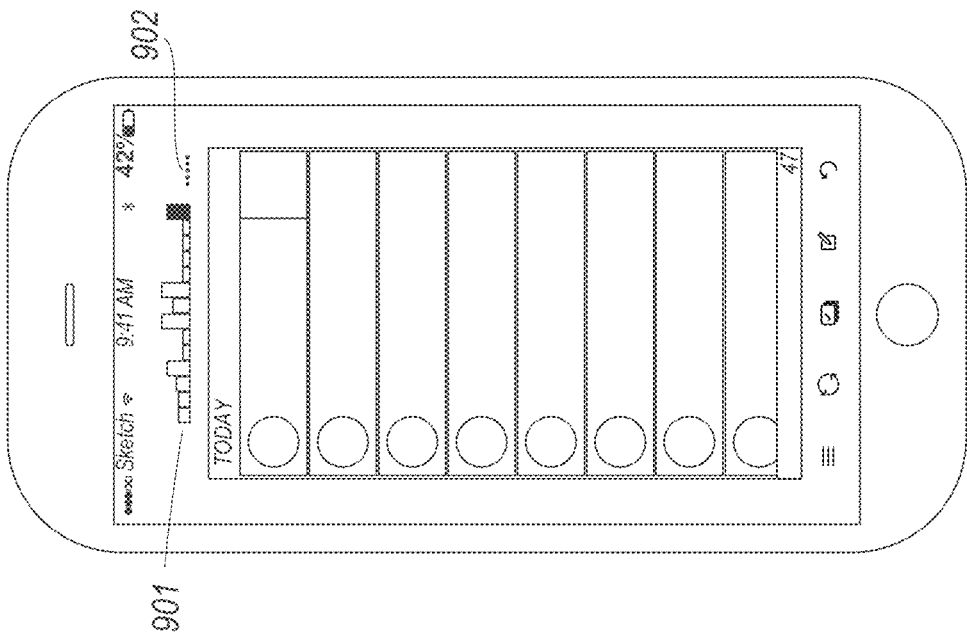
Fig. 9A

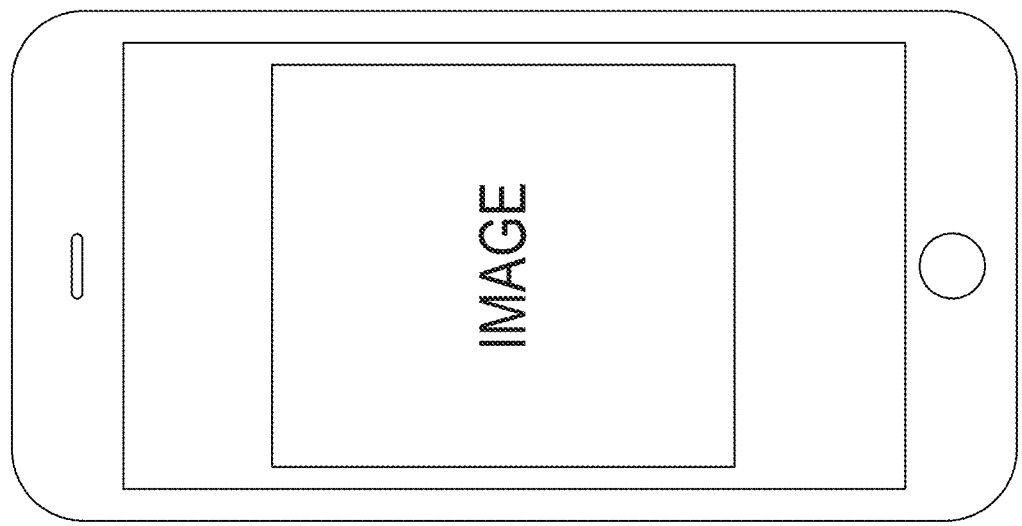
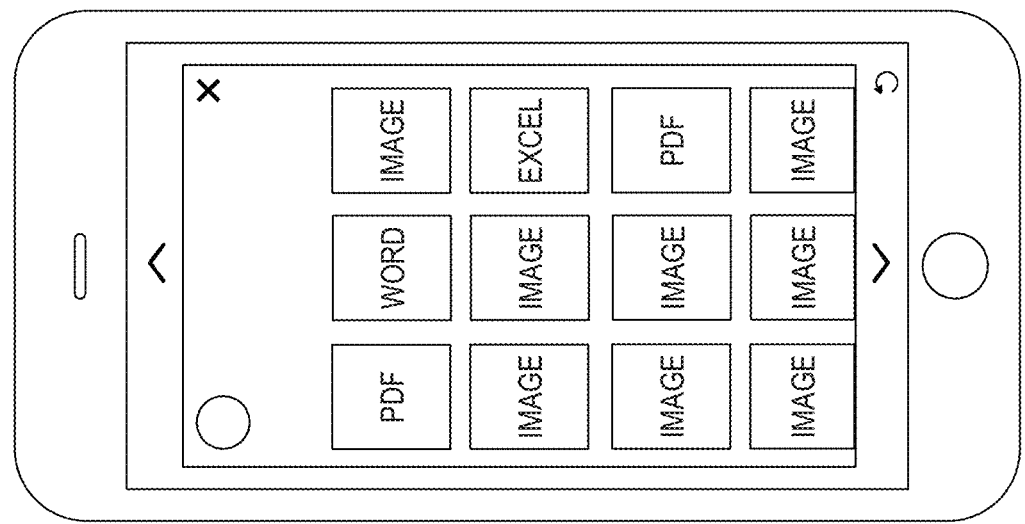
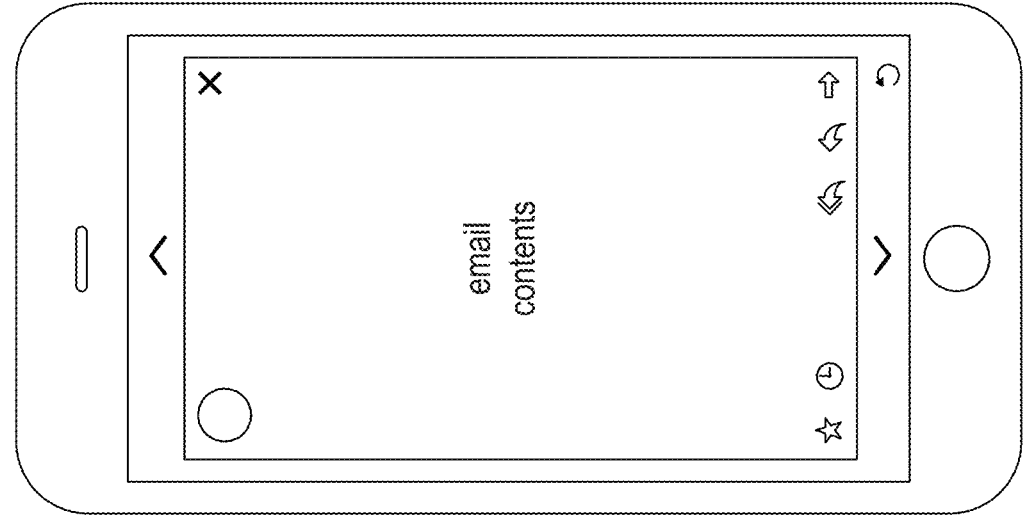
Fig. 17B

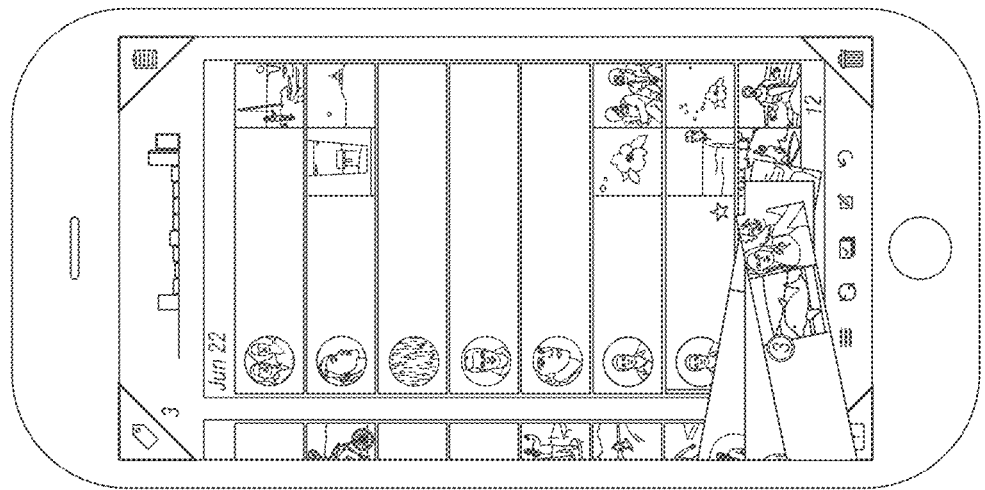
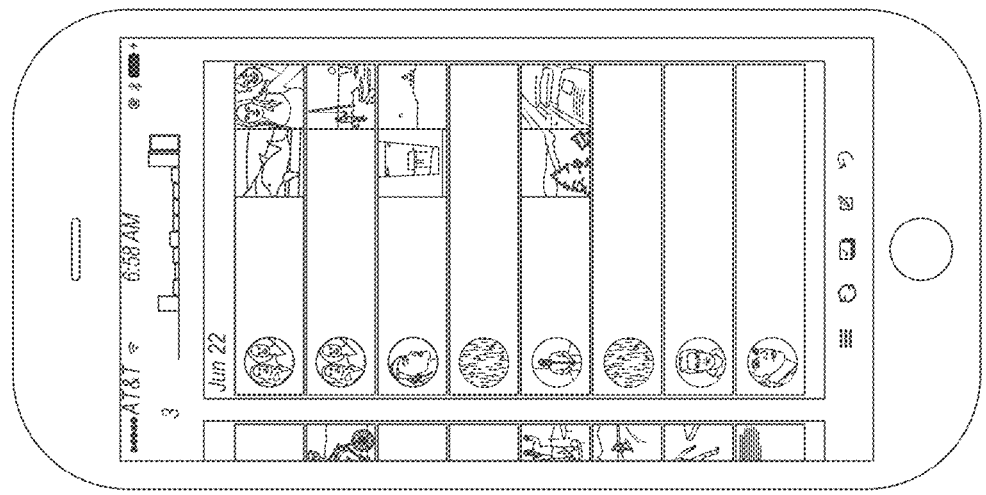
Fig. 19

Fig. 21

METHOD AND SYSTEM FOR ORGANIZING AND INTERACTING WITH MESSAGES ON DEVICES

CROSS-REFERENCE TO RELATED APPLICATIONS

This application is a continuation of U.S. patent application Ser. No. 17/521,631, filed Nov. 8, 2021, which is a continuation application of U.S. patent application Ser. No. 16/840,080, filed Apr. 3, 2020, now U.S. Pat. No. 11,171,907, which is a continuation application of U.S. patent application Ser. No. 15/250,715, filed Aug. 29, 2016, now U.S. Pat. No. 10,623,361, which claims priority to U.S. Provisional Patent Application No. 62/210,922, filed Aug. 27, 2015, which are incorporated herein by reference in their entirety.

BACKGROUND

Various modes of Internet communication are experiencing fast-paced growth and innovation. By contrast, the user's interaction with email has remained all confined to browsing chronologically sorted lists. The user experience in interacting with such email lists is not optimal, especially on mobile devices which typically have a form factor that is different from that of a desktop or a laptop.

FIELD OF THE INVENTION

The technique relates to user device interfaces and more specifically to horizontal timeline layouts for an email application, gesture based organization and triaging of emails in the email application, and a quantified, direct manipulation design for emails in the email application.

SUMMARY OF THE INVENTION

The technology disclosed herein includes methods and systems for managing email on a user device. In some embodiments, a plurality of email tiles may be included in a vertical list. A plurality of vertical lists may be available to a user by gesture manipulation. The plurality of vertical lists may be organized in a horizontal timeline interface with each column representing a time period, and the emails may be managed individually or in bulk by gesture manipulation.

Embodiments of the present invention include systems and methods managing email on a user device. A first plurality of email tiles in a first vertical list may be displayed on a screen of the user device. The first plurality of email tiles in the first vertical list may be associated with a first time period. A motion-based gesture may be detected. The motion-based gesture may include at least one of a tap on a surface of the screen, a swipe across a surface of the screen, or an acceleration of the user device. In an embodiment, in response to detecting a first motion-based gesture, a second plurality of email tiles in a second vertical list associated with a second time period may be displayed. In an embodiment, in response to detecting a second motion-based gesture, one or more email management function may be performed.

BRIEF DESCRIPTION OF THE DRAWINGS

These and other objects, features, and characteristics may become more apparent to those skilled in the art from a study of the following Detailed Description in conjunction with the appended claims and drawings, all of which form a part of this specification. While the accompanying drawings include illustrations of various embodiments, the drawings are not intended to limit the claimed subject matter.

FIG. 7 shows how automatically generated emails are represented visually different from the emails received from human senders, according to one embodiment;

FIGS. 9A-9B show how the system timeline and the user's email quantity by time period is displayed in a histogram, according to one embodiment;

FIGS. 17A-17B show a view of emails from a sender feature and a view of attachments from a sender feature, respectively, according to one embodiment;

FIG. 19 is an illustration of sorting a plurality of email messages into one or more triage corners, according to one embodiment;

FIG. 21 is an illustration of displaying emails with different visual representations for emails received from senders determined by heuristics to have been sent by human senders and emails determined to have been automatically generated, according to one embodiment;

DETAILED DESCRIPTION OF SOME EMBODIMENTS

Discussed below are examples of a method, system and apparatus for organizing and interacting with email on a user device. In the following description, for the purposes of explanation, numerous specific details are set forth in order to provide a thorough understanding of the embodiments of the invention. One skilled in the art may recognize that the embodiments of the invention may be practiced without these specific details or with an equivalent arrangement. In other instances, well-known structures and devices are shown in block diagram form in order to avoid unnecessarily obscuring the embodiments of the invention.

Figure 1:
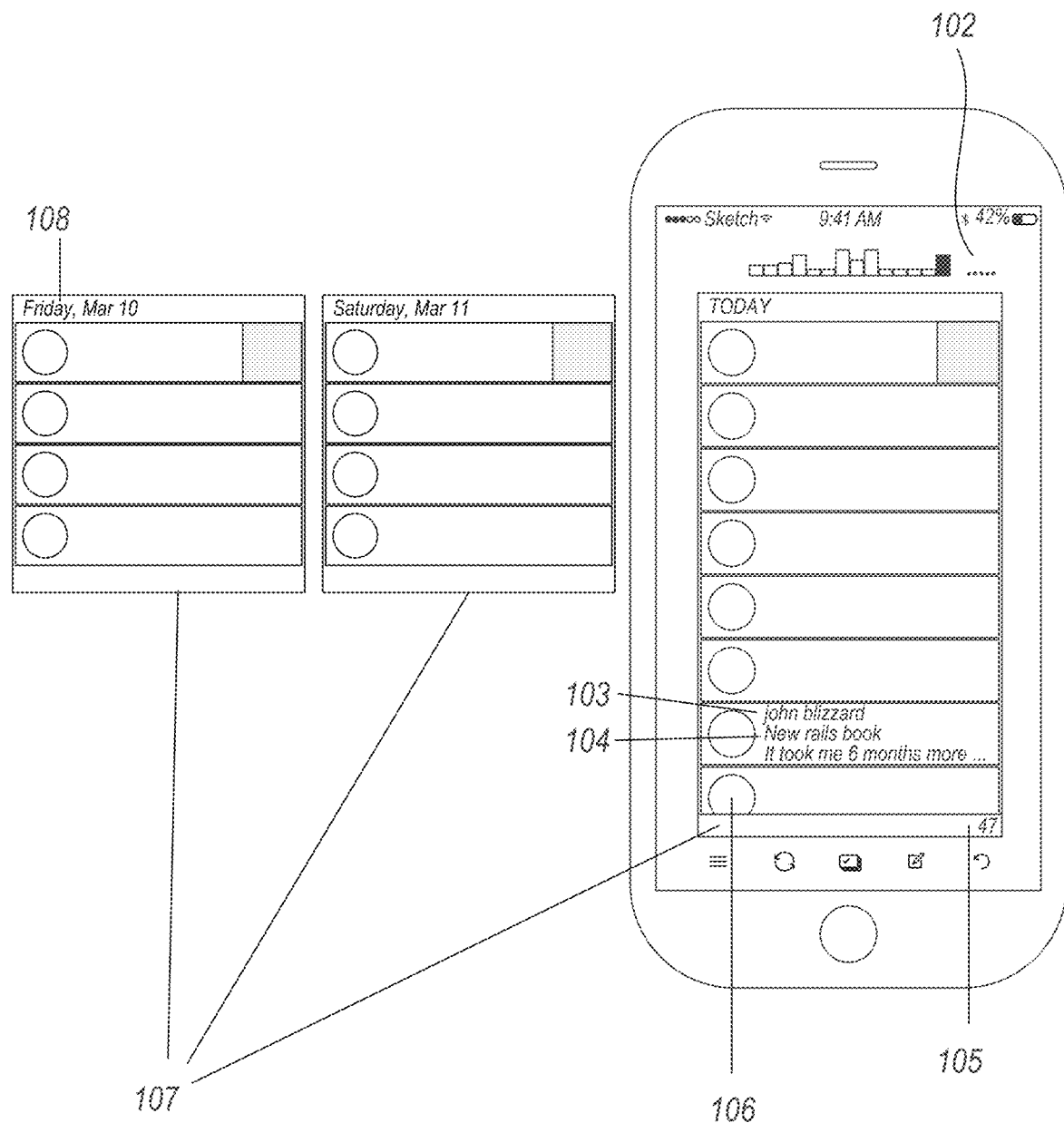
FIG. 1 shows the horizontal timeline interface, according to one embodiment.
Figure 2A:
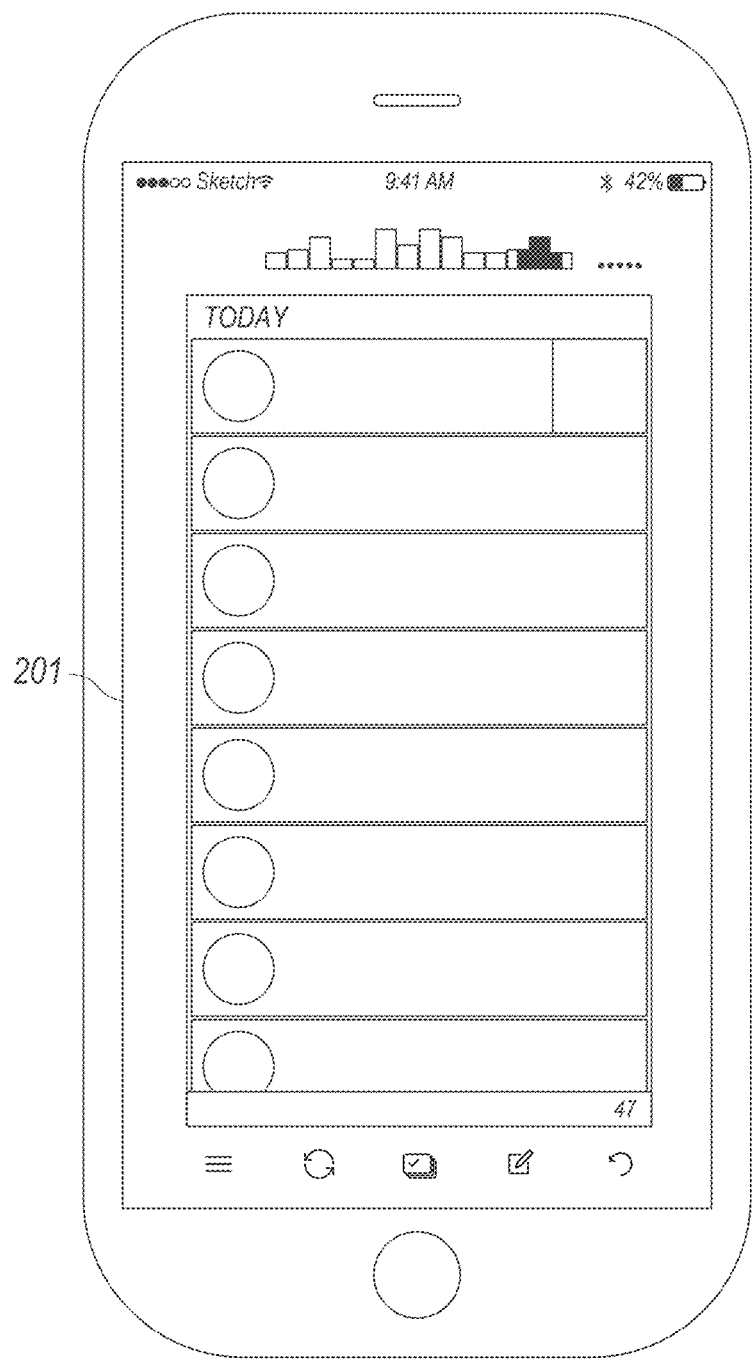
FIGS. 2A-2D show the ability to rearrange the index and visual order of emails within a single time period so a user may prioritize the emails according to importance for the user, according to one embodiment.
Figure 2B:
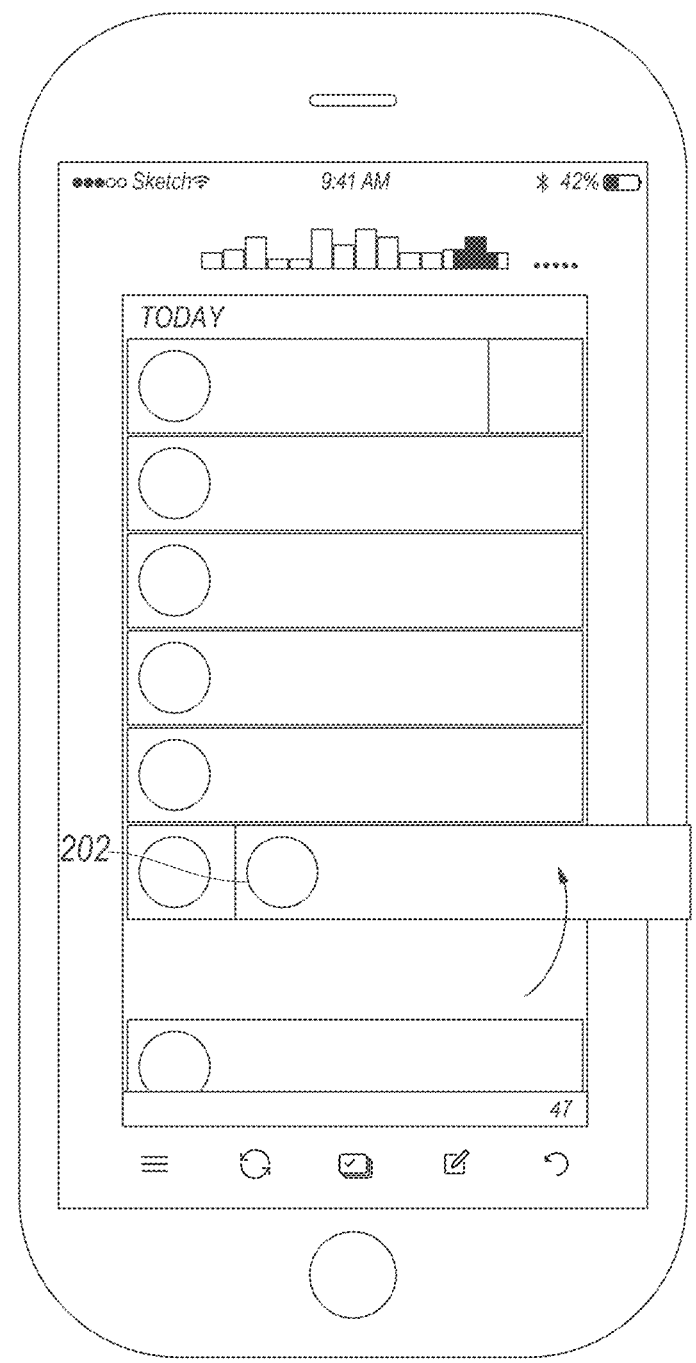
Figure 2C:
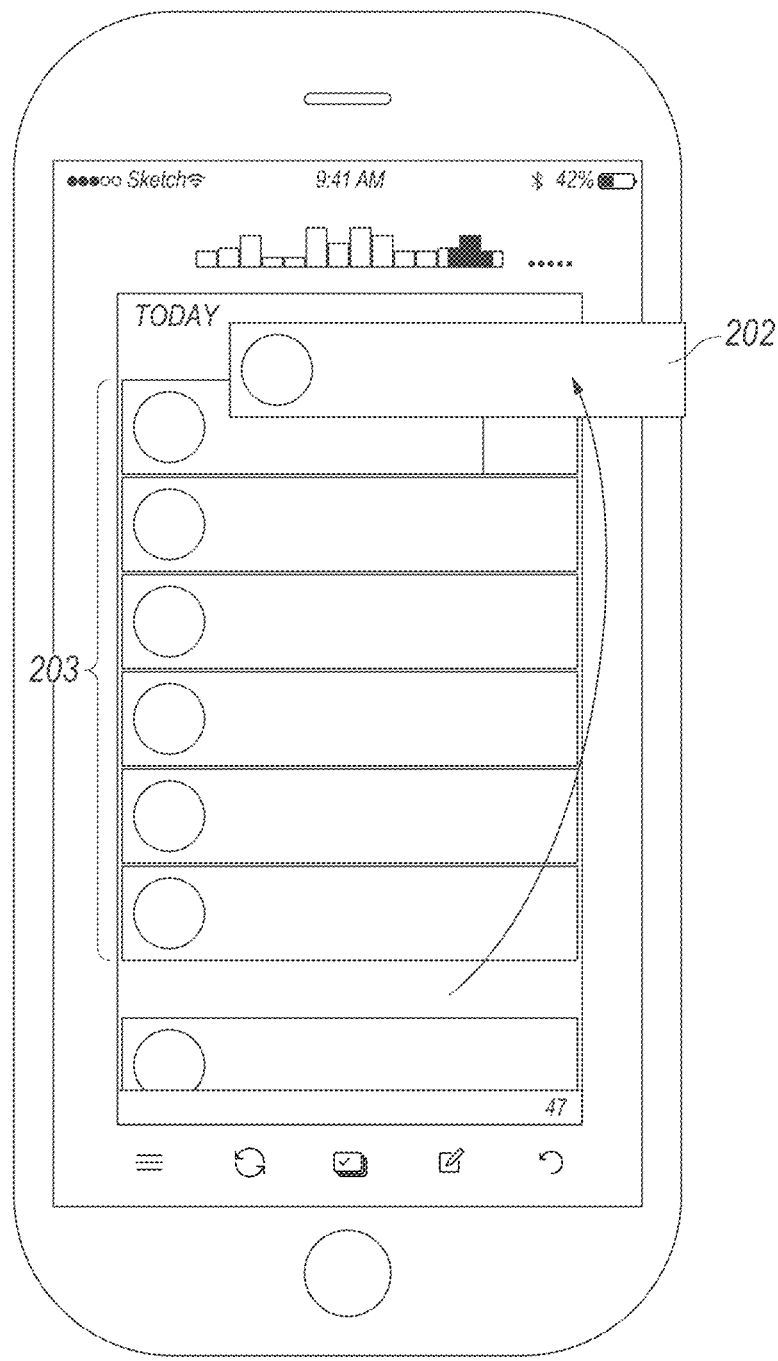
Figure 2D:
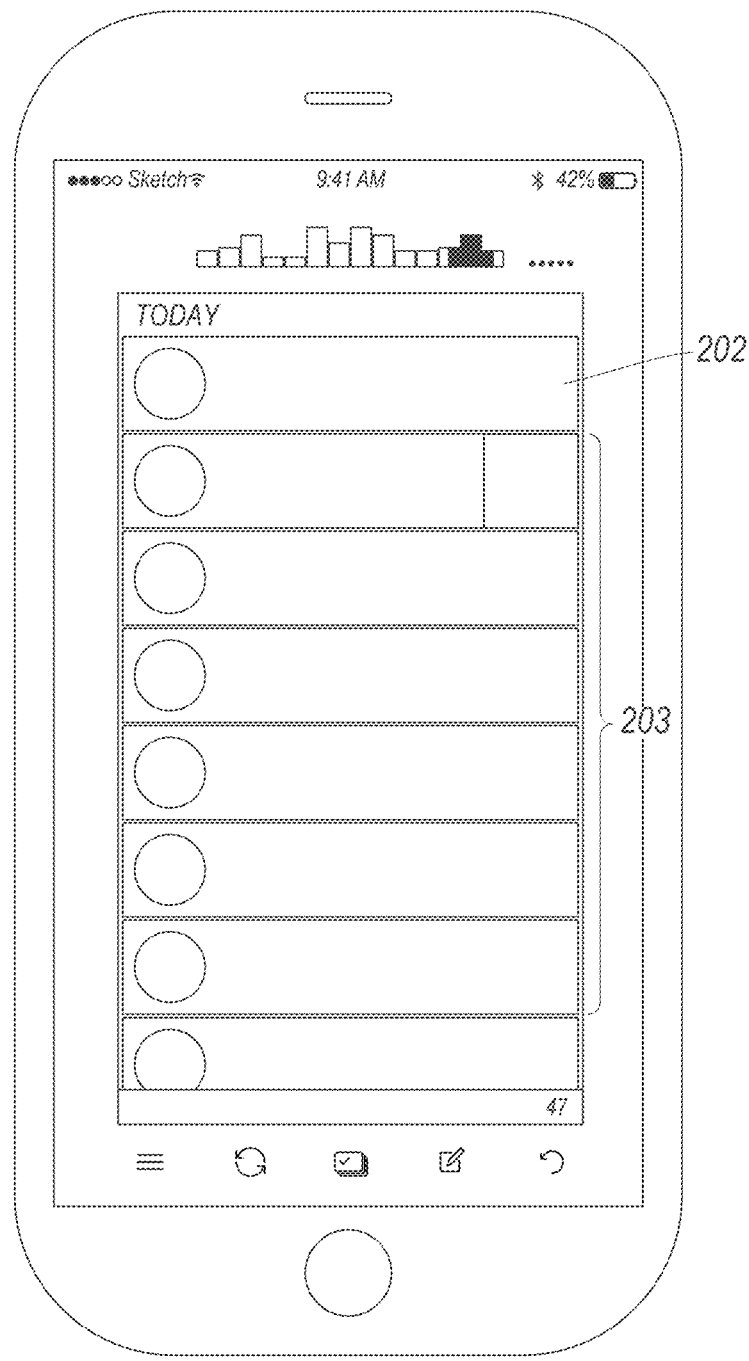
Figure 3A:
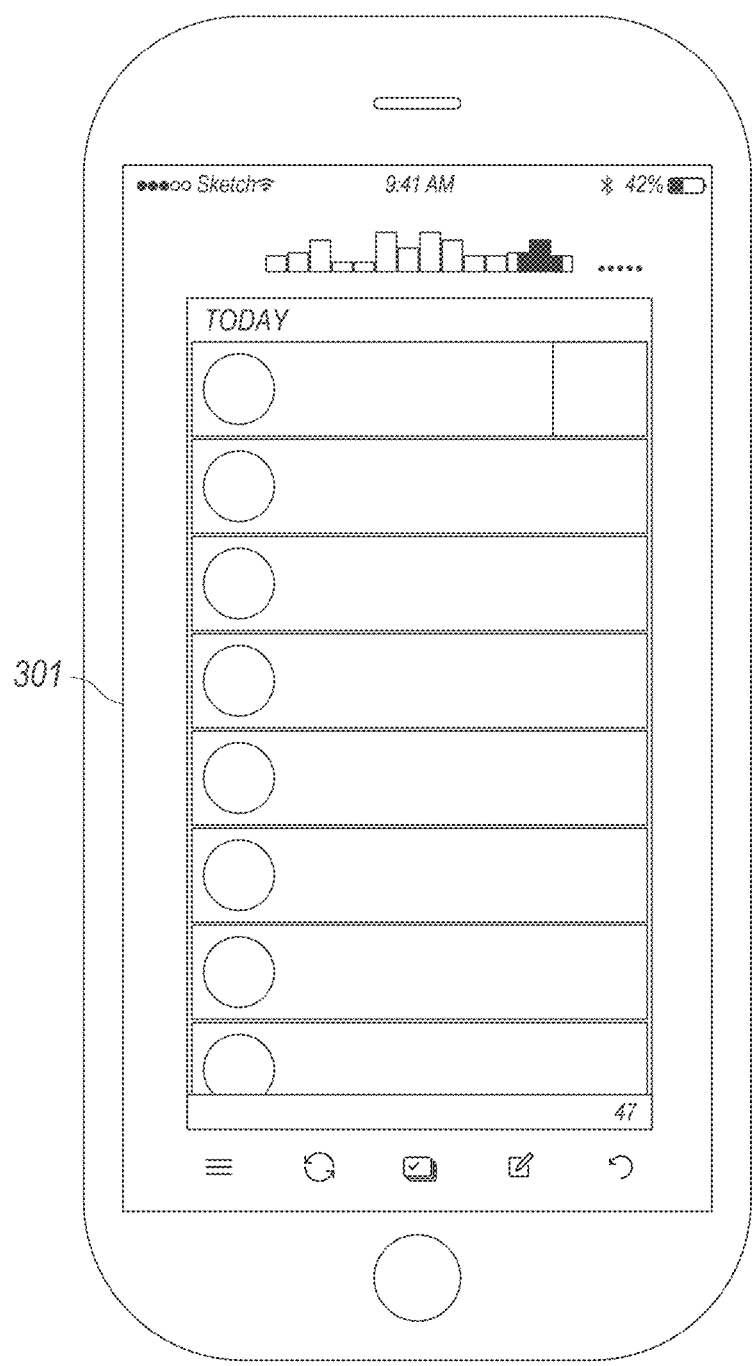
FIGS. 3A-3E show the ability to pick up email tiles individually for sorting into one of the interface's one or more triage corners, according to one embodiment.
Figure 3B:
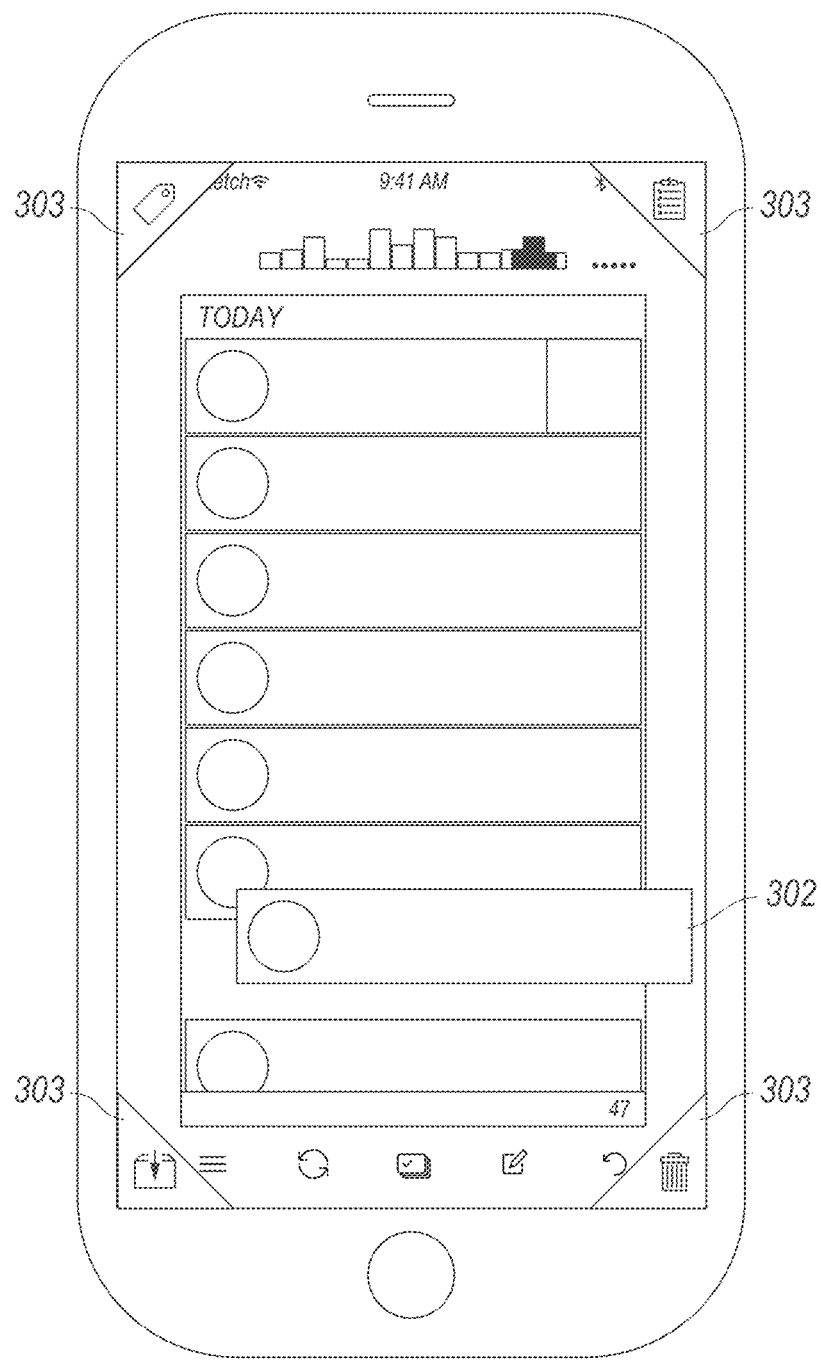
Figure 3C:
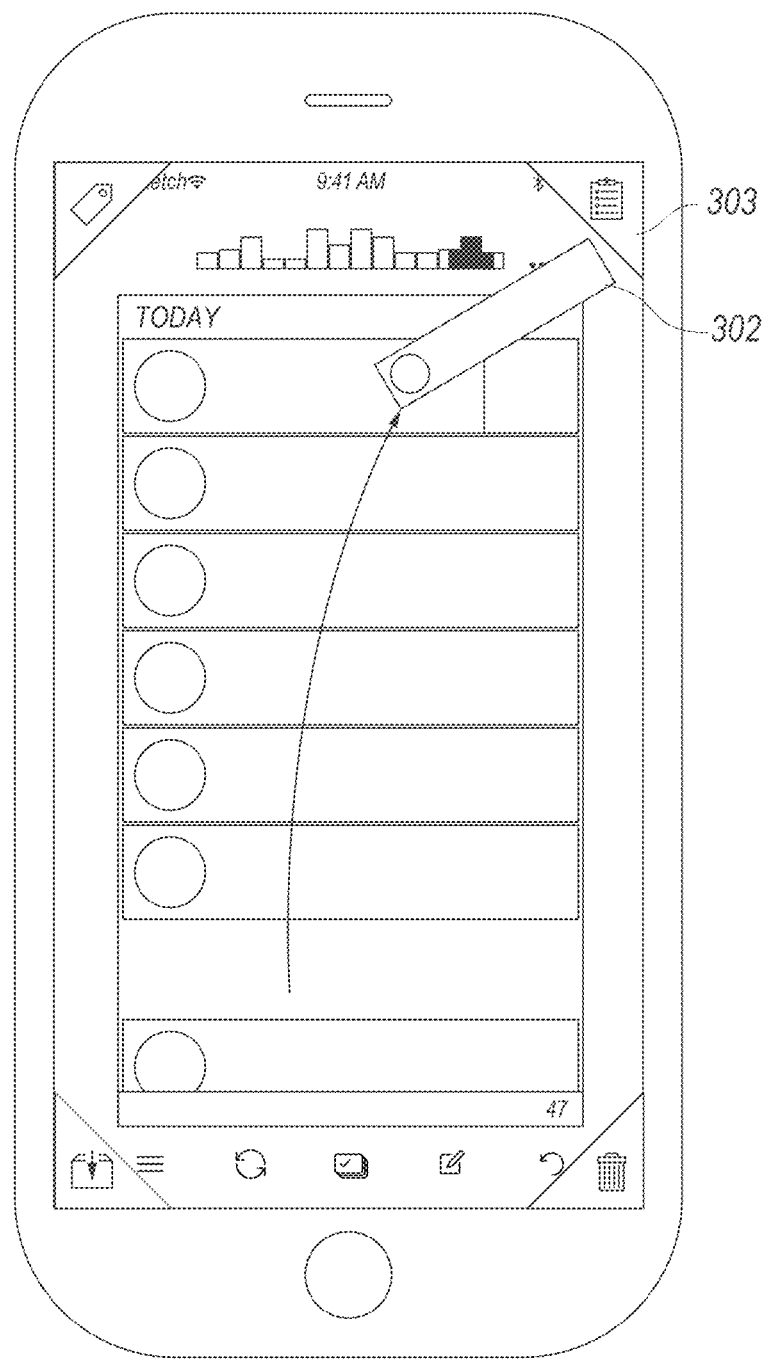
Figure 3D:
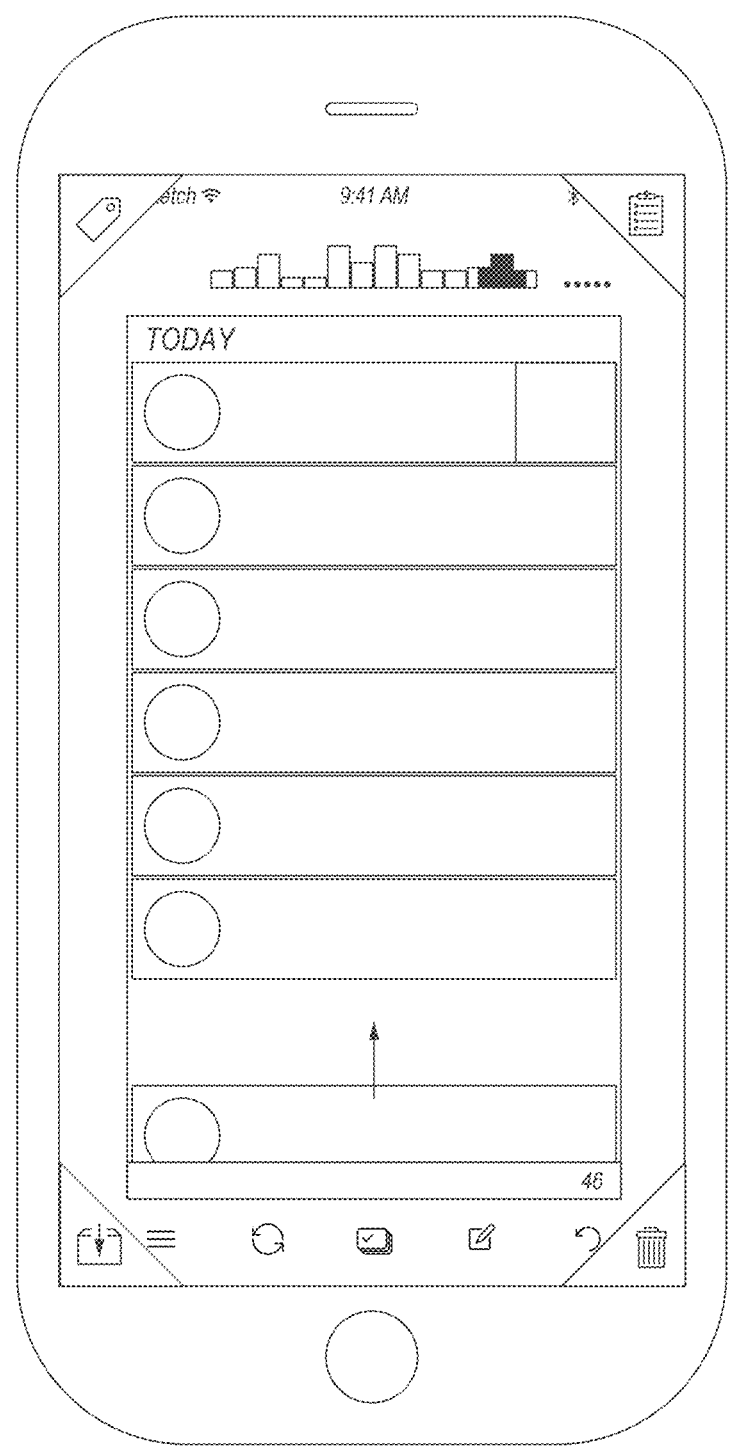
Figure 3E:
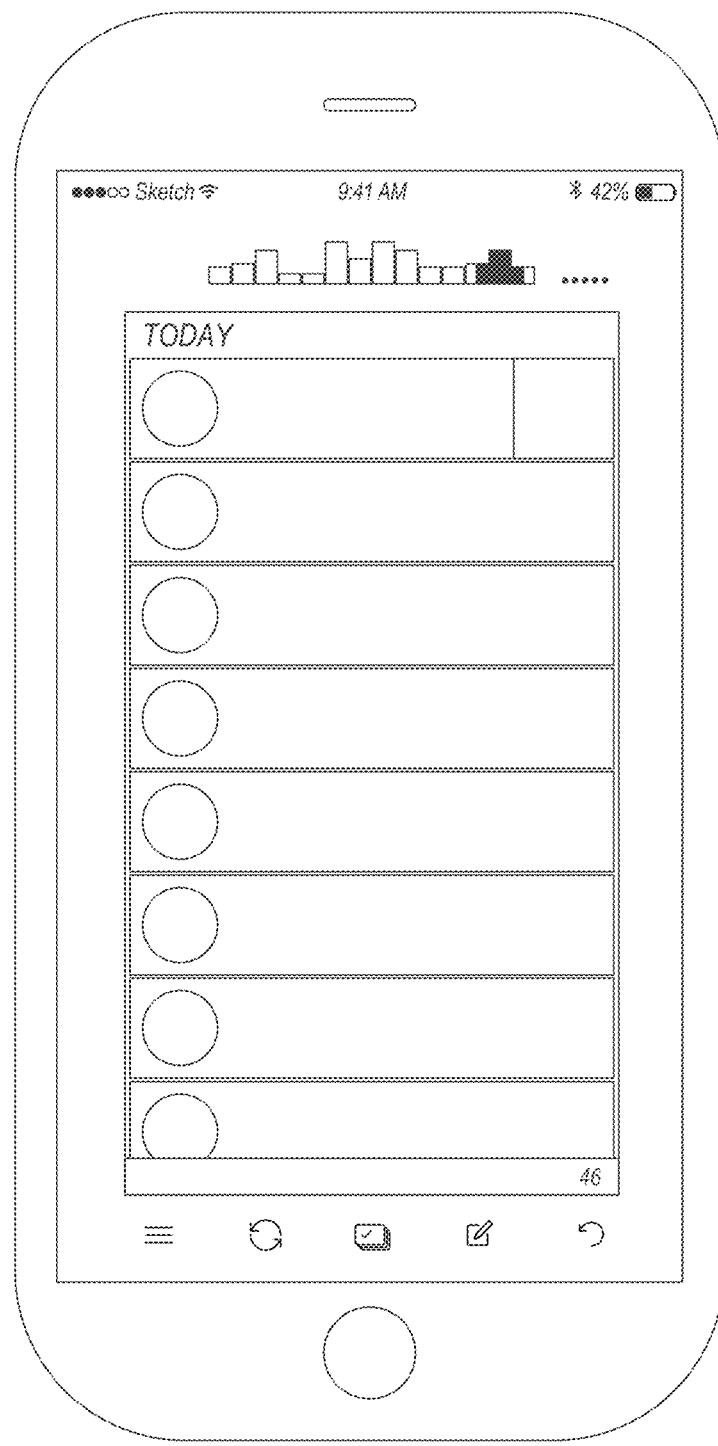
Figure 4A:
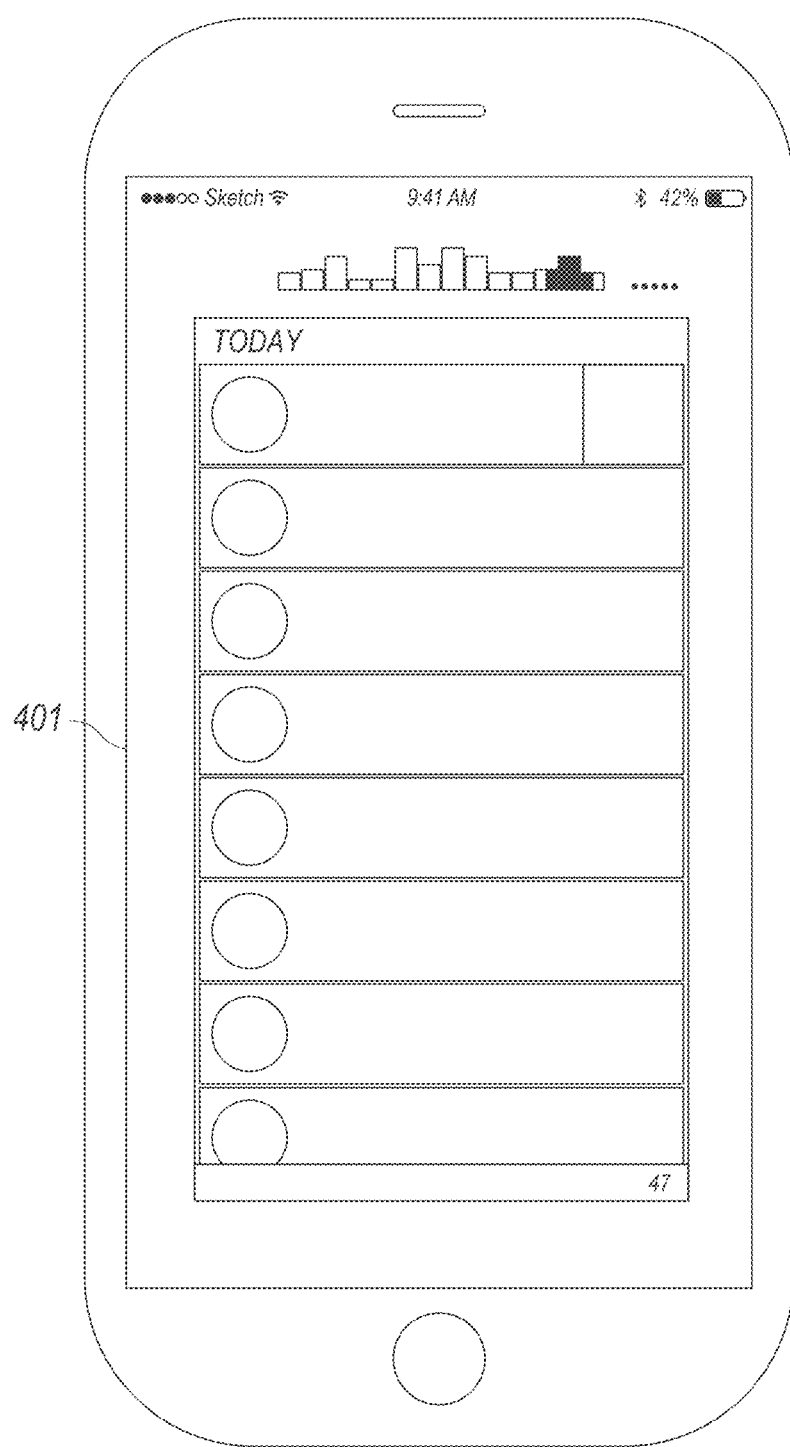
FIGS. 4A-4F show the ability to select and pick up multiple email tiles at once for sorting into one of the interface's one or more triage corners, according to one embodiment.
Figure 4B:
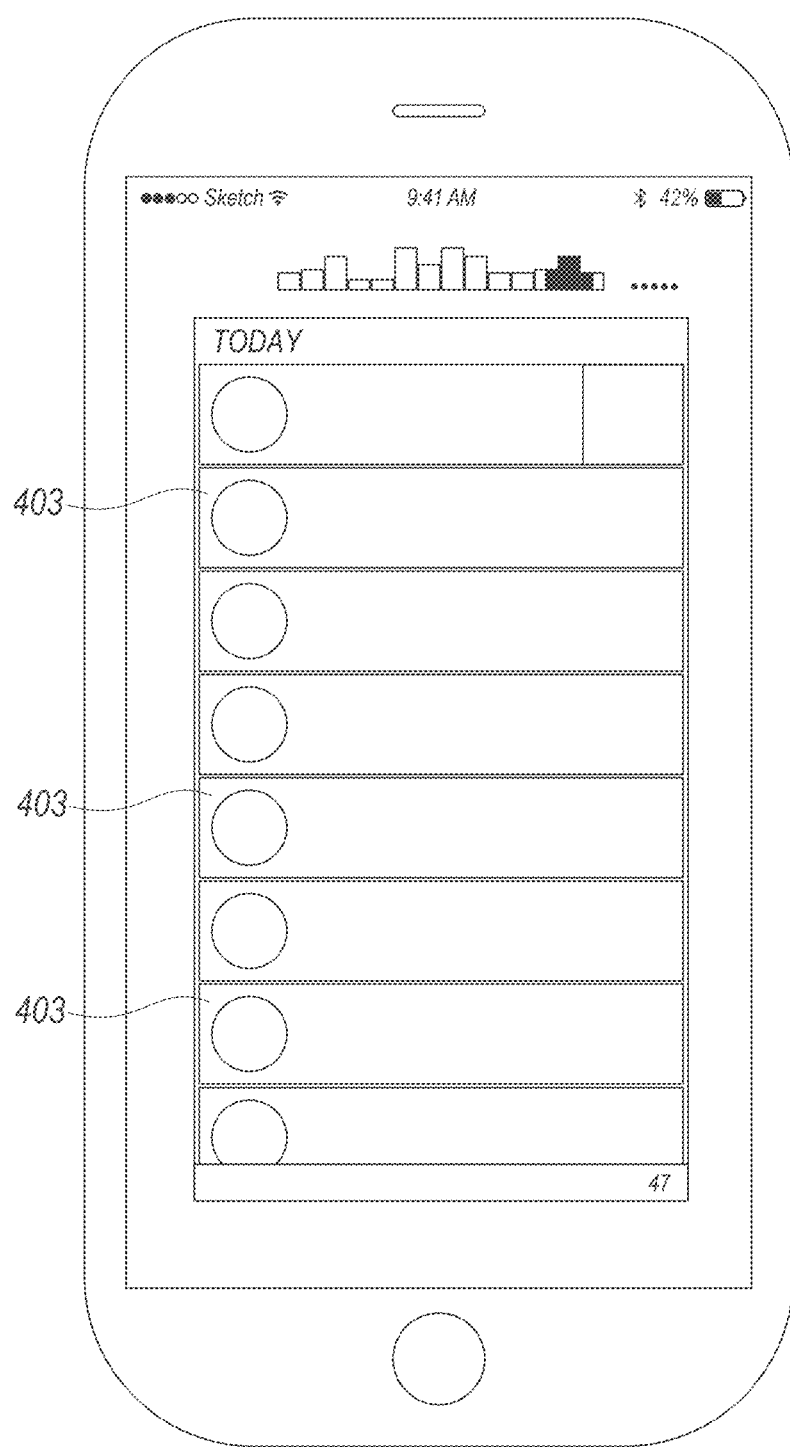
Figure 4C:
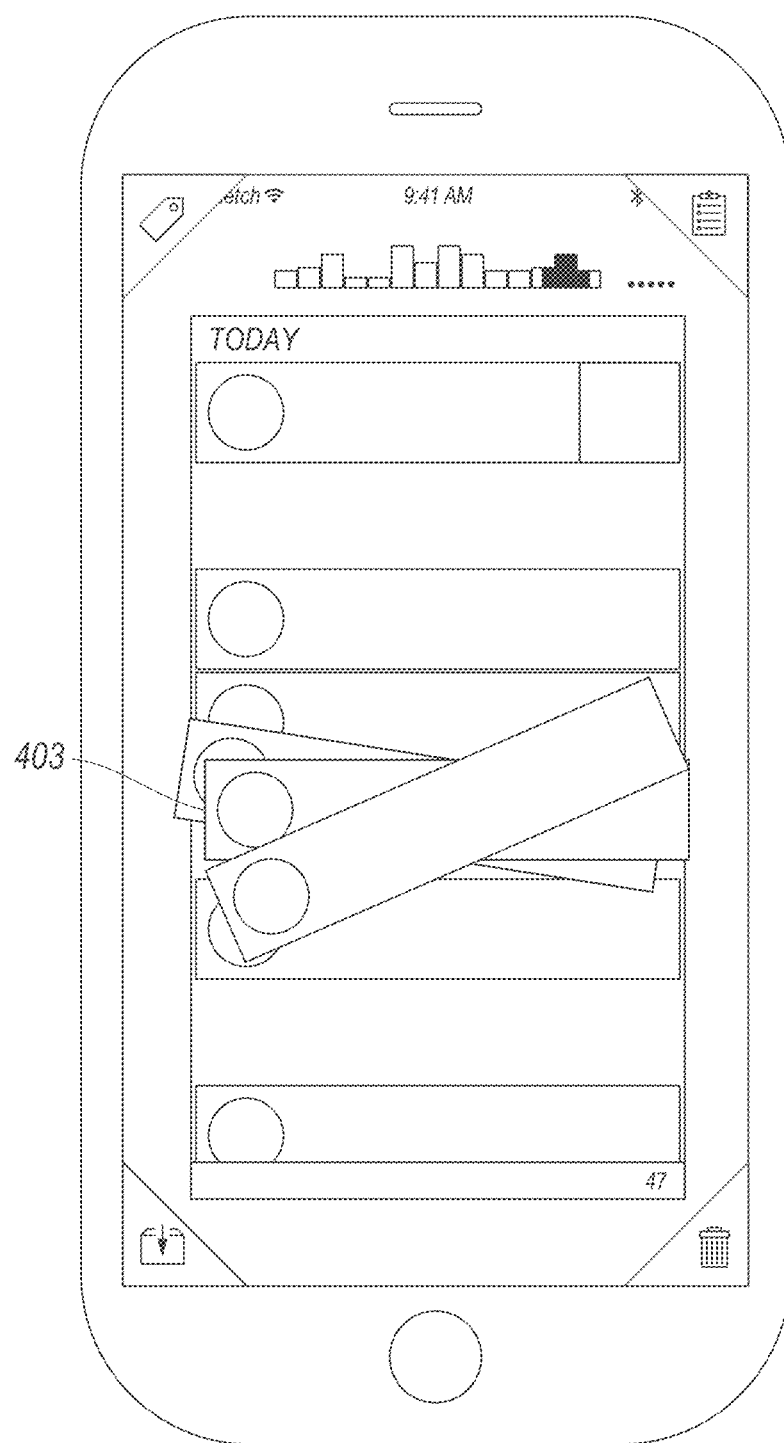
Figure 4D:
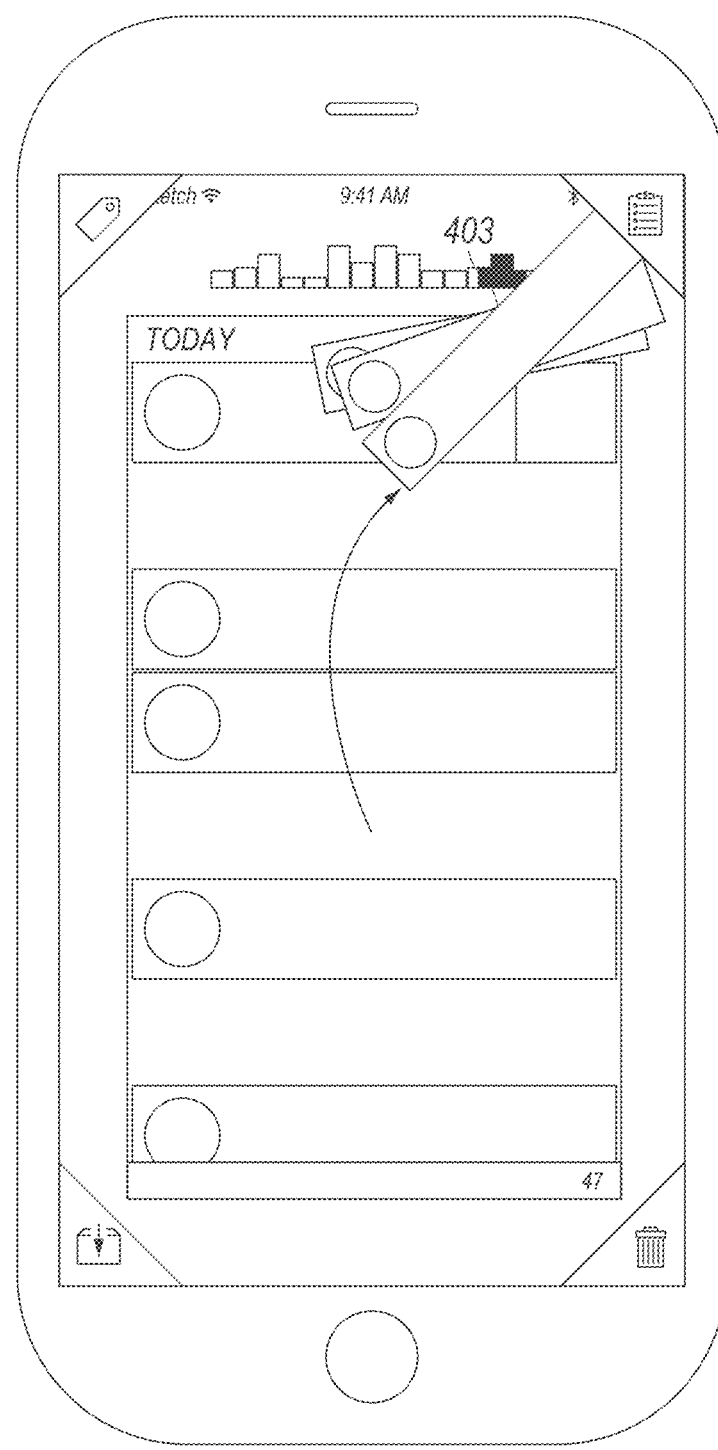
Figure 4E:
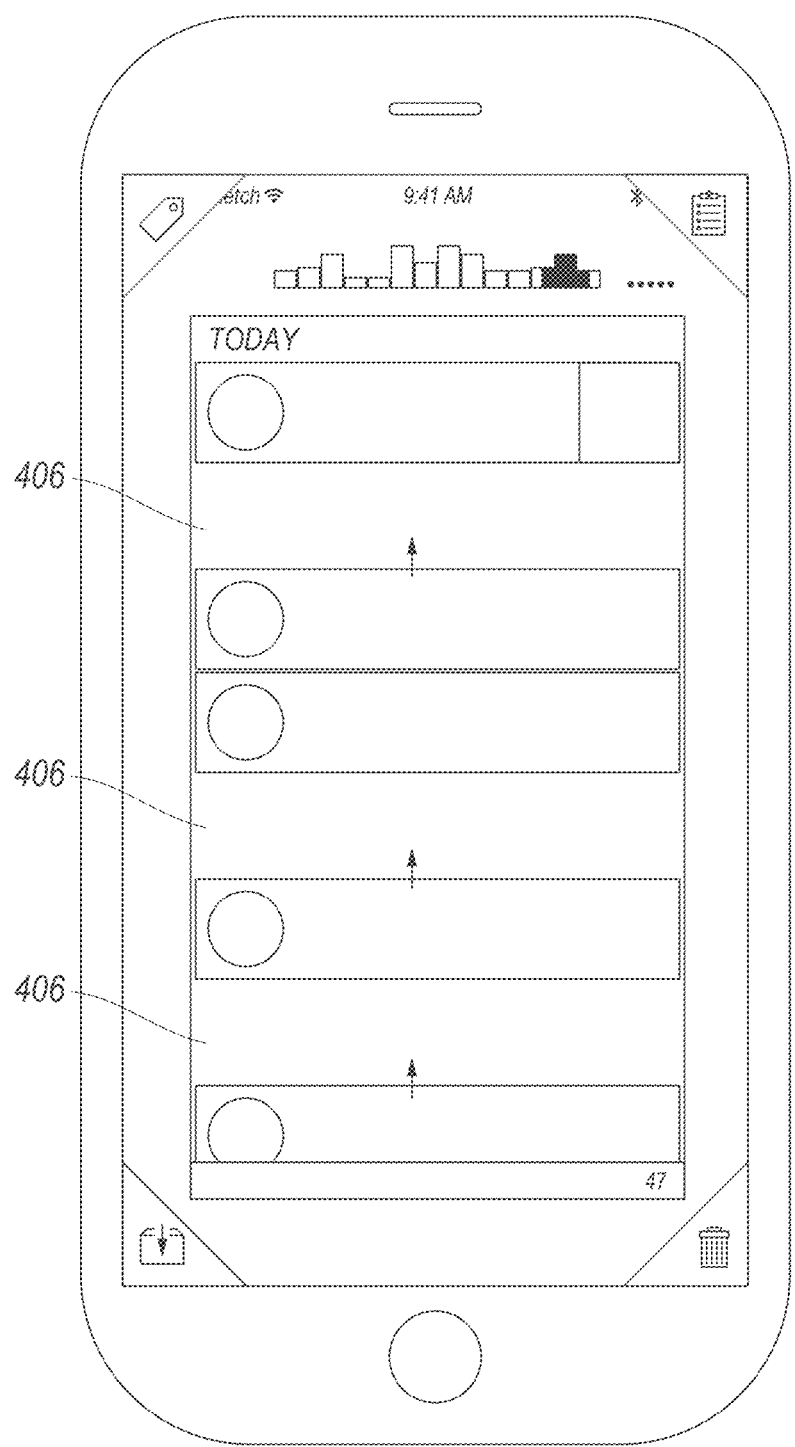
Figure 4F:
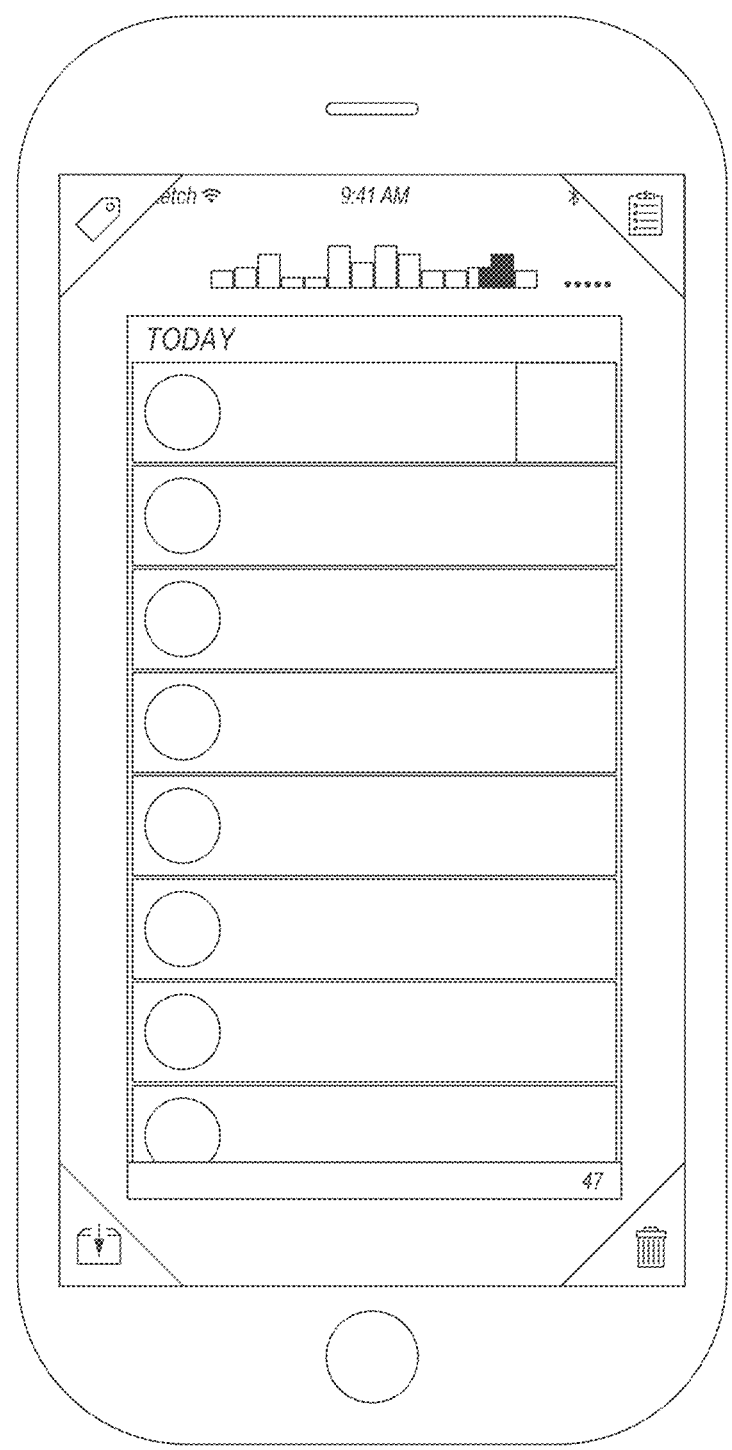
Figure 5A:
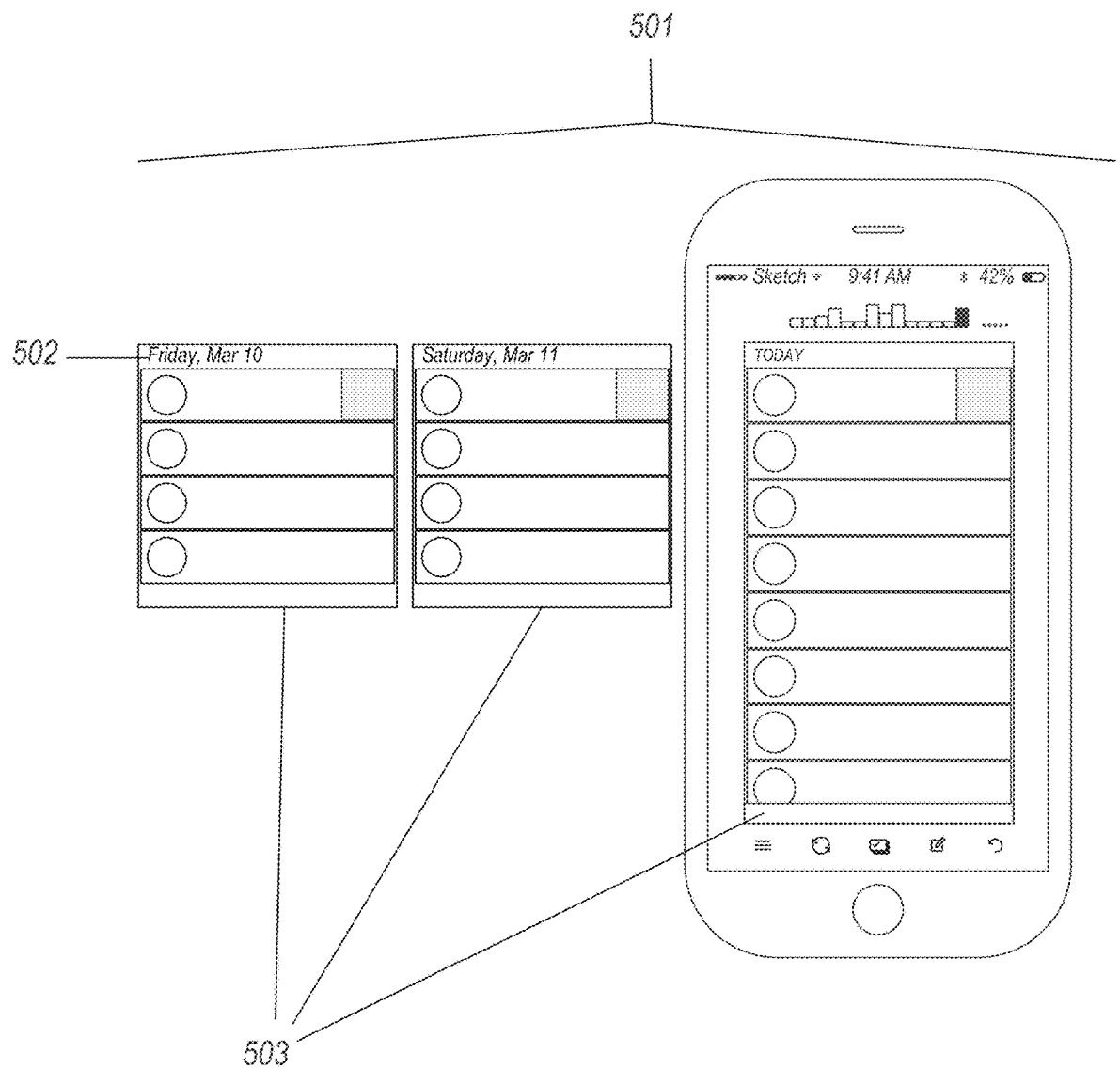
FIGS. 5A-5E show how the horizontal timeline interface may be navigated by user's left or right wrist movement, according to one embodiment.
Figure 5B:
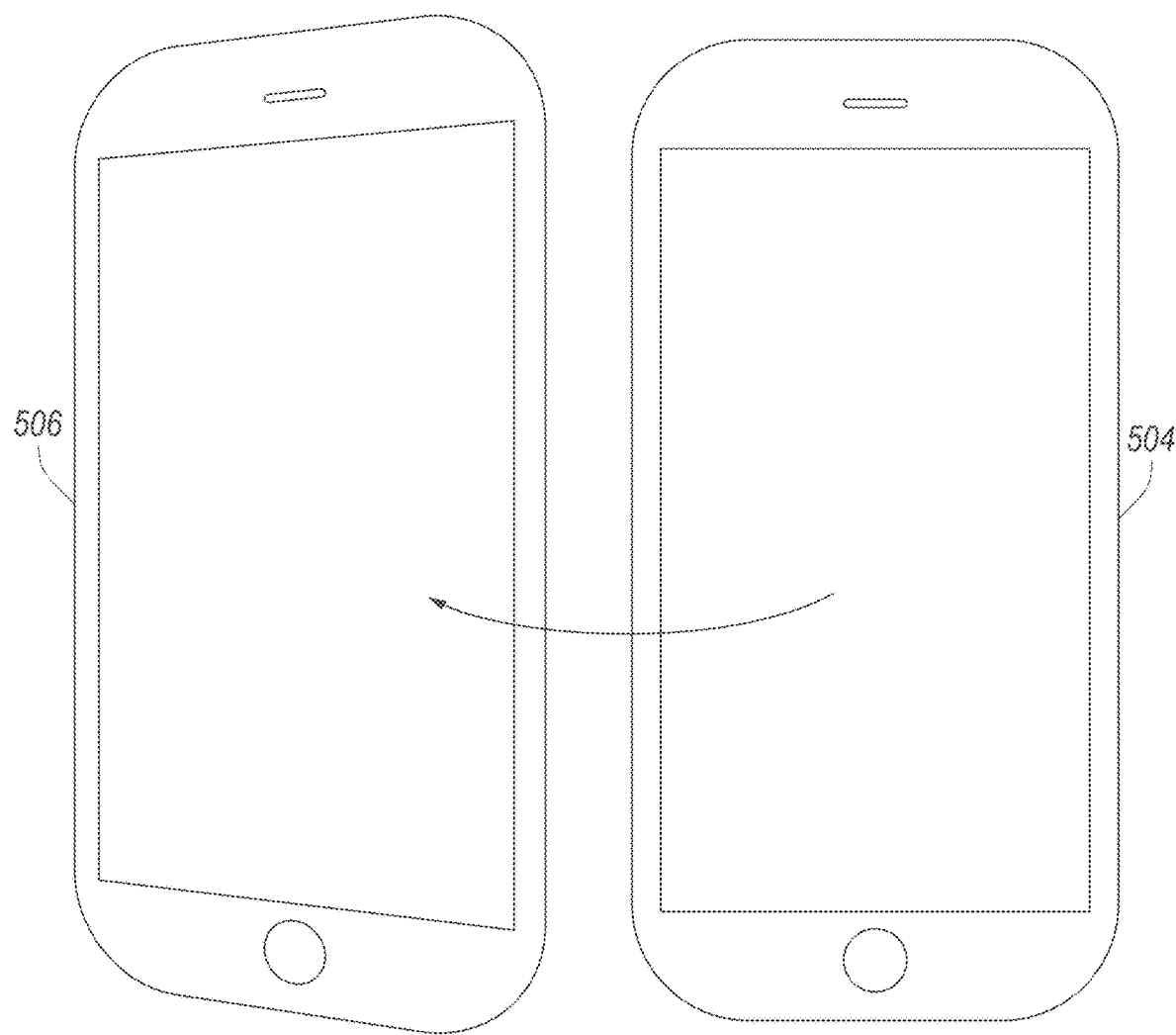
Figure 5C:
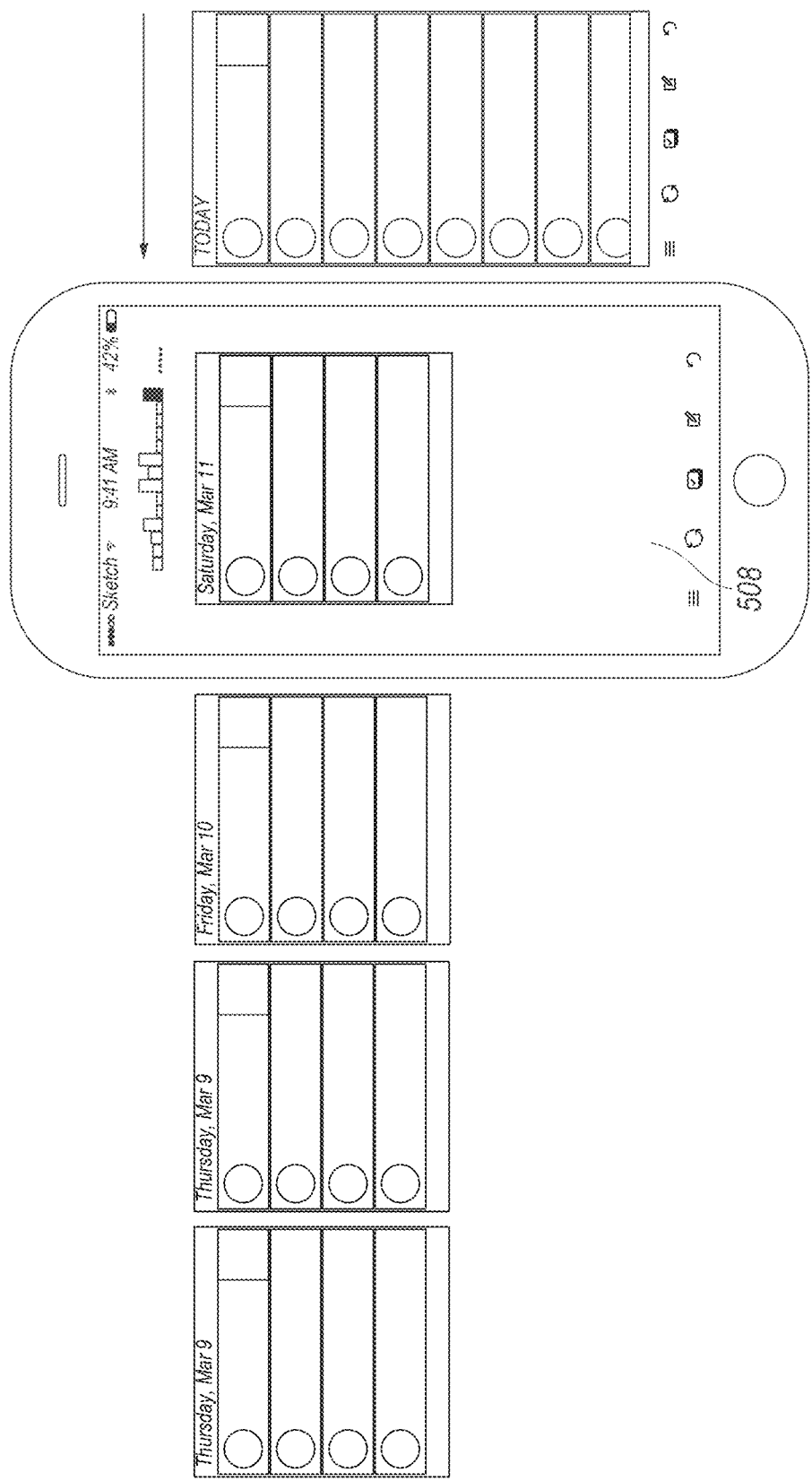
Figure 5D:
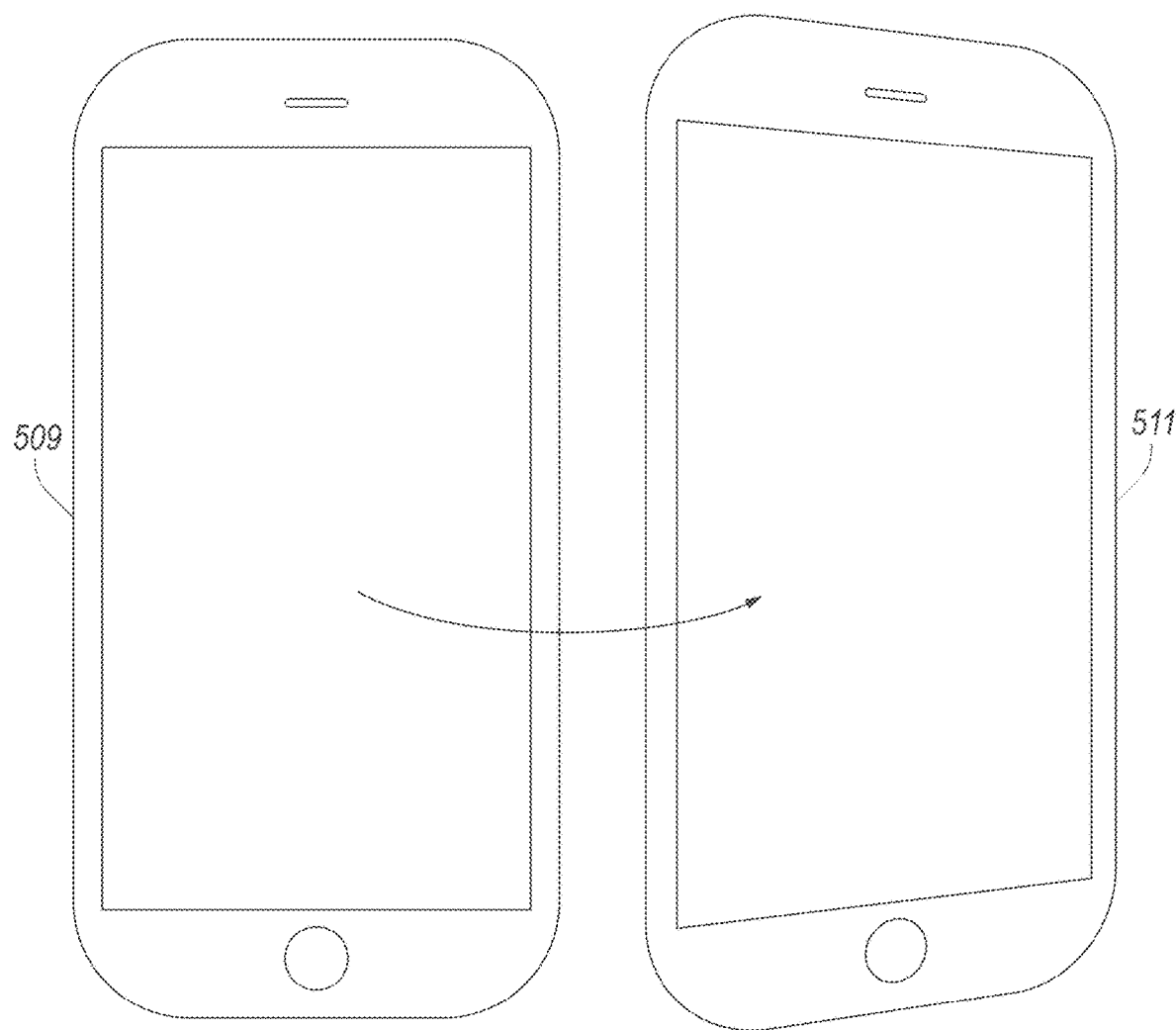
Figure 5E:
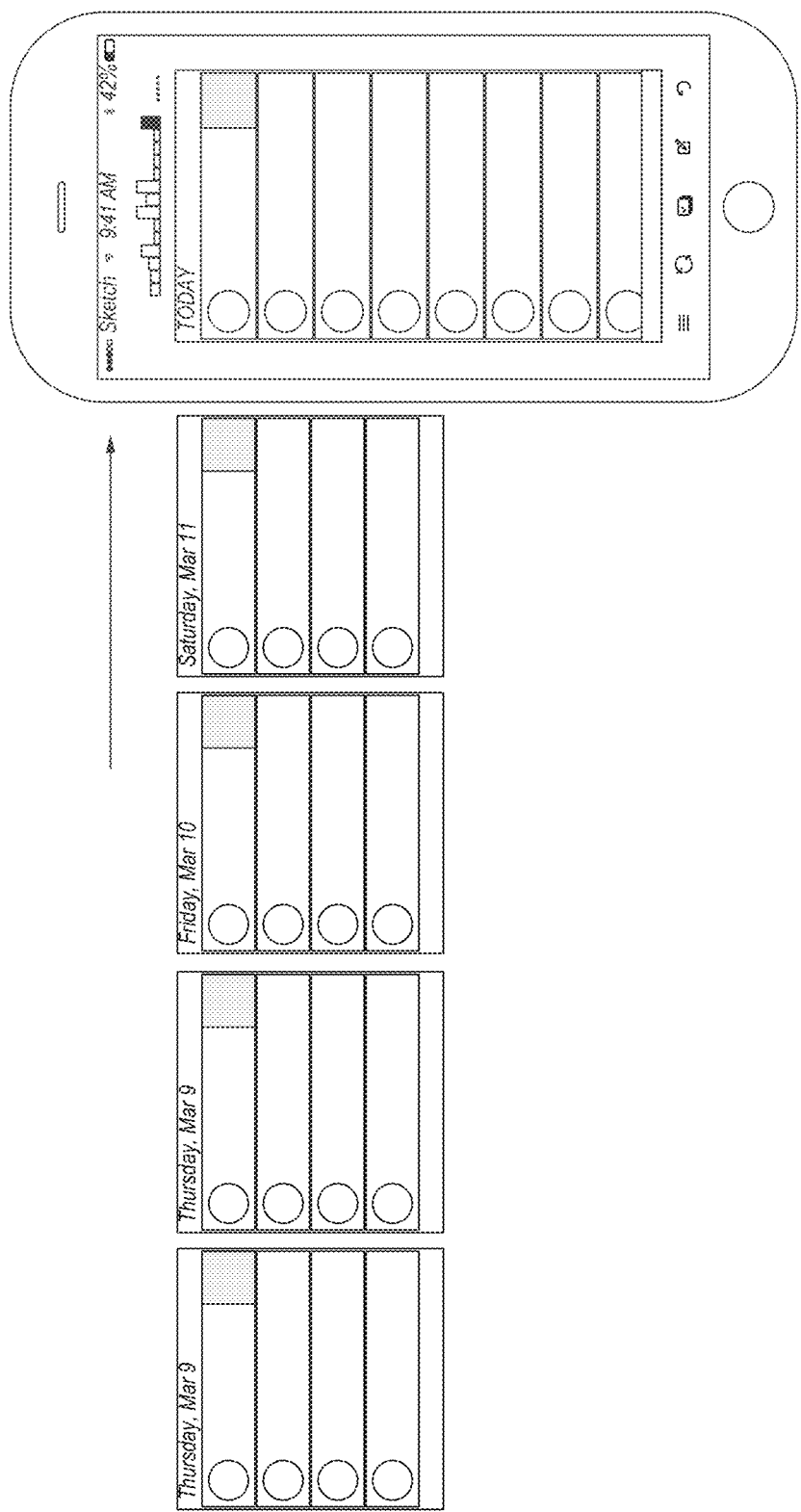

FIG. 1 shows the horizontal timeline interface 107, according to one embodiment. A user device, such as a phone, enables a user to manage his email using the system disclosed here. The system displays a histogram of the email associated with the user, e.g., histogram 102 or histogram 907 of FIG. 9. In one embodiment, the histogram 102, 907 shows the number of emails the user receives in a time period (e.g., an hour, day, week, month, etc.). In another embodiment, the histogram shows the number of important emails the user receives in a time period. The system may define the criteria for categorizing an email as import. Additionally or alternatively, the system may allow the user to define the criteria or customize the criteria. In another embodiment, the histogram 102, 907 may represent the number of files in different folders. If the system receives a zooming out gesture, such as two fingers moving toward each other, the system displays emails received in other time periods. The histogram 102, 907 enables the user to select a particular time period, and the selected time period is marked, such as by darker shading than the unselected time periods. If the user is viewing emails received on a plurality of time periods, all of the time periods viewed may be marked, such as by darker shading than the unselected time periods.

Below the histogram 102, 907, the system displays a list of email tiles received on a particular time period and the total number of emails received on that time period 105. A time period may include a time period indicator (e.g., time period indicator 108 stating that the time period is "Thursday, March 9"). Email tiles of the list of email tiles may include an image associated with the sender 106, the name of the sender 103, and the title of the email 104. If a user selects a different time period in the histogram, the system displays the email received on the selected time period. According to one embodiment, the system receives a touch-screen input from the user selecting a particular time period in the histogram. According to another embodiment, the system receives a motion-based gesture from the user, and based on the motion-based gesture, the system scrolls to a time period behind or a time period ahead. According to one embodiment, the motion-based gesture may be rotating the phone to the right to scroll back, or rotating the phone to the left to scroll forward.

FIGS. 2A-2D show the ability to rearrange the index and visual order of emails within a single time period so a user may personally prioritize the emails that are most important for the user, according to one embodiment. By default, the system may sort the email tiles in chronological order for each time period. The system may enable the user to re-arrange the email tiles received on a particular time period. The system receives an input from the user, the input comprising an email tile 202 or email tile 602 of FIG. 6 that the user would like to place in a different position. For example, the system receives an email selection from the user, when the user long presses the email 202, 602 on the screen 201. Without a lapse in contact with the screen 201, the user may drag the email tile 202, 602 through the ordered list of emails. Once the system receives a signal that the user has let go of the email (e.g., a lapse of contact with the screen 201), the system places the selected email tile 202 into a new position. A group of email tiles 203 may move down if the email tile 202 is moved up. FIG. 6, described below, is another example of gestures that may be used to rearrange emails.

FIGS. 3A-3E show the ability to move email tiles individually for sorting into one or more of the interface's one or more triage corners, according to one embodiment. In an embodiment, moving email tiles may include a three-dimensional visual effect of picking up an email tile from a first position (e.g., in line with a plurality of email tiles) to move it to a second position (e.g., a screen corner). The system receives an email selection of an email tile 302 from the user, such as if the user long presses the email. The system receives a signal that the user wants to place the email tile 302 into one of the screen corners 303. For example, the system receives the signal if the user (e.g., a press and hold on a region of screen 301), without letting go of the email tile 302, drags the email to any of the screen corners 303. Once the system receives a signal that the user has let go of the email (e.g., the system detects a lapse of contact), the system performs the action represented by the corner to which the user has dragged the email. The corner functions may include, for example, delete an email, include the email in a folder, favorite the email, label the email, archive the email, add the email to a to-do list, marking the email as read, reply to the email, forward the email, save attachment in the email, or any combination thereof. In an embodiment, a user may customize corner function by, for example, selecting corner function from a dropdown list of corner functions.

FIGS. 4A-4F show the ability to select and move multiple email tiles at once for sorting into one of the interface's one or more triage corners, according to one embodiment. In an embodiment, moving multiple email tiles may include a visual effect appearing to three-dimensionally pick up the email tiles from a first position and move them to a second position. The system may receive a plurality of email tiles 403 from the user. For example, if the system receives a signal that the user has pressed and let go of an email (e.g., contact with a region of the screen 401 associated with the email tiles 403 followed by a lapse of contact), the system labels the email as a selected email. The system may receive multiple email selections 403. The system receives a signal that the user wants to place the plurality of email selections 403 into one of the screen corners 303. According to one embodiment, the system receives the signal if the user drags his finger across the screen towards the desired screen corner. The system may remove the selected emails from the display (e.g., causing a plurality of gaps 406), and rearrange the display to close the gaps left by removed emails.

FIGS. 5A-5E show the histogram interface 501 responding to motion inputs (e.g., from a user's left or right wrist movement), according to one embodiment. Identifying motion inputs by utilizing various motion technologies is contemplated. The histogram interface 501 may include a plurality of time periods 503 and time periods may include time period indicator (e.g., indicator 502 stating "Thursday, March 9"). A motion input may be detected by any motion detection technology, such as, for example, an accelerometer, gyroscope, camera, compass, global positioning system, a plurality of motion sensors, or any combination of motion detection technology. Embodiments include the motion detection technology being located within a user device (e.g., a mobile telephone) with which a user may interact. Embodiments include the motion detection technology being located in a separate device (e.g., an external camera detecting motion of the user). Various motion technologies are contemplated, and any discussion of a particular motion detection technology should not be construed as limiting.

In an embodiment, the system may detect a motion input (e.g., via an accelerometer, gyroscope, and/or other motion detection technology) and provide a second view in response to receiving the motion input. For example, the system may detect a user moving a user device (e.g., a mobile device) and enable the user to navigate the histogram interface based on pre-defined motions. The system may browse the histogram 102, 907 upon receiving a motion-based gestures from the user. According to one embodiment, if the user rotates the device to the user's left (i.e. counterclockwise if viewing the bottom of the mobile device), from position 504 to position 506, the system displays the previous time period's email 508; if the user rotates the device to the user's right (i.e. clockwise if viewing the bottom of the mobile device), from position 509 to position 511 the system displays the next time period's email.

Figure 6A:
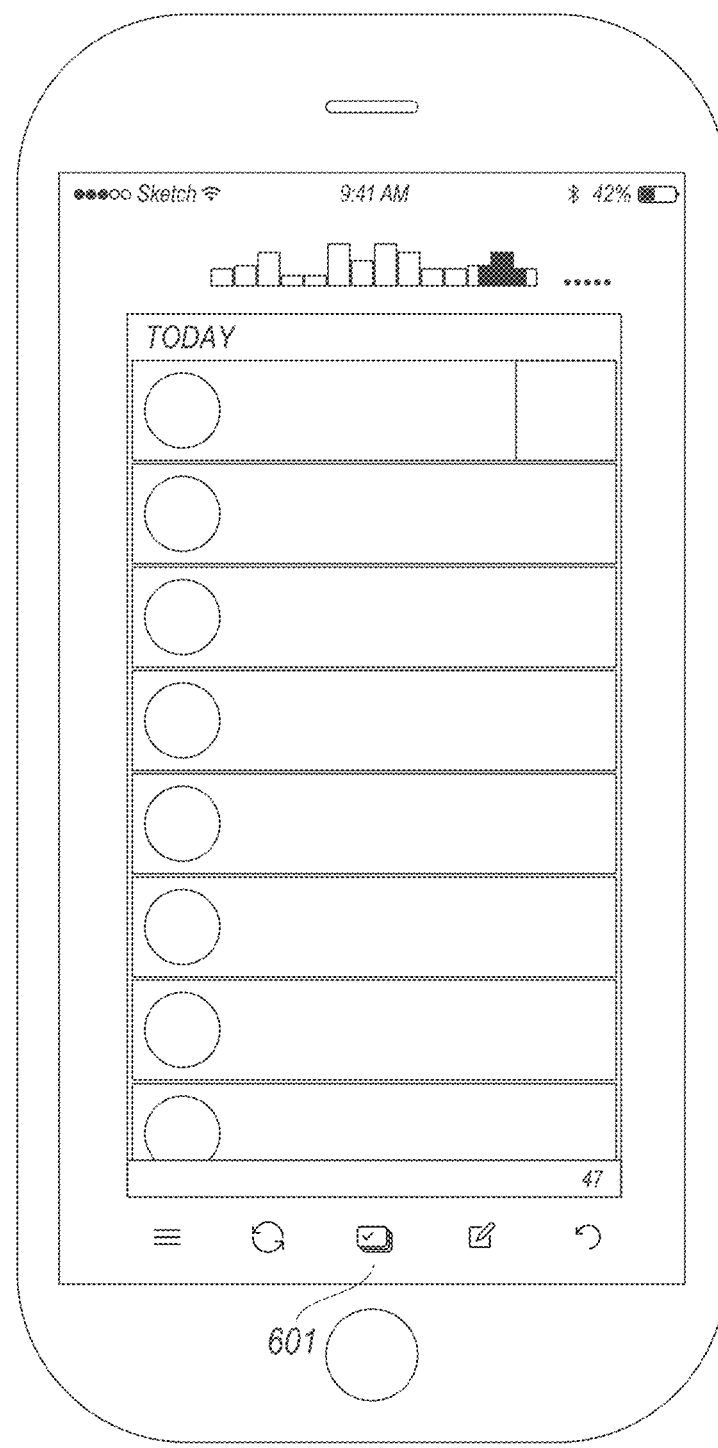
FIGS. 6A-6F show how the email tiles may be tossed to the top with a forward wrist motion after they are selected, according to one embodiment.
Figure 6B:
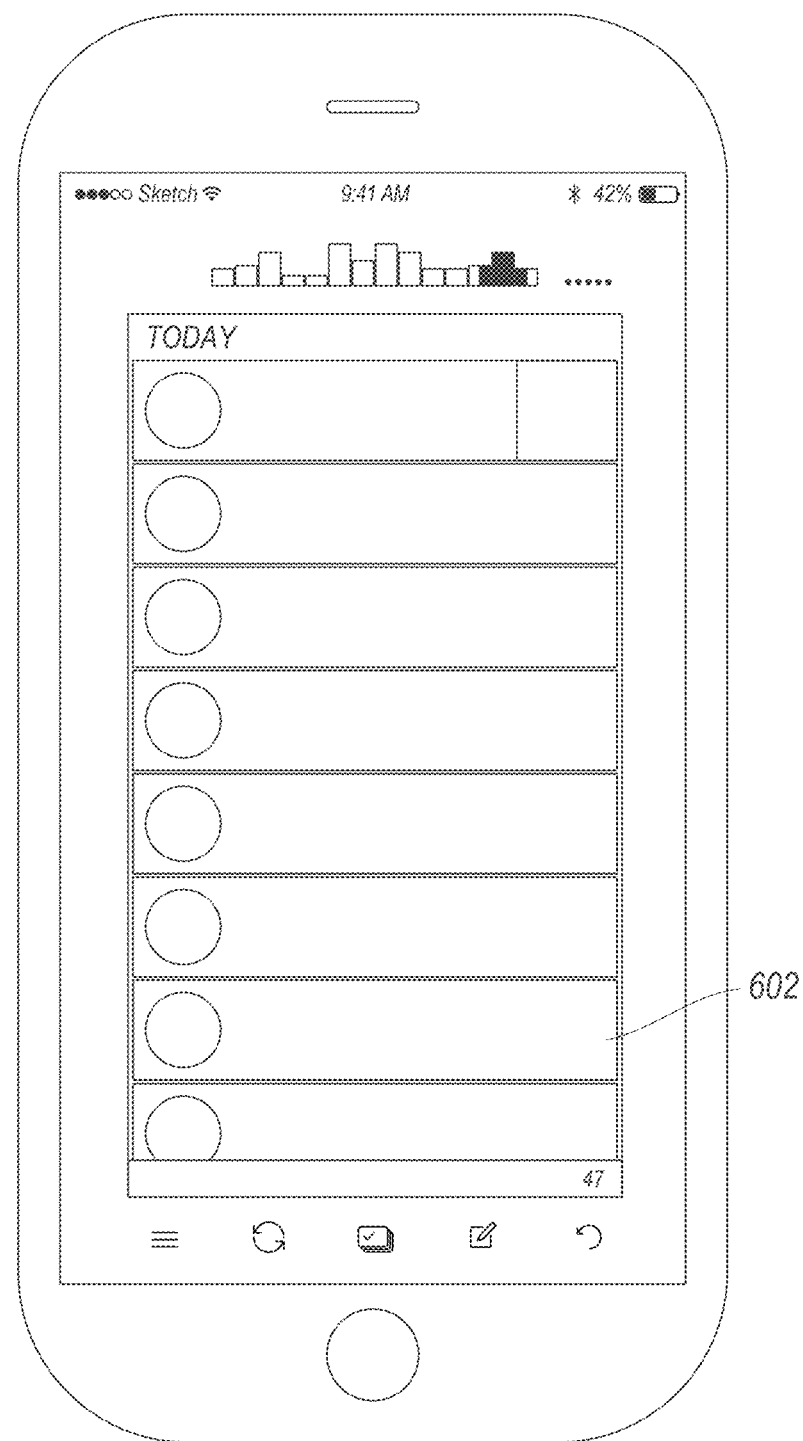
Figure 6C:
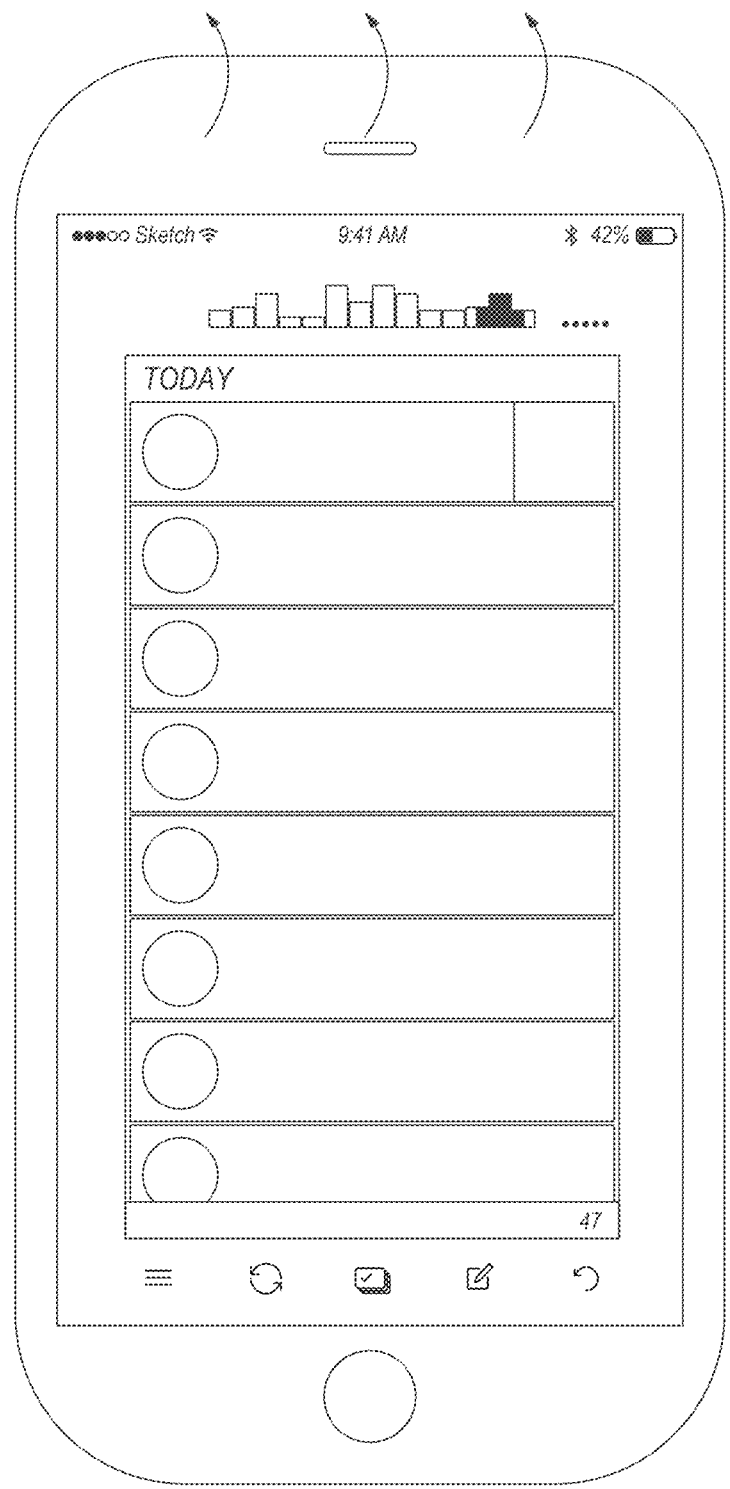
Figure 6D:
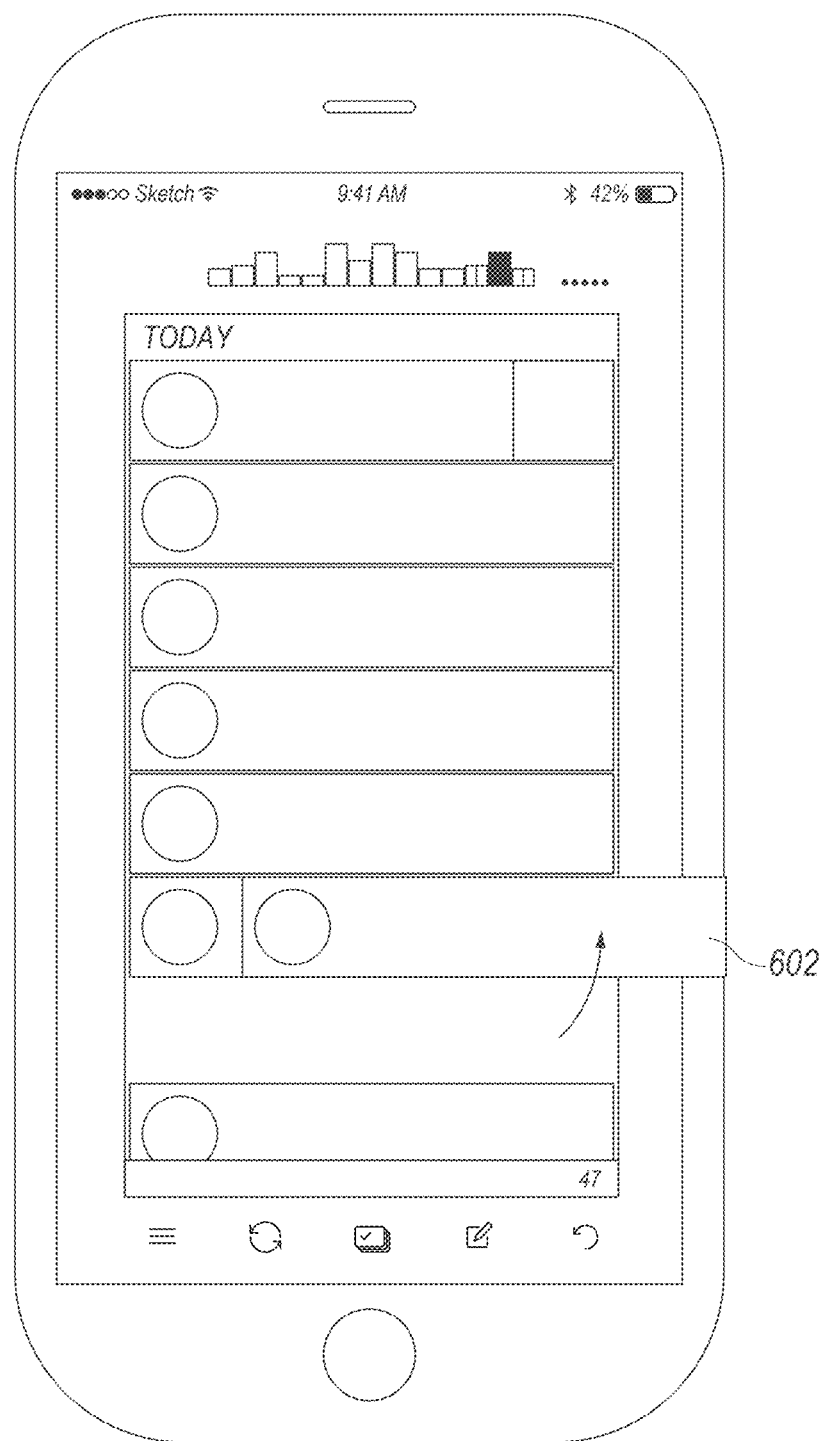
Figure 6E:
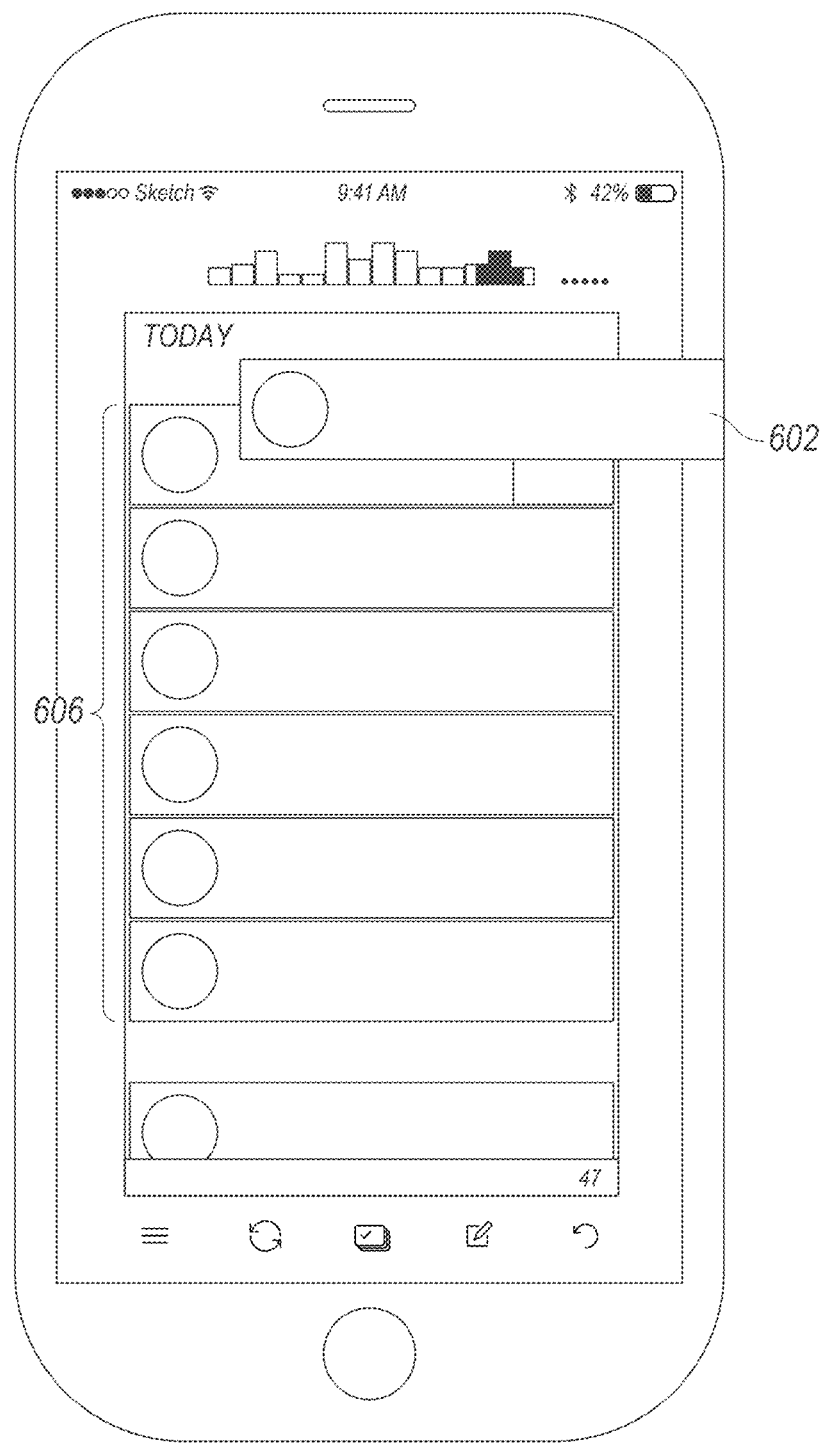
Figure 6F:
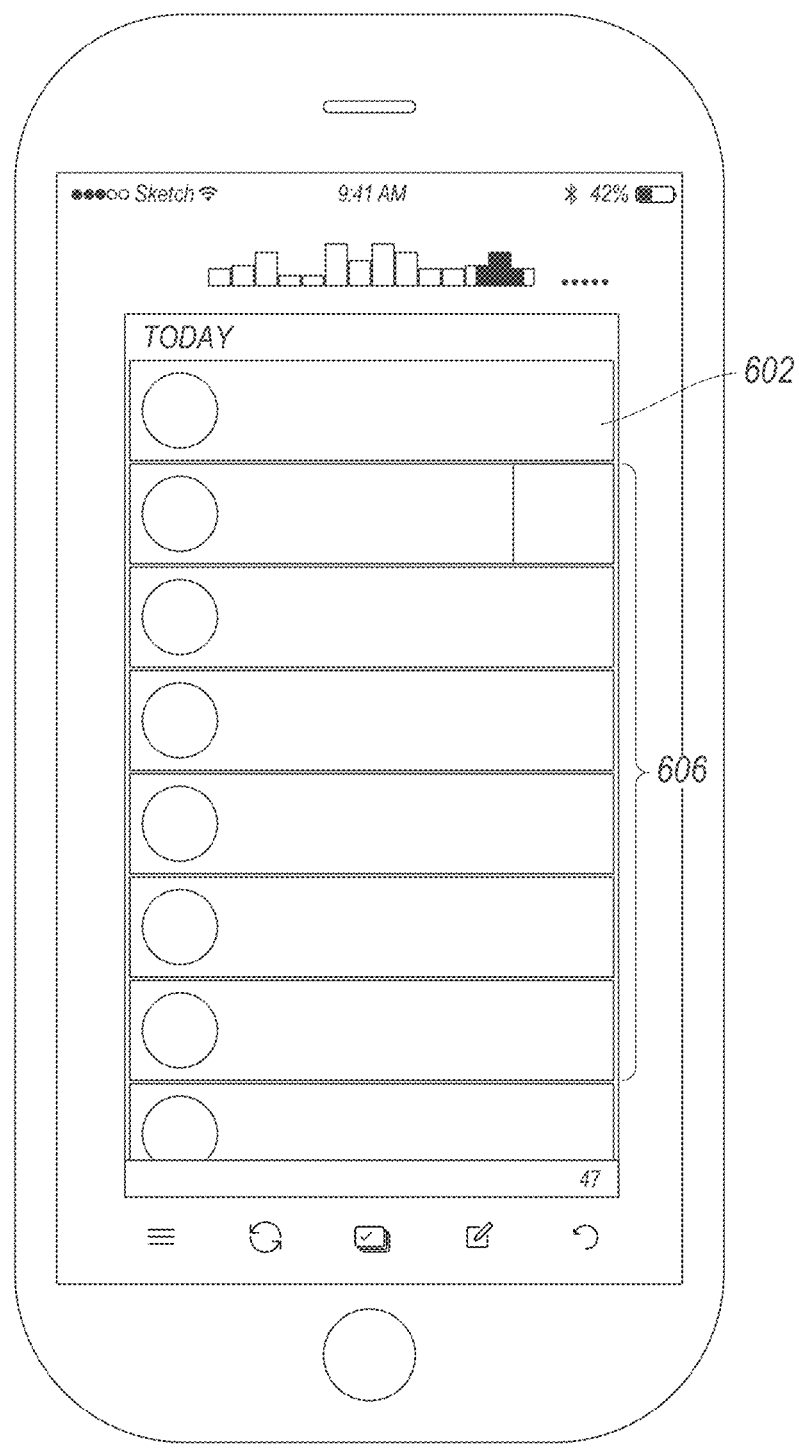

FIGS. 6A-6B show how the email tiles displayed in screen 601 may be tossed to the top with a forward wrist motion after they are selected, according to one embodiment. The system receives an input from the user, the input comprising an email tile 202, 602 that the user would like to place in a different position. For example, the system receives an email selection from the user, if the user presses the email tile 202, 602. The system may move the email to the top of the list upon receiving a motion-based gesture from the user. According to one embodiment, the motion-based gesture comprises tilting the device forward away from the user. Once the system receives a signal that the user has tilted the device, the system places the selected email tile 602 into a new position. A group of email tiles 606 may move down if the email tile 602 is moved up.

FIG. 7 shows how automatically generated emails are represented visually different than the emails received from human senders, according to one embodiment. For example, an automatically generated email may be represented as a standard email 701 or as a bot email 702. The bot email 702 may include a symbol representing a bot (e.g., a symbol of a head of a robot). The symbol representing a bot may indicate to a user that the email is automatically generated to help distinguish automatically generated emails from emails prepared by a human sender. The system may be configured to display automatically generated emails (e.g., bot email 702), such as emails generated by machines or by an application executing on the machine (referred to as a "robot"), in an alternate view (e.g., a view other than chronologically in an email list 704). An alternate position for an automatically generated email may include, for example, a bottom of the list of daily emails, hidden from the list, or hidden from the histogram 102, 907 count.

In an embodiment, one or more automatically generated emails identified by the system can be removed from the main user interface view temporarily or permanently by a tap on the front or back of the mobile device. This tap creates a visual representation within the user interface where the automatically generated non-human sender emails are, in an animated fashion, visually knocked forward and fall down out of their respective columns offscreen.

Figure 8:
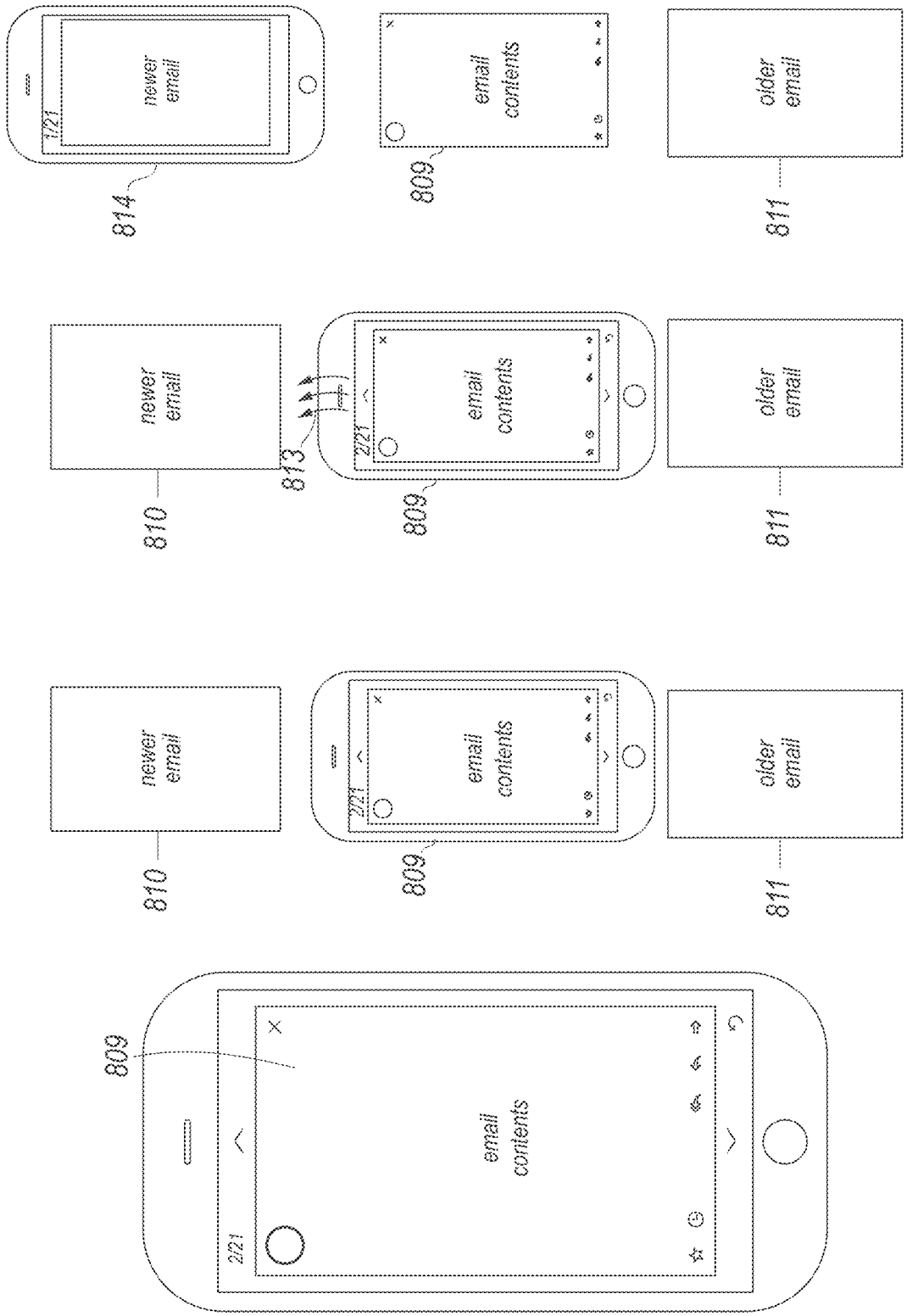
FIG. 8 shows how users may use forward or backward wrist flicks to navigate to older and newer emails in the system detail view, according to one embodiment.

FIG. 8 shows how users may use forward or backward wrist flicks to navigate from a current email 809 to an older email 811 and newer email 810 in the system detail view, according to one embodiment. The system enables the user to browse through the emails using gestures (e.g., gesture 813). In an embodiment, the system may detect tilting 813 of a user device, and in response to detecting tilting of the user device, the system may display a subsequent (e.g., newer email 810) or previous email (e.g., older email 811). According to one embodiment, if the system is displaying an email (e.g., including text 802 and/or images of the email), and the system receives a gesture tilting the phone forward (e.g., gesture 813), the system may display the following email (e.g., newer email 810); if the system receives a gesture tilting the phone backwards, the system may display the previous email (e.g., older email 811). An order of emails may be based on, for example, an order indicated by a user (e.g., by a user rearranging emails user gestors), a chronological order of emails, an order altered by the system (e.g., in response to detecting an automated email), or a combination thereof (e.g., a partially chronological list of emails with some emails having an order altered by the system and some rearranged by a user).

Figure 9B:
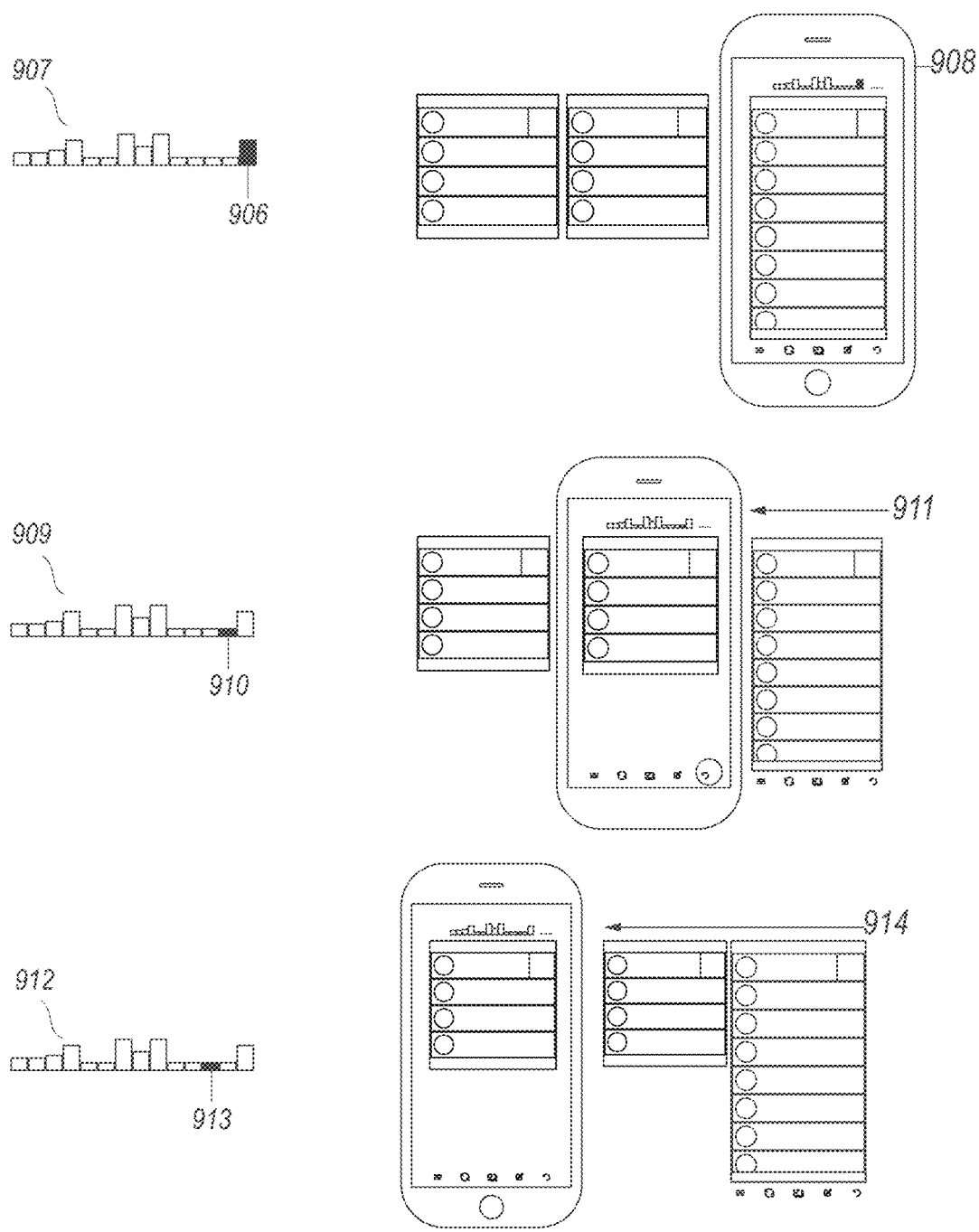
Figure 10A:
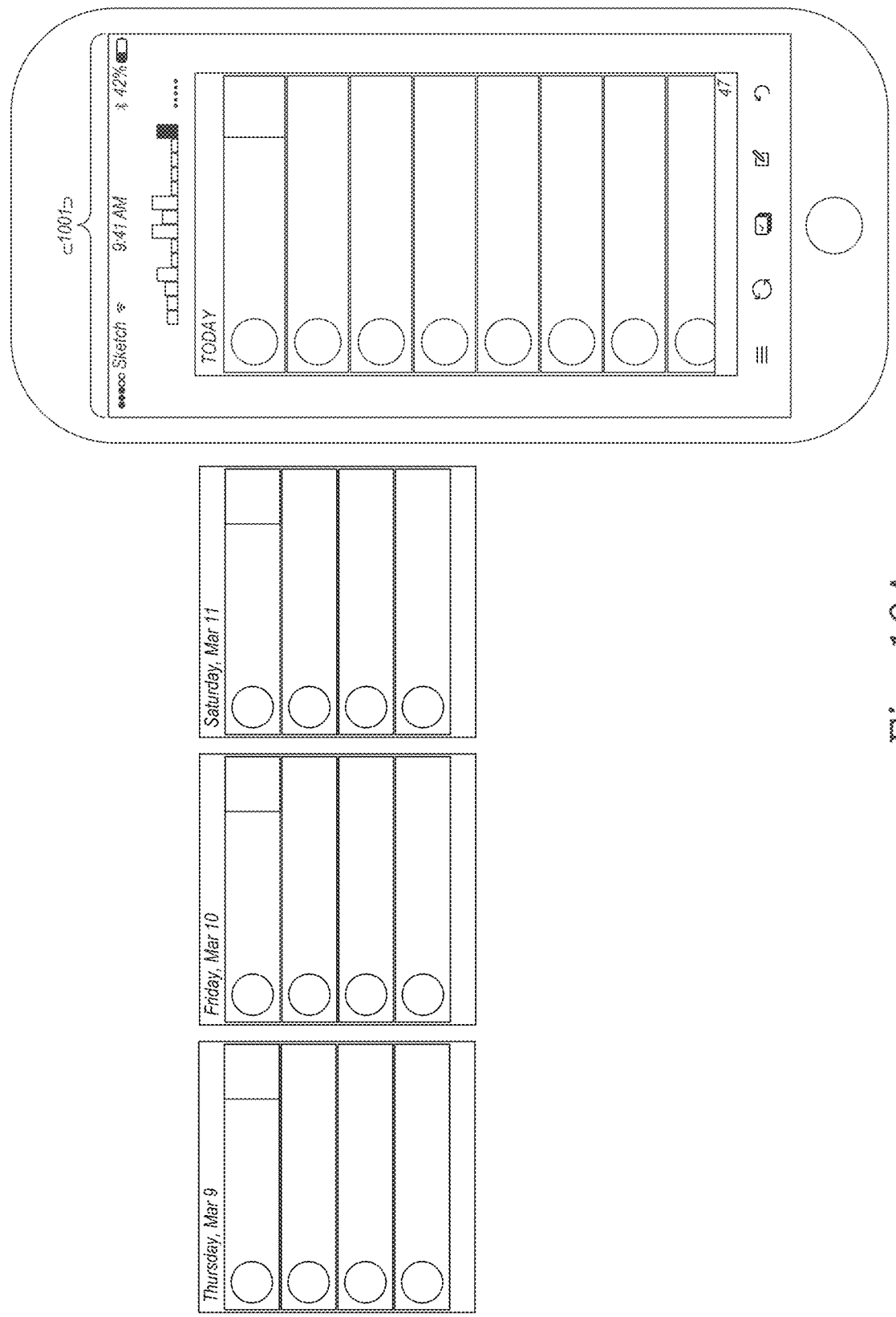
FIGS. 10A-10F show the transition between a horizontal interface and a vertical interface of emails, according to one embodiment.
Figure 10B:
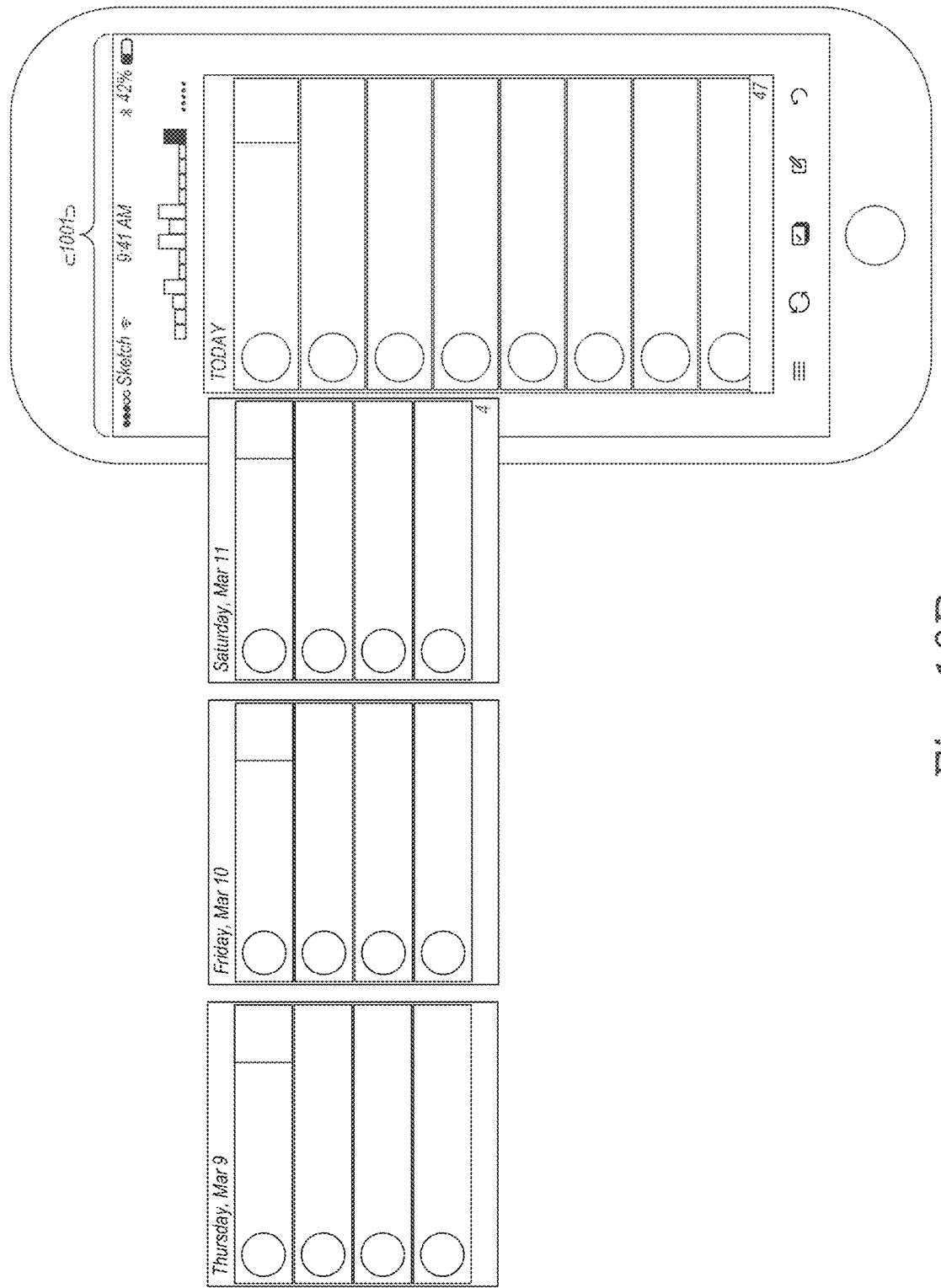
Figure 10C:
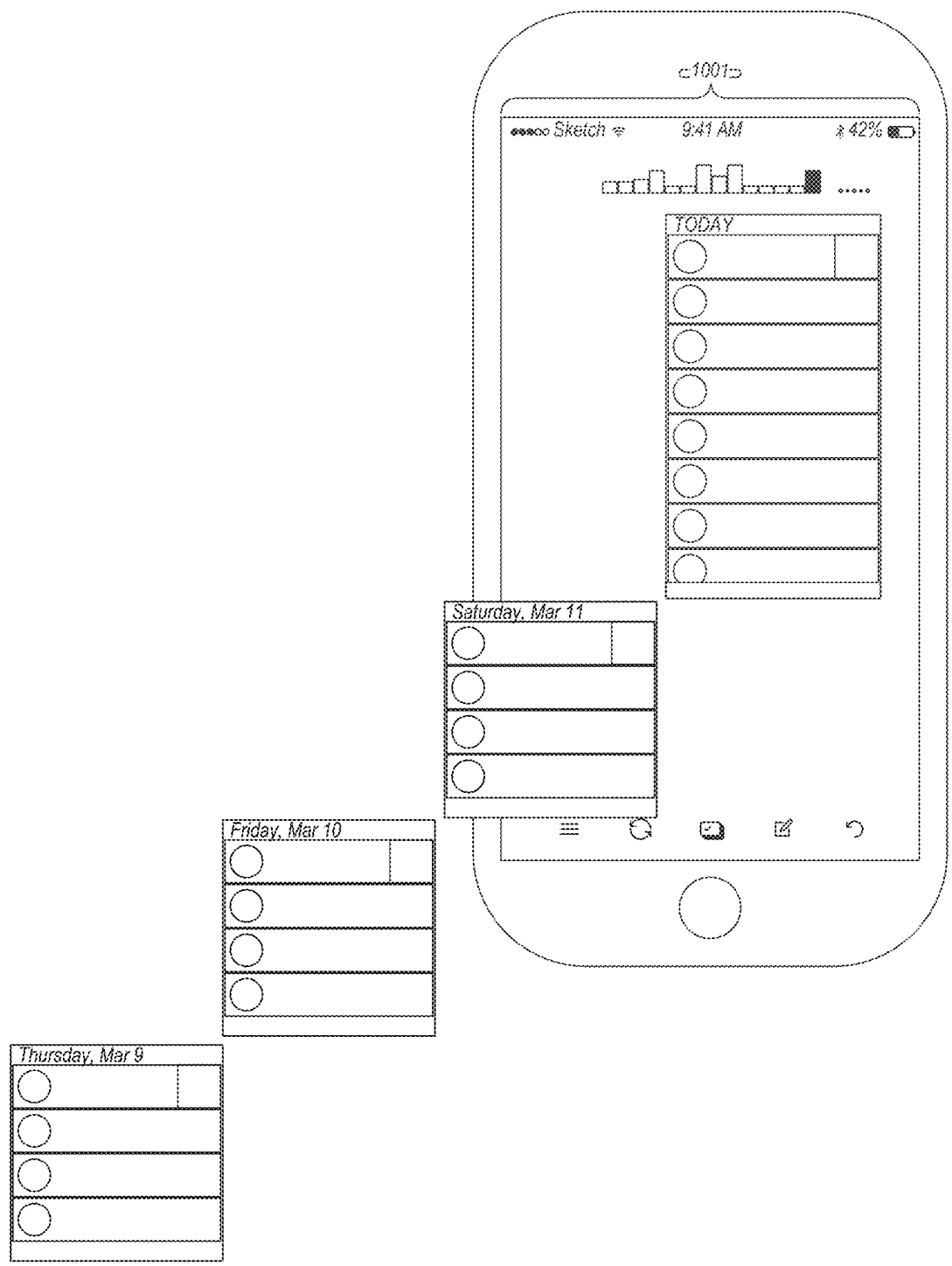
Figure 10D:
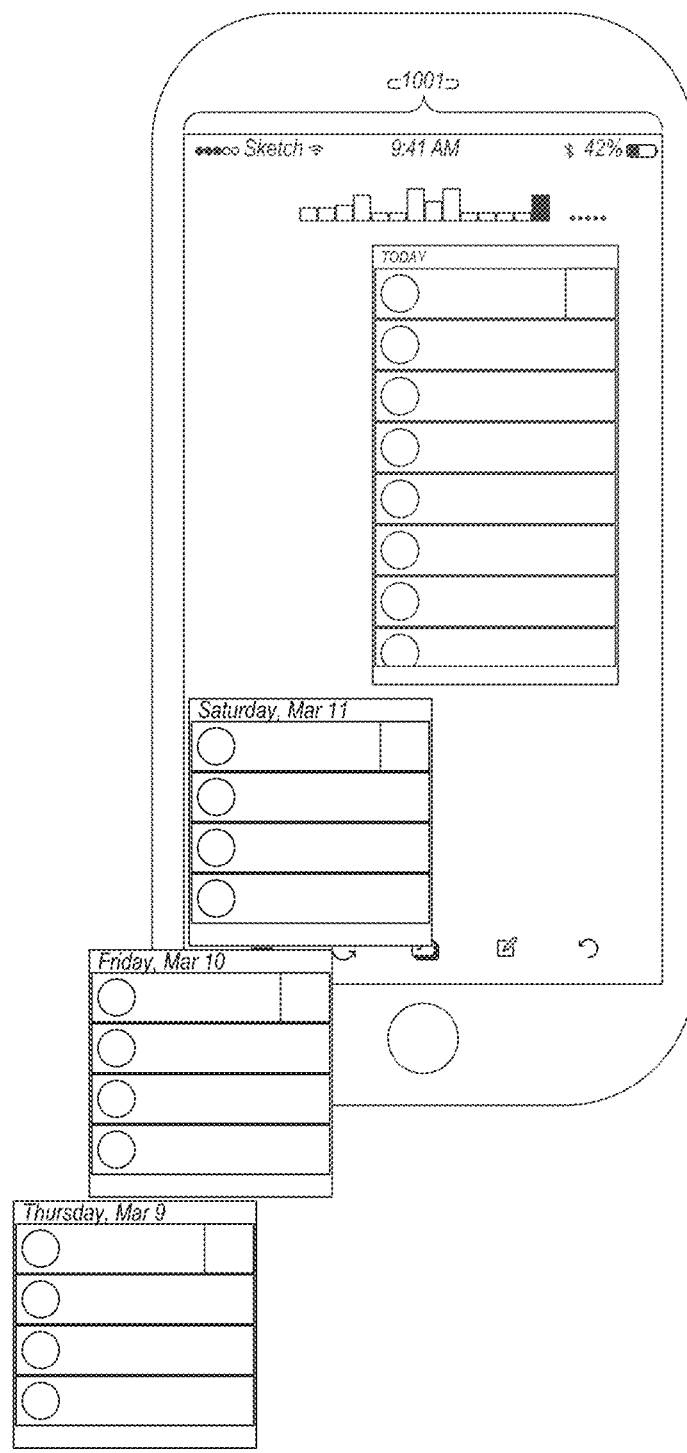
Figure 10E:
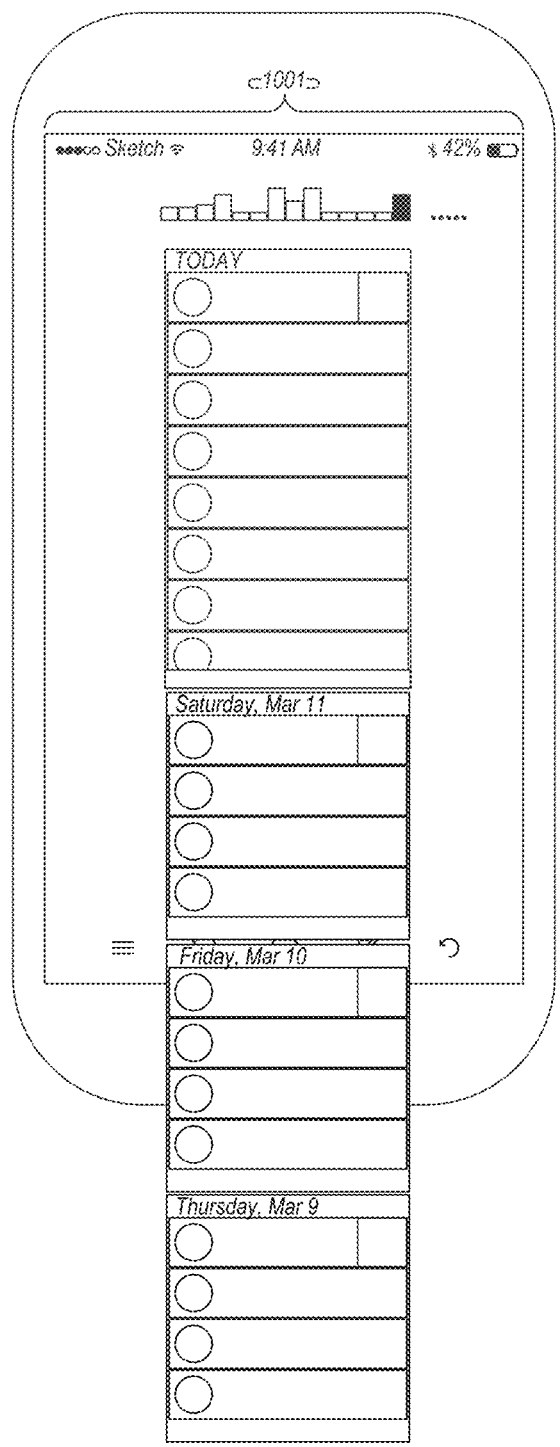
Figure 10F:
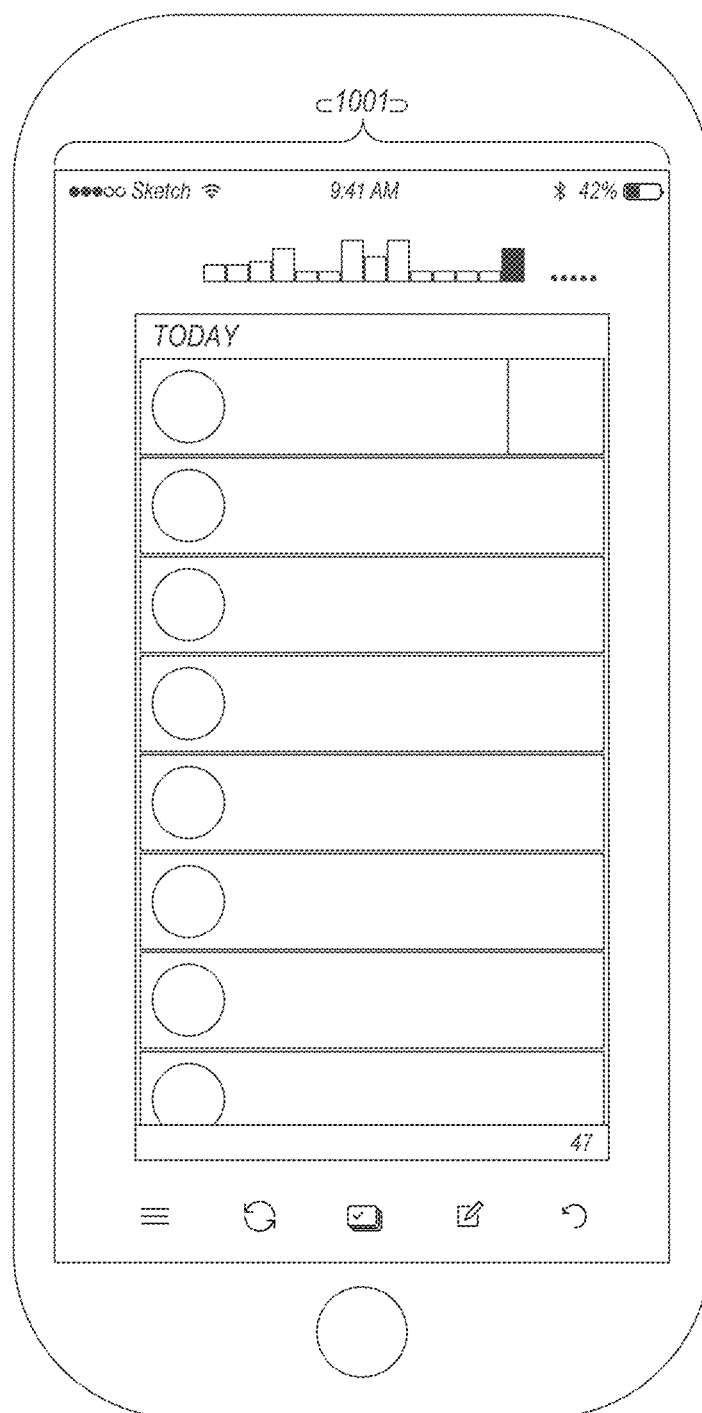

FIGS. 9A-9B show how the system timeline and the users email quantity by time period is displayed in a histogram 901, according to one embodiment. The histogram 901 may be displayed along the top of the interface which may be used to scroll from one time frame to another (e.g., from a list of emails associated with a first time period to a list of emails associated with a second time period). In addition, a user may scroll across the histogram to view contacts 902 (e.g., very important person "VIP" contacts or favorite contacts), forward emails, open all emails from a VIP contact, start a fast email to one of a user's most frequent personally selected VIP contacts, or any combination thereof. VIP contacts may be, for example, selected by a user, identified as frequent contacts by the system, or a combination thereof. The histogram 102, 907 marks the selected time period 906, for which the list of emails is displayed on the device 908. The selected time period 906 may be distinguished from other time periods by including, for example, a shade darker than other time periods, a color different than other time periods, a texture different than other time periods, or any combination thereof. The system may receive a gesture from the user to scroll through the histogram 102, 907. According to one embodiment, the gesture comprises tilting the phone to the left or to the right to scroll backwards or forwards, respectively. According to another embodiment, the user may select a date to display by pressing on the histogram 102, 907 representing the email count for that time period. According to another embodiment, the user may drag his finger across the histogram 102, 907 thereby scrolling through emails received on different time periods. For example, a user may be in contact with a display of a user device associated with a region of the selected time period 906 and the user device may display emails received on a time period associated with the selected time period 906 (e.g., as displayed on user device 908). In another example, a user may be in contact with a display of a user device associated with a region of the selected time period 910 of the histogram 909 and the user device may display emails received on a time period associated with the selected time period 910 (e.g., as displayed on user device 911). In another example, a user may be in contact with a display of a user device associated with a region of the selected time period 913 of the histogram 912 and the user device may display emails received on a time period associated with the selected time period 913 (e.g., as displayed on user device 914).

FIGS. 10A-10F show the transition between a horizontal interface and a vertical interface of emails for a user device 1001, according to one embodiment. The horizontal interface displays emails associated with a time period (e.g., an hour, day, week, month, etc.) arranged horizontally so that emails associated with a single time frame are displayed on a user device and emails associated with one or more other time frames are accessible by gesturing left or right (e.g., swiping left or right, tilting left or right, etc.). The vertical interface displays all the emails in a vertical list so that emails associated with a plurality of time frames may be accessible by gesturing up or down (e.g., swiping up or down, tilting up or down, etc.). The horizontal interface may transform into a vertical interface; and the vertical interface may transform into a horizontal interface. For example, a user may select a first group of emails associated with a first time frame (e.g., by pressing and holding the screen of a user device) and drag the first group of emails associated with the first time frame to a second group of emails associated with a second time frame. The first group may be dragged above, below, or onto the second group. The system may respond to a user selecting and dragging the first group to the second group by presenting the first group and second group as a single vertical list.

Figure 11:
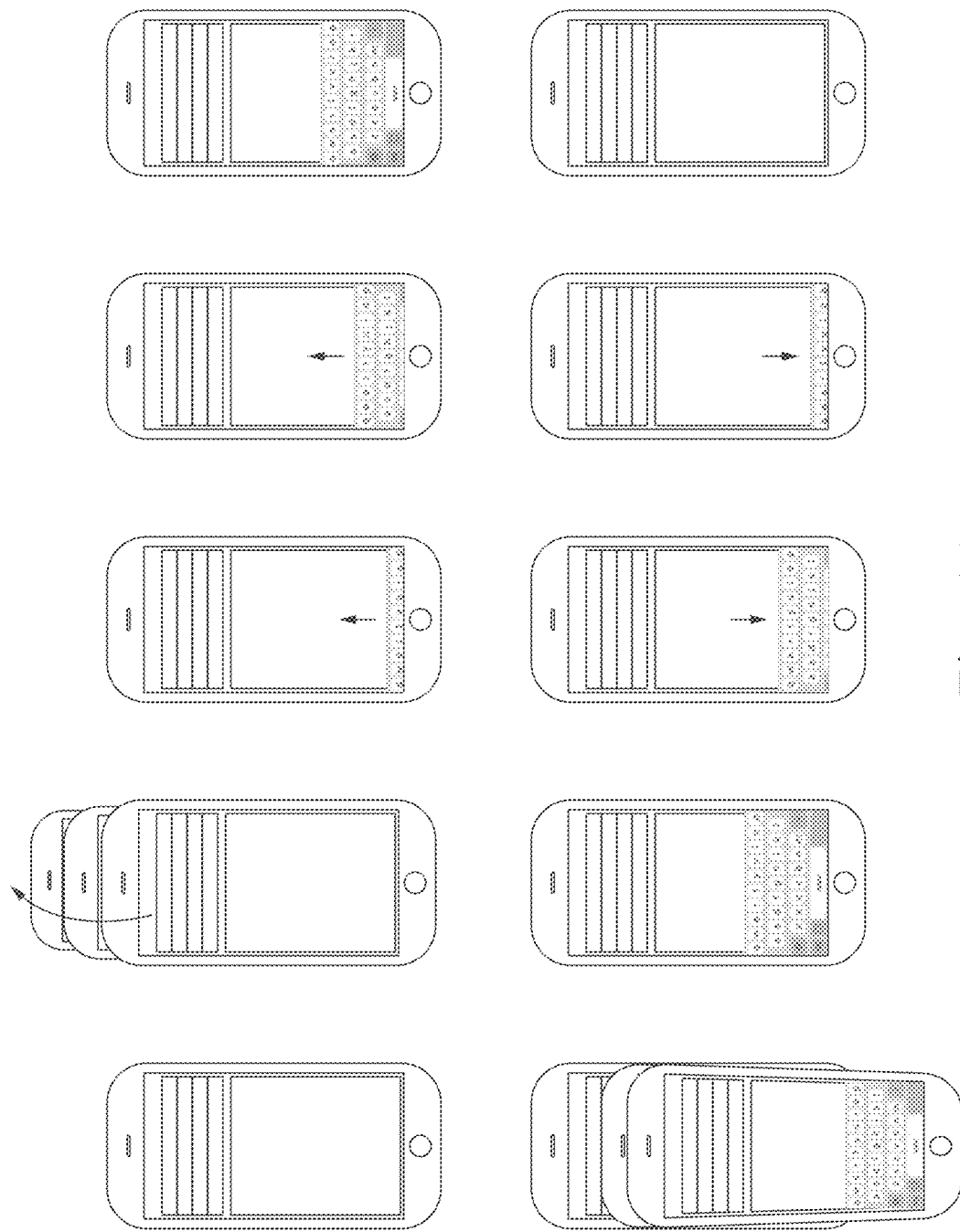
FIG. 11 shows the system providing and/or removing a keyboard in response to a motion-based gesture, according to one embodiment.

FIG. 11 shows the system providing and/or removing a keyboard in response to a motion-based gesture, according to one embodiment. In an embodiment, the system may provide a virtual keyboard on an interface of a user device in response to detecting a motion-based gesture. For example, if a user holding the user device motions a wrist forward away from their body while viewing an interface for composing, replying to, or forwarding email, the keyboard for the user device visible to user onscreen may be displayed with an animation and focus of the cursor may be put into the first blank field starting from the top. The animation may include the keyboard scrolling into view from a bottom of the screen. In another example, if a user holding the user device motions a wrist back towards their body in a gesture while viewing an interface for composing, replying to, or forwarding email, the keyboard for the user device visible to user onscreen may be hidden with an animation. The animation may include the keyboard scrolling down out of view of the screen.

Figure 12A:
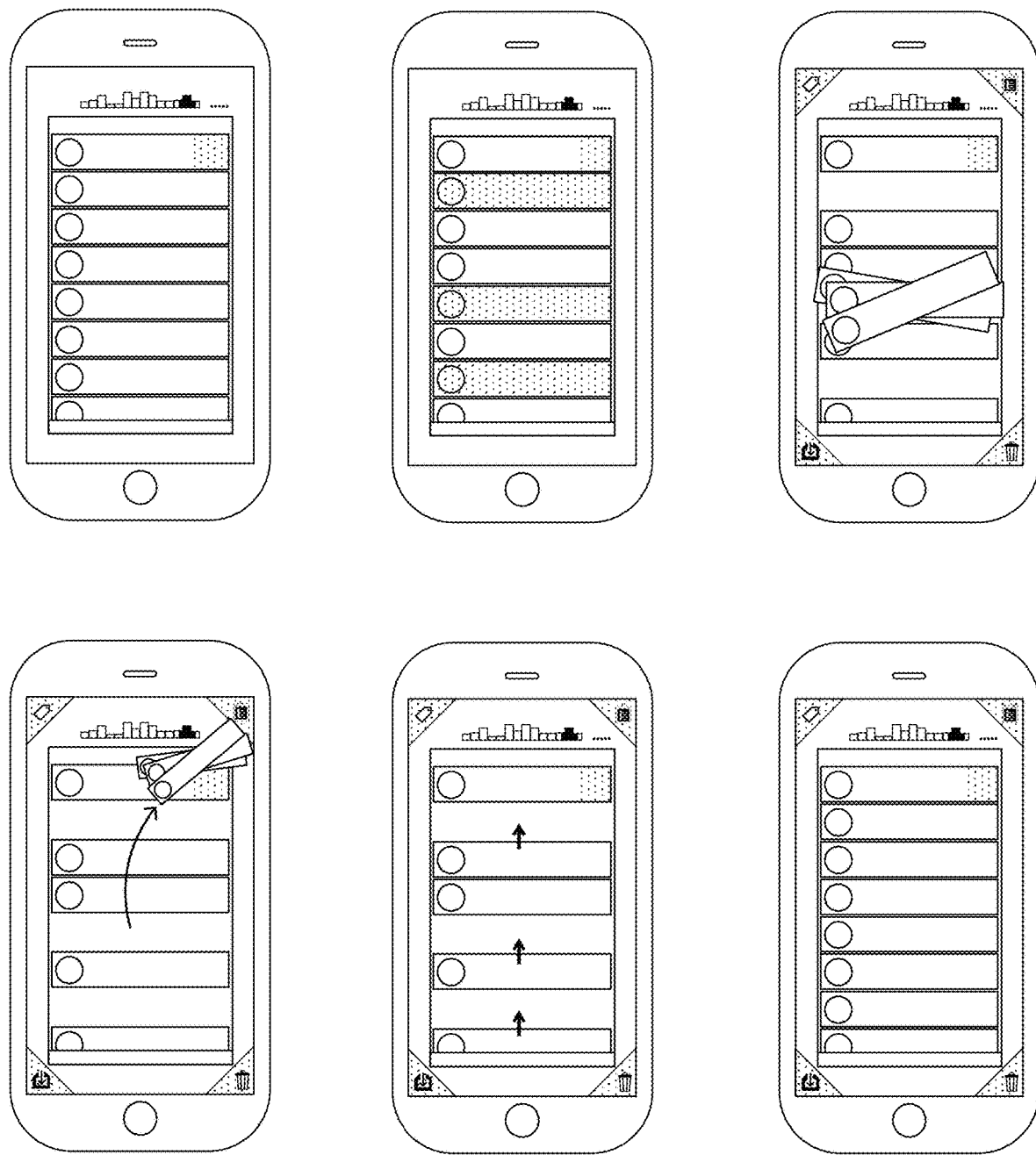
FIGS. 12A-12B show the undo feature, according to one embodiment.
Figure 12B:
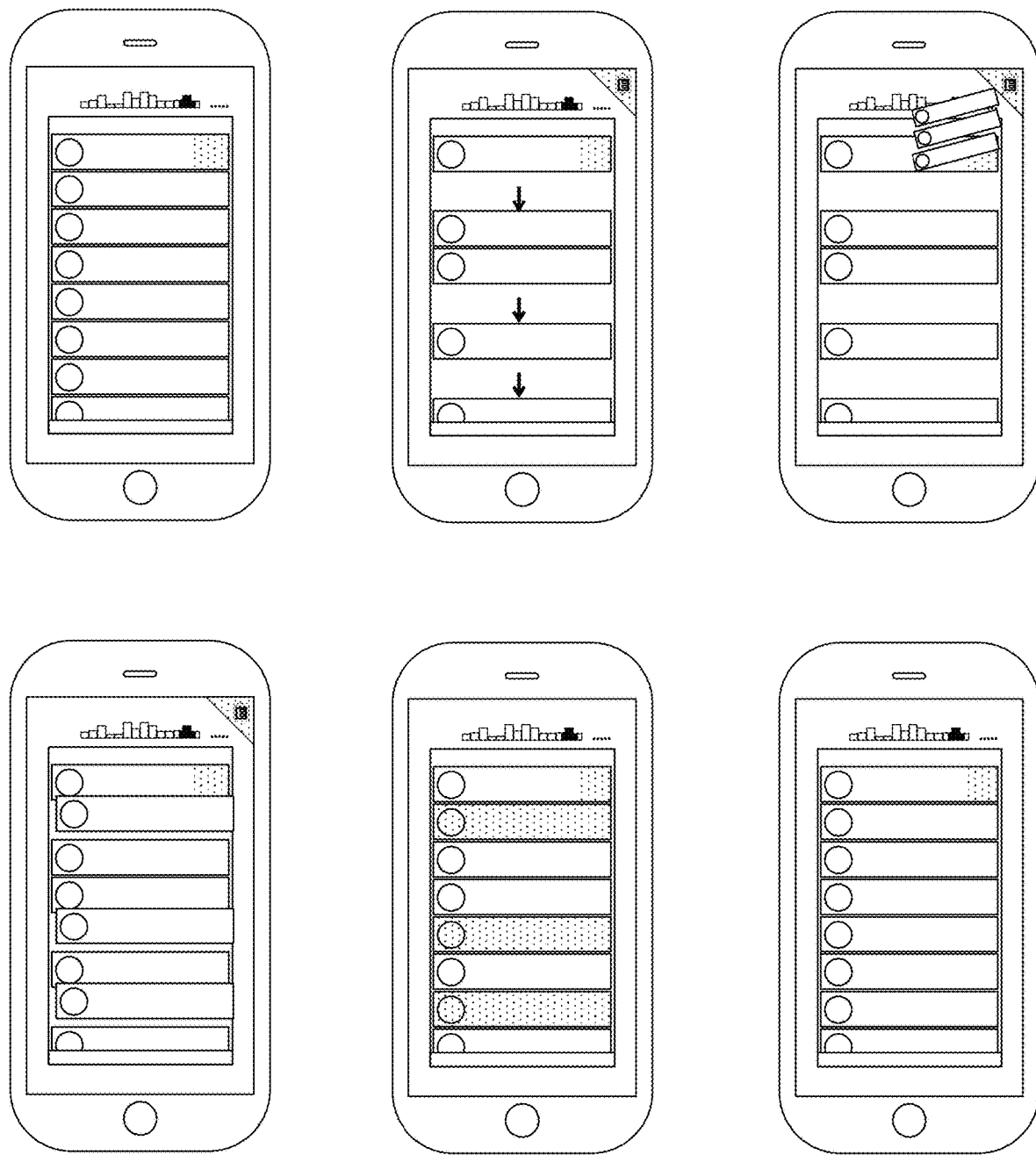

FIGS. 12A-12B show an undo feature, according to one embodiment. In an embodiment, the system may include an undo feature to reverse one or more email management features. For example, a user may pick up individual emails or multiple emails and toss them to a corner to label, archive, delete, move, or take another action. The system may track the email management features utilized. The user may provide an input for the undo feature by, for example, selecting an undo icon or providing a motion-based gesture (e.g., shaking the user device). Undoing an action may apply to a last email management feature or a plurality of prior email management features performed by the system. A user may utilize the undo feature to correct mistakes including, for example, reclassifying emails to a new location or leaving emails in their original position within the main interface.

Figure 13A:
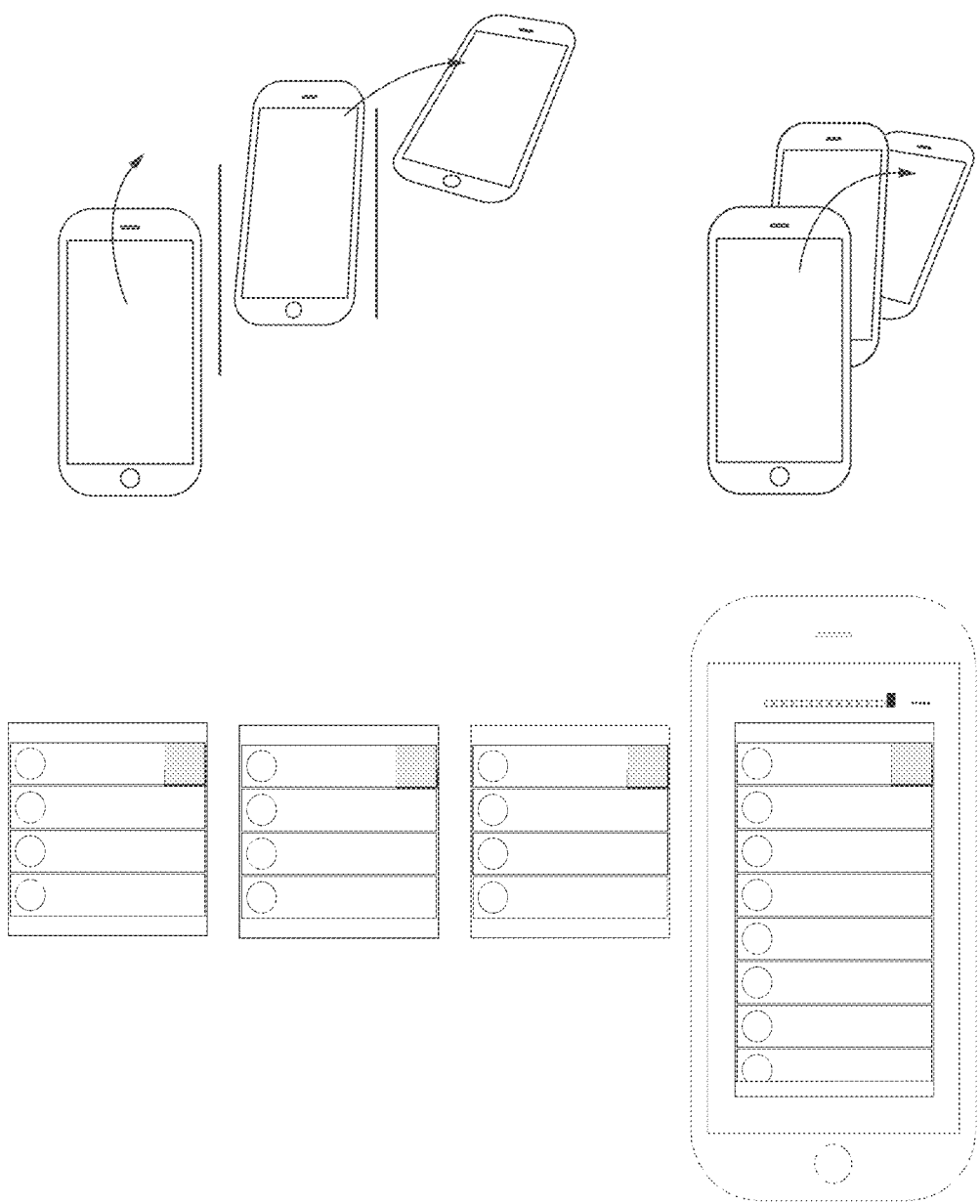
FIGS. 13A-13B show a "fishing pole" gesture to display an oldest or more recent time period, according to one embodiment.
Figure 13B:
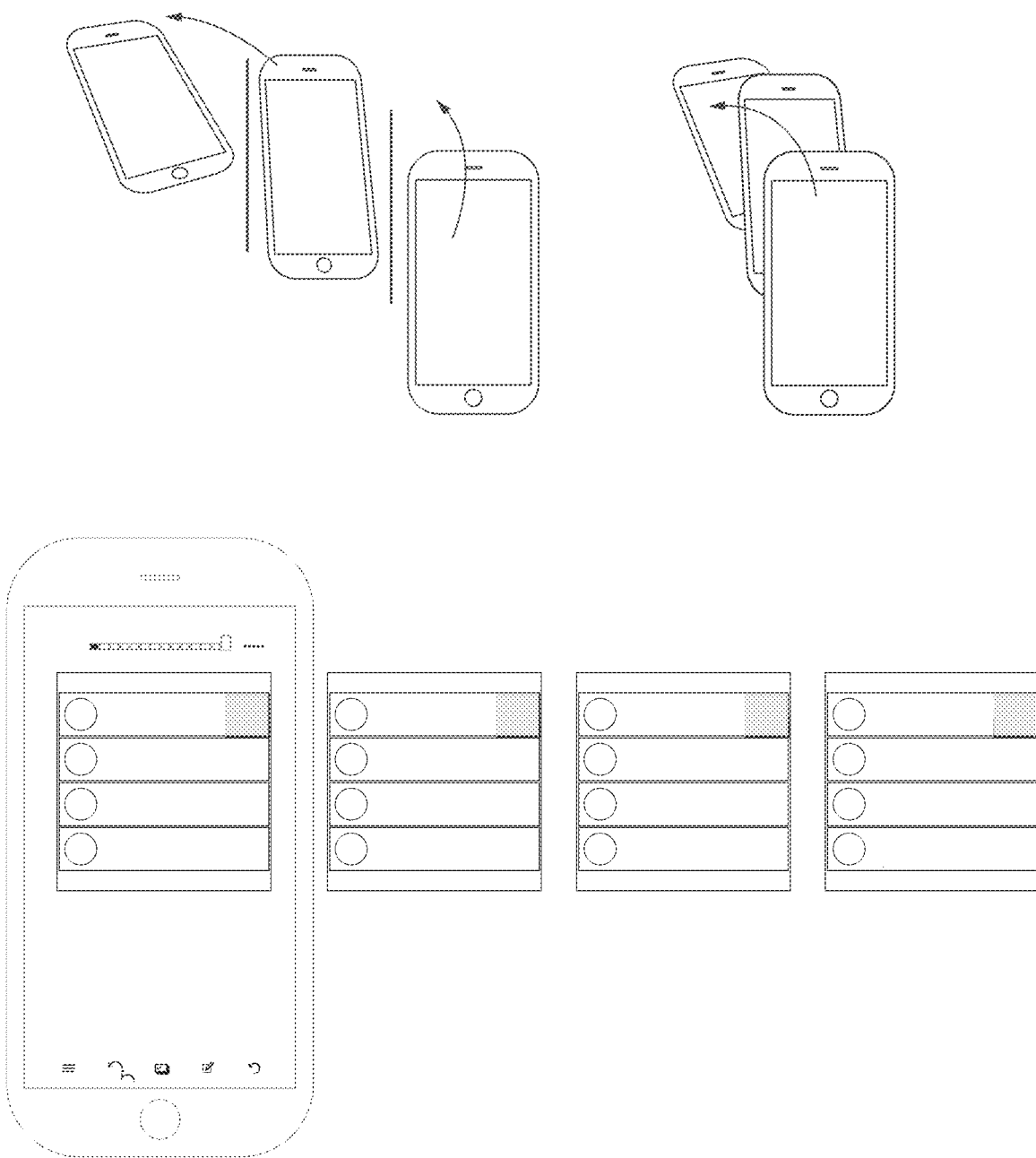

FIGS. 13A-13B show a "fishing pole" gesture action to end or being a timeframe, according to one embodiment. In an embodiment, the ability of a user to move not just by individual time periods but to move their horizontal timeline interface to the end or beginning of the time period represented by the histogram. In a diagonal motion gesture where the user moves his wrist forward and to the right or left as detected by the motion sensors, the user interface is animated and shifts to either the beginning or end of the current email columns represented by the timeline based on the direction being oriented more to the right or left at the ending point of the user hand movement.

Figure 14:
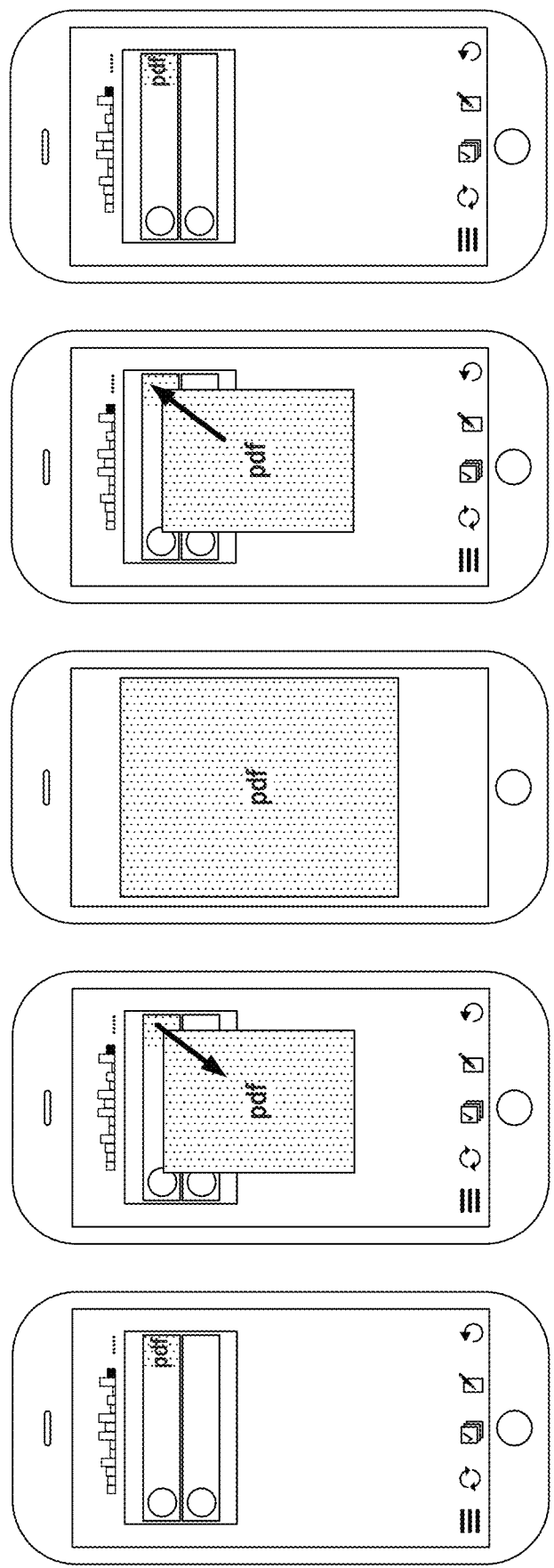
FIGS. 14-15 show how an image preview and/or a document preview and/or an audio or video content preview may be surfaced in a main interface without having to open an email, according to one embodiment.
Figure 15:
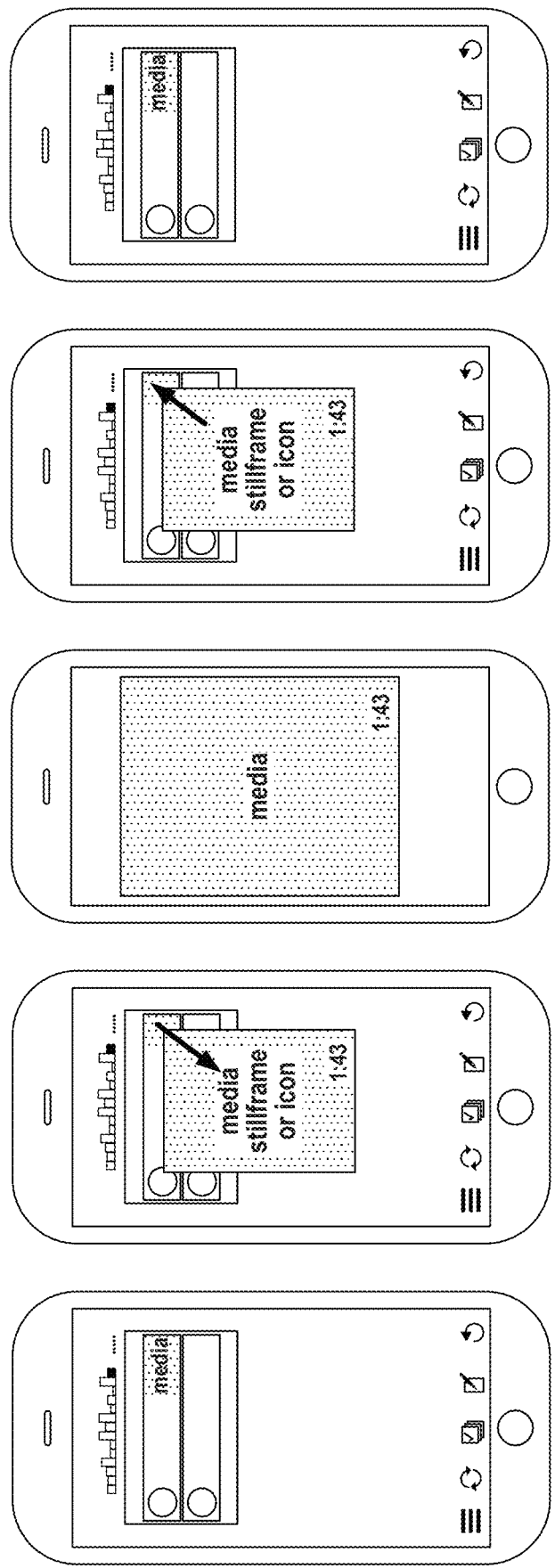

FIGS. 14-15 show how image and document previews are surfaced in main interface without having to open an email, according to one embodiment.

FIG. 14 shows the ability of a user to see a preview visualization of one or more document and image previews within the main interface without first opening an email first. The preview visualization can also be interacted with through a gesture touch on the screen to open a full size of the attachment in question, whether it is an image, a pdf, a word document, or any other file type. This surfacing of attachment content is a unique way for users to get access to potentially important visual information or documents more directly from within an email or to determine which emails might be of most interest for interacting with first.

FIG. 15 shows the ability of the user to see a preview visualization of other media parsed out of links within the body of an email in this example showing a YouTube® video which can be interacted with and opened directly without opening the email and tapping any additional links. This surfacing of media content is a unique way for users to get access to potentially important or entertaining information more directly from within an email or to determine which emails might be of most interest for interacting with first.

Figure 16:
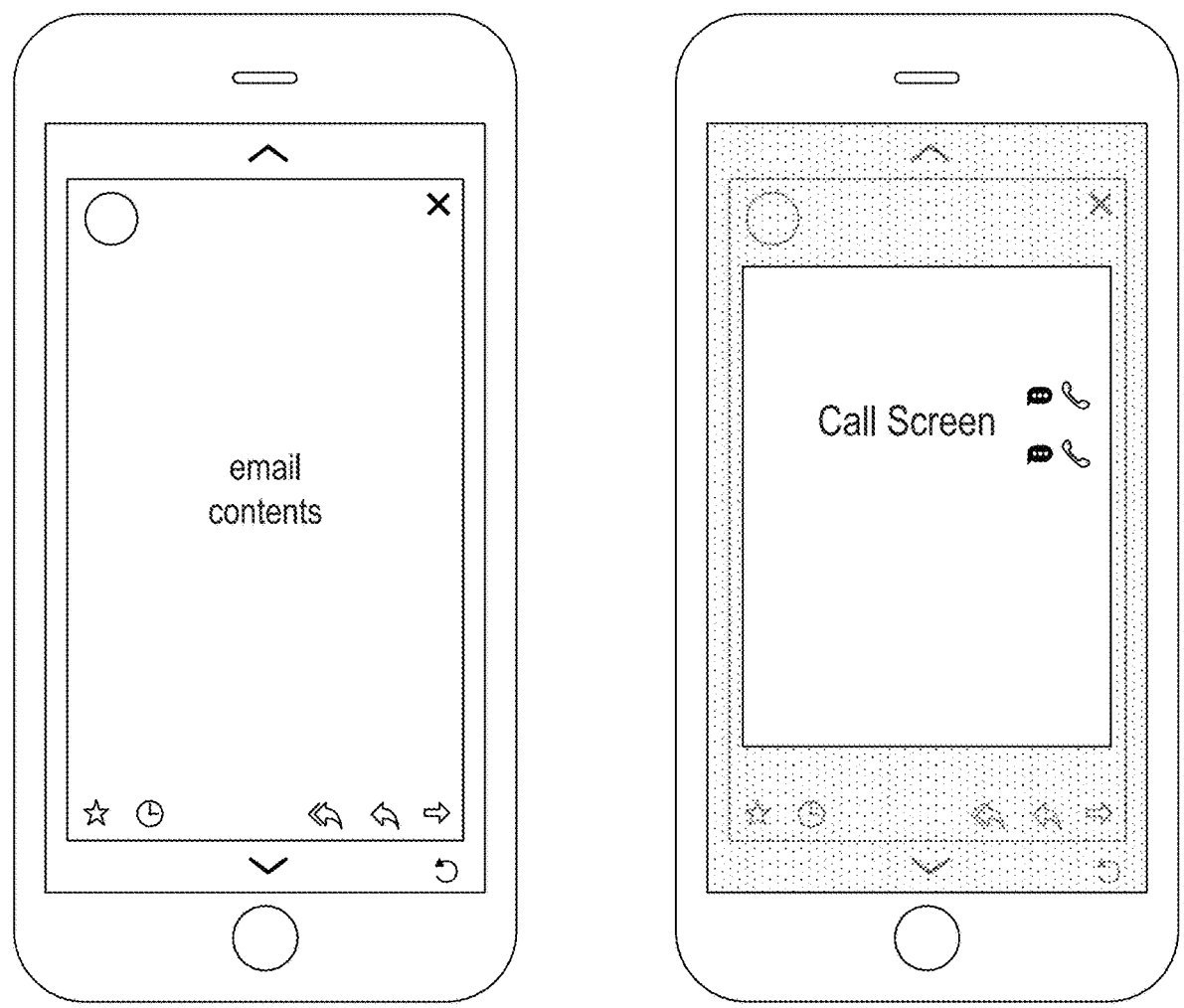
FIG. 16 shows a popup for contact information which may allow a prompt communication to another user, according to one embodiment.

FIG. 16 shows a popup for contact information which may allow a prompt text message or call, according to one embodiment. In an embodiment, the ability of users to quickly get to the contact details for all recipients and/or senders of an email thread and to initiate a mobile phone call or text message from directly within the application.

Figure 17A:
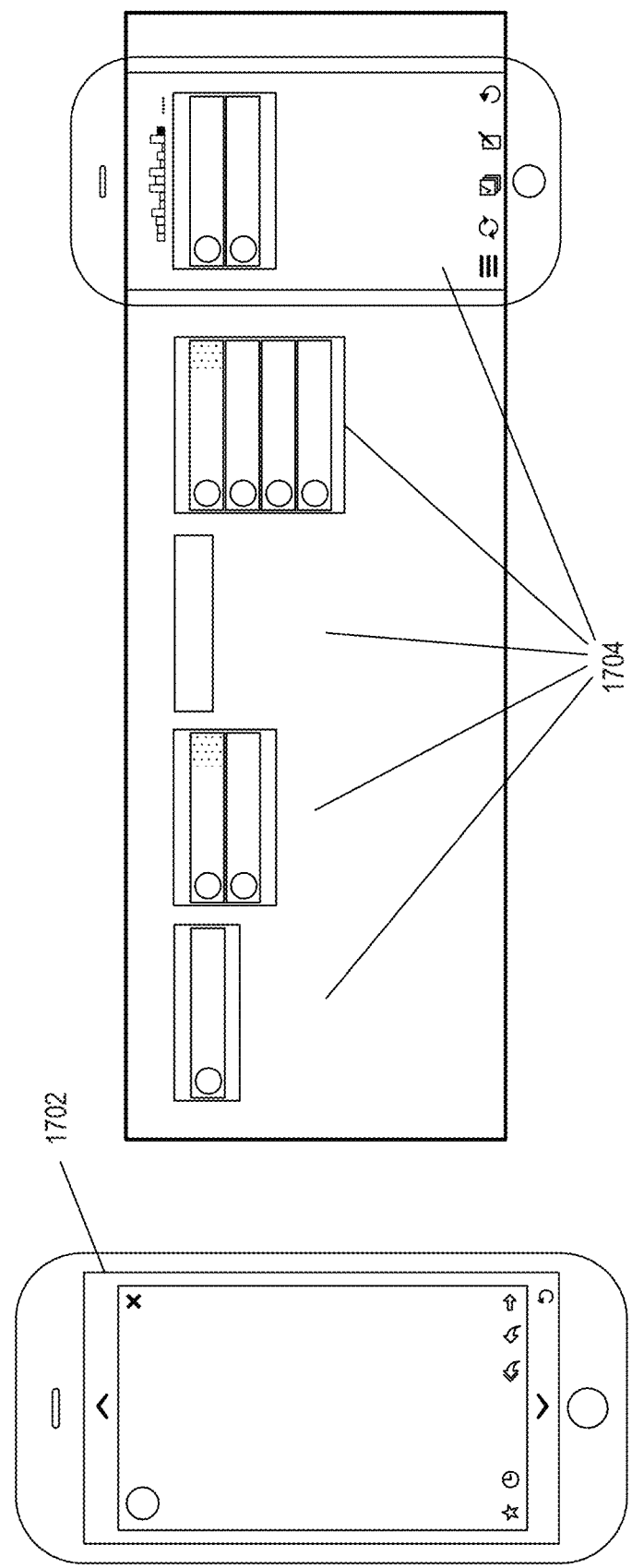

FIGS. 17A-17B show a view emails from a sender feature and a view attachments from a sender feature, respectively, according to an embodiment. In an embodiment, the view emails from the sender feature may be provided if a user selects a particular sender. The system may allow the user to see the emails on a timeline interface with each column representing a specific time period or may allow the user to see them in single vertical chronological list. For example, if a user selects a favorite user, emails sent from the favorite user may be provided in the horizontal timeline. In another example, if a user selects a sender of an email (e.g., the sender "Erik Lucas" visible in screen 1702), the system may generate and provide a horizontal timeline of emails from the sender (e.g., the horizontal timeline 1704).

In an embodiment, the view attachments from the sender feature may be provided if a user selects a particular sender. The system may allow the user to browse, reorganize, and filter by attachment type if desired. For example, if a user selects a favorite user, attachments included in emails sent from the favorite user may be provided in the horizontal timeline. In another example, if a user selects a sender of an email the user is viewing, the system may generate and provide a attachments included in emails from the sender. The user may have the ability to select with either gestures or touch screen interactions which attachments they would like to view in full format and then have that file displayed. Users may be able to edit a document and reply with an edited or version and also may forward or send the email to another contact or contacts. Examples of some files types which a user will see from contacts with the all attachments from sender feature are MS Word documents, PDFs, MS Excel files, Video Files with screencap preview, Text files, Html files, Images, Icons, MS Powerpoint, etc.

Figure 18:
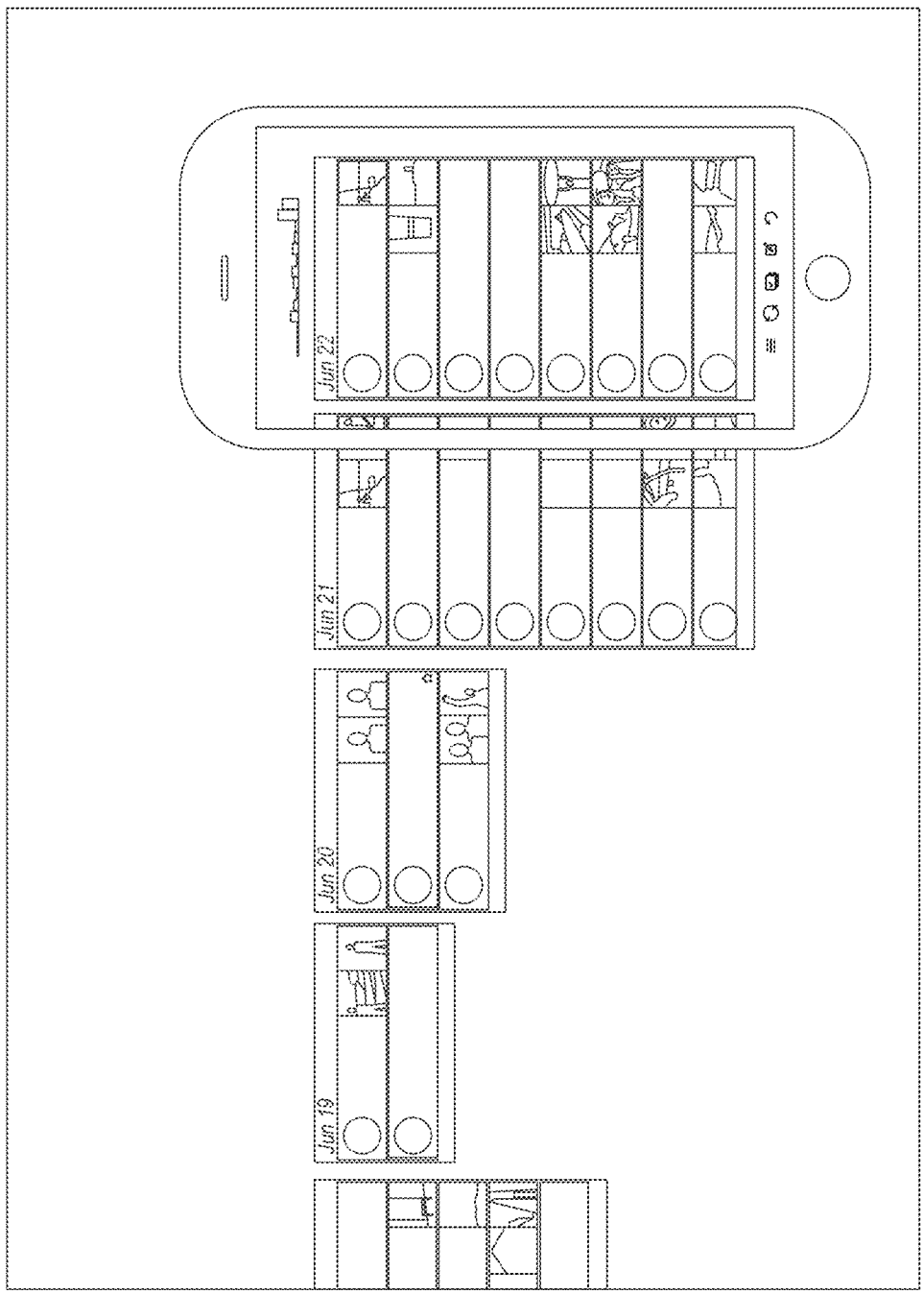
FIG. 18 is an illustration of a horizontal timeline, according to one embodiment.

FIG. 18 is an illustration of the horizontal timeline interface, according to one embodiment. The horizontal timeline interface is an example of a horizontal timeline interface as described with reference to FIGS. 2A-2D.

FIG. 19 is an illustration of sorting a plurality of email tiles into any of four triage corners, according to one embodiment. Although four triage corners are illustrated, embodiments include having no triage corners, having one triage corner, and having more than one triage corner. The triage corners may function, for example, as described with reference to FIGS. 3A-3E.

Figure 20:
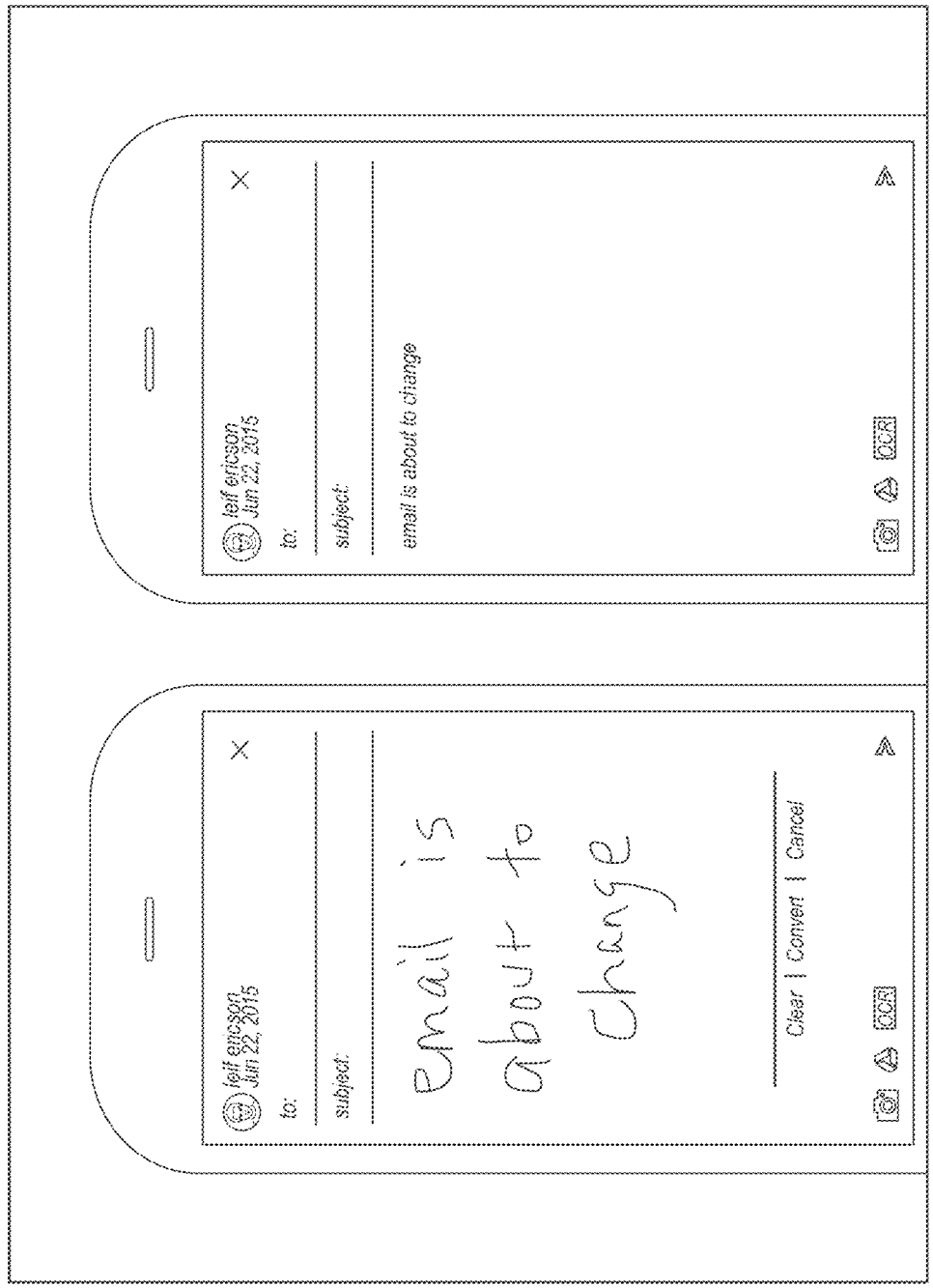
FIG. 20 is an illustration of the optical character recognition, according to one embodiment.

FIG. 20 is an illustration of the optical character recognition, according to one embodiment. The system receives a handwritten text input, such as alphanumeric characters, from the user. According to one embodiment, the user may input the text with a finger. The system may convert the hand writing into a typed message. In an embodiment, the system may analyze the handwritten message by identifying segments of inputs and determine a correlation between the identified segments and alphanumeric characters. An input segment may be, for example, a portion of an input physically separated from other portions of an input (e.g., a space exists between the portion and other portions), a portion of an input temporally separated from other portions of an input (e.g., the portion is input in a first time period and other portions are input in a second time period), or a combination thereof. Identified input segments may be analyzed by utilizing, for example, a matching algorithm to determine a correspondence between, for example, a first input segment and a first alphanumeric character (e.g., the letter "e"). An alphanumeric character having a greatest determined correlation may be included in an email as text.

Figure 21:
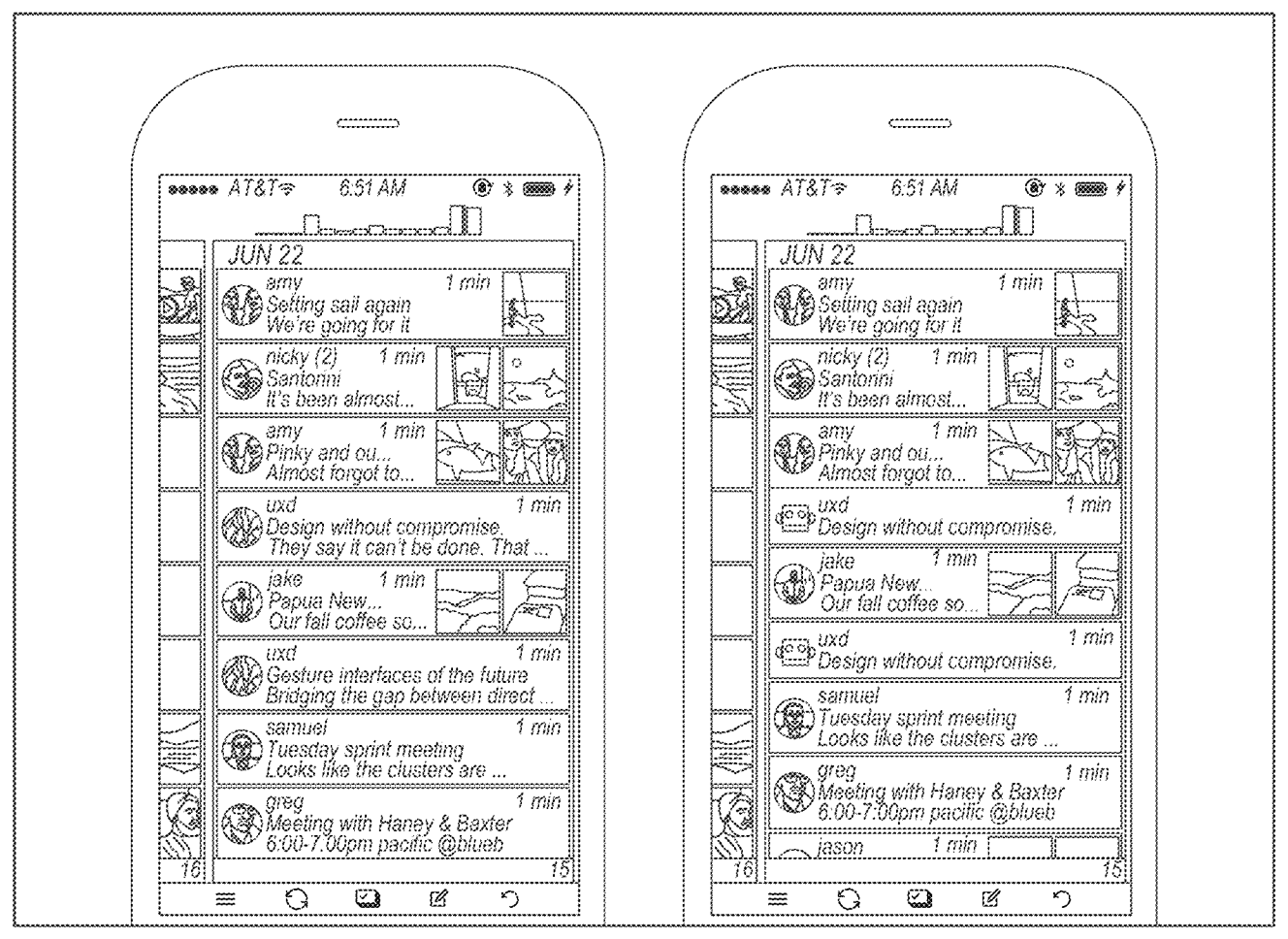

FIG. 21 is an illustration of displaying emails based on priority, according to one embodiment. According to one embodiment, the system prioritizes email based on a sender type, such as whether the sender is associated with a person or a robot. The system may automatically detect whether the sender is a person, or whether the message is automatically generated. The system may associate a distinctive image with the messages that are automatically generated. According to one embodiment, the image representing a robot head may be included in emails associated with emails being automatically generated. The user may identify which email messages are automatically generated based on a provided image (e.g., the robot head), and therefore identify the email as lower priority. According to another embodiment, the system may automatically display the lower priority messages at the bottom of the list of daily emails, or the system may omit the lower priority messages from the list of daily emails. In addition, the system may exclude the number of lower priority messages from the histogram count.

Figure 22:
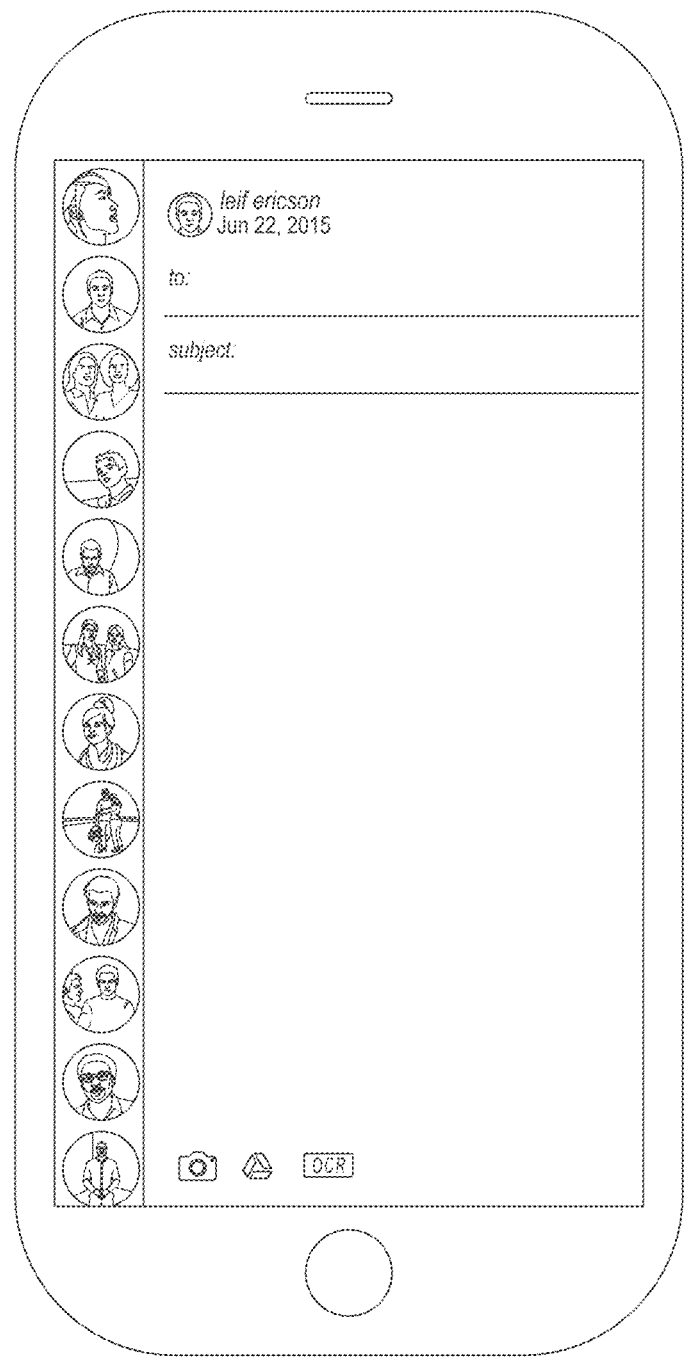
FIG. 22 is an illustration of displaying favorite email contacts, according to one embodiment.

FIG. 22 is an illustration of displaying favorite email contacts, according to one embodiment. If a user is composing an email and before the user enters the email address associated with a recipient, the system displays a list of images associated with the user's frequent email contacts. The system may receive a gesture-based input from the user selecting an image associated with a user's frequent contact. The gesture-based input may be, for example, pressing and dragging the selected image to the email field associated with the recipient address. In another example, if a pointer focus is within a to/cc/bcc field, the gesture-based input may be touching an icon photo of a favorite email contact causing the system to insert an email address associated with the favorite email contact into the to/cc/bcc field. Once the system receives the gesture-based inputs from the user, the system assigns the recipient email address to be the email associated with the selected image.

Figure 23:
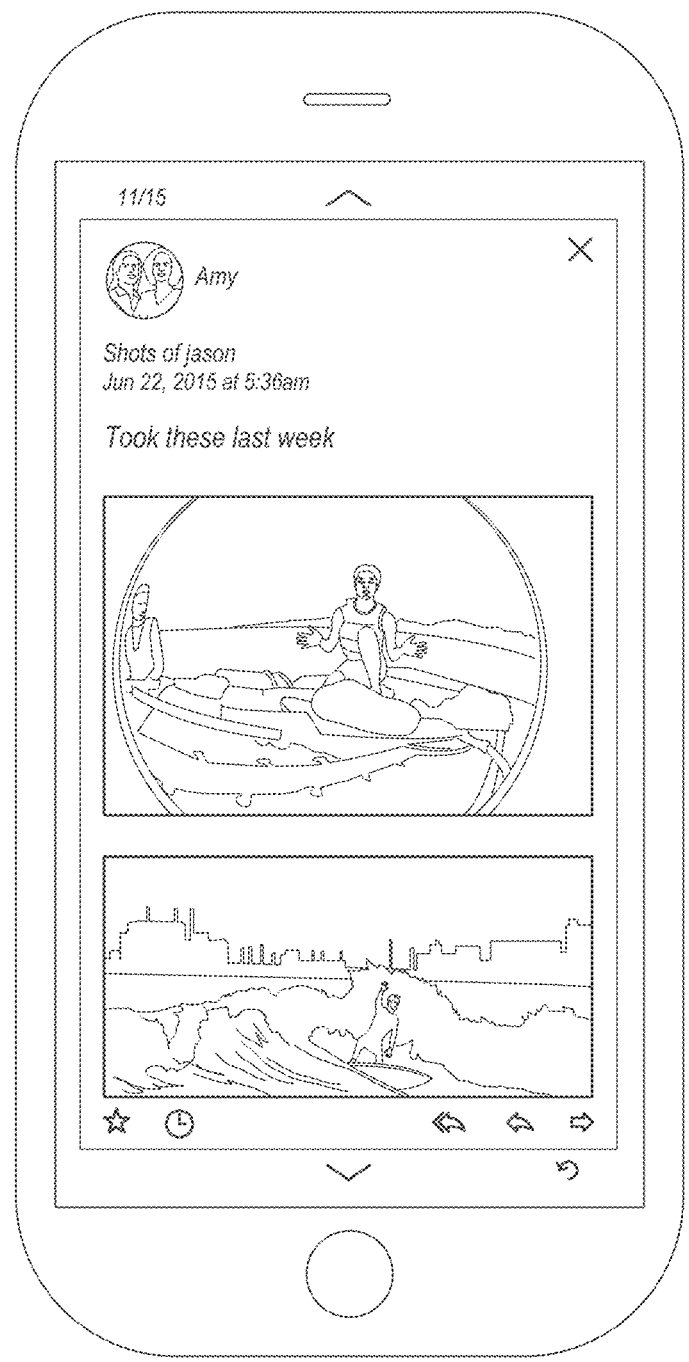
FIG. 23 is an illustration of a motion-based gesture, such as tilting, for browsing through emails, according to one embodiment.

FIG. 23 is an illustration of a motion-based gesture, such as tilting, for browsing through emails, according to one embodiment. The system receives a gesture-based input from the user, and based on that input scroll forward or backward through the list of emails. For example, the gesture may be tilting the device forward to scroll forward; or tilting the device backward to scroll backward through the list of emails.

Figure 24:
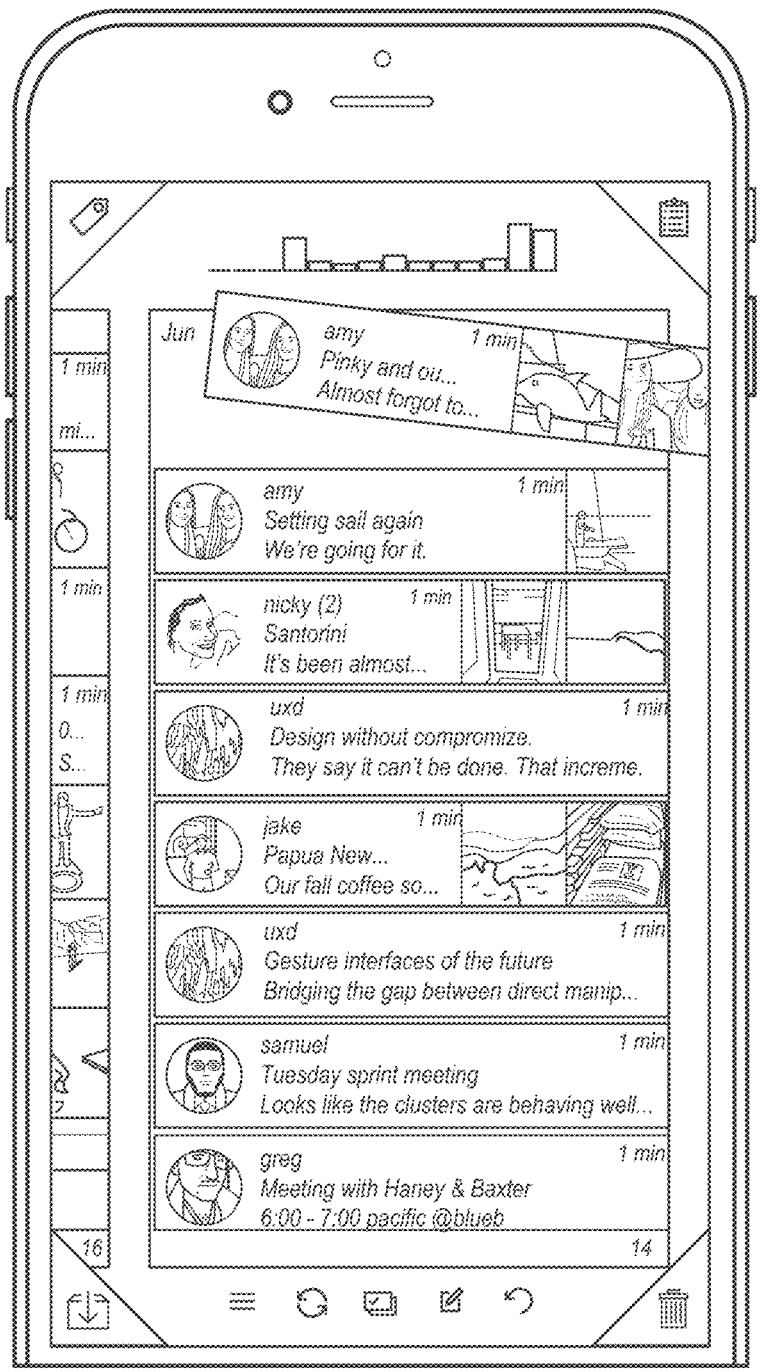
FIGS. 24-25 are an illustrations of a gesture for organizing emails, according to one embodiment.
Figure 25:
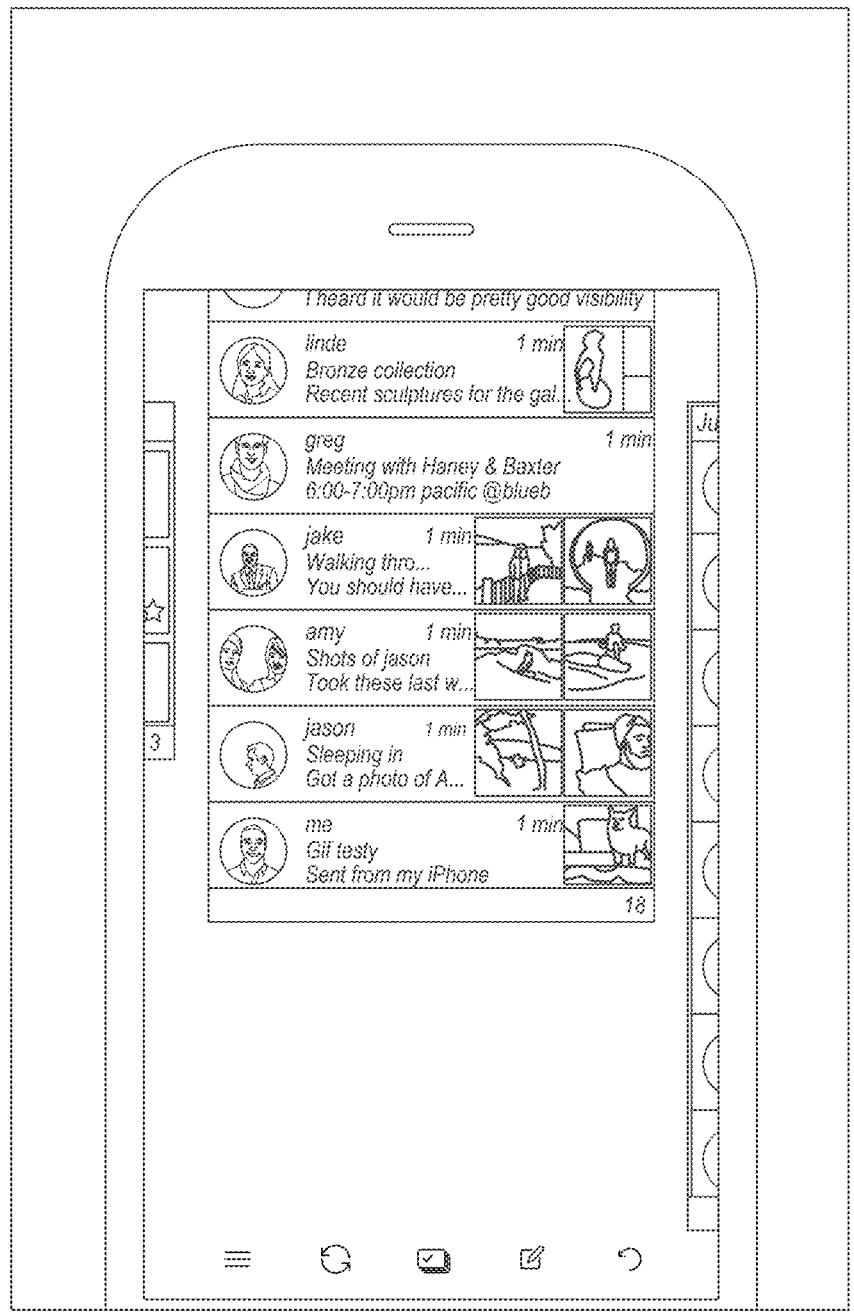

FIGS. 24-25 are an illustration of a gesture for organizing emails, according to one embodiment. The system receives an email selection from the user, such as if the user presses on an email message. The system receives a gesture-based input from the user, placing the email into one of the screen corners associated with the device. The gesture may include the user dragging the selected email to one of the screen corners, or the user tilting the device towards one of the screen corners. Once the system receives the input, the system performs the function associated with the icon displayed in the selected screen corner. The function performed may include, for example, deleting an email, including the email in a folder, favoriting the email, labeling the email, archiving the email, adding the email to a to-do list, marking the email as read, replying to the email, forwarding the email, saving an attachment in the email, or other email actions.

According to another embodiment, the gesture-based input from the user for organizing emails may include sliding the entire daily email list up on the device screen, in order to archive the entire daily email list.

Figure 26:
FIG. 26 is an illustration of adding text or notes to an image, according to one embodiment.

FIG. 26 is an illustration of adding text or notes to an image and/or document, according to one embodiment. The system receives a typed input, or a hand written input (such as a writing, or a scribble) from the user. The system also receives a selection of an image from the user. The system associates the image and the typed or handwritten input, and displays the image overlaid with the user notes. The system stores the overlaid image or annotated document.

Figure 27:
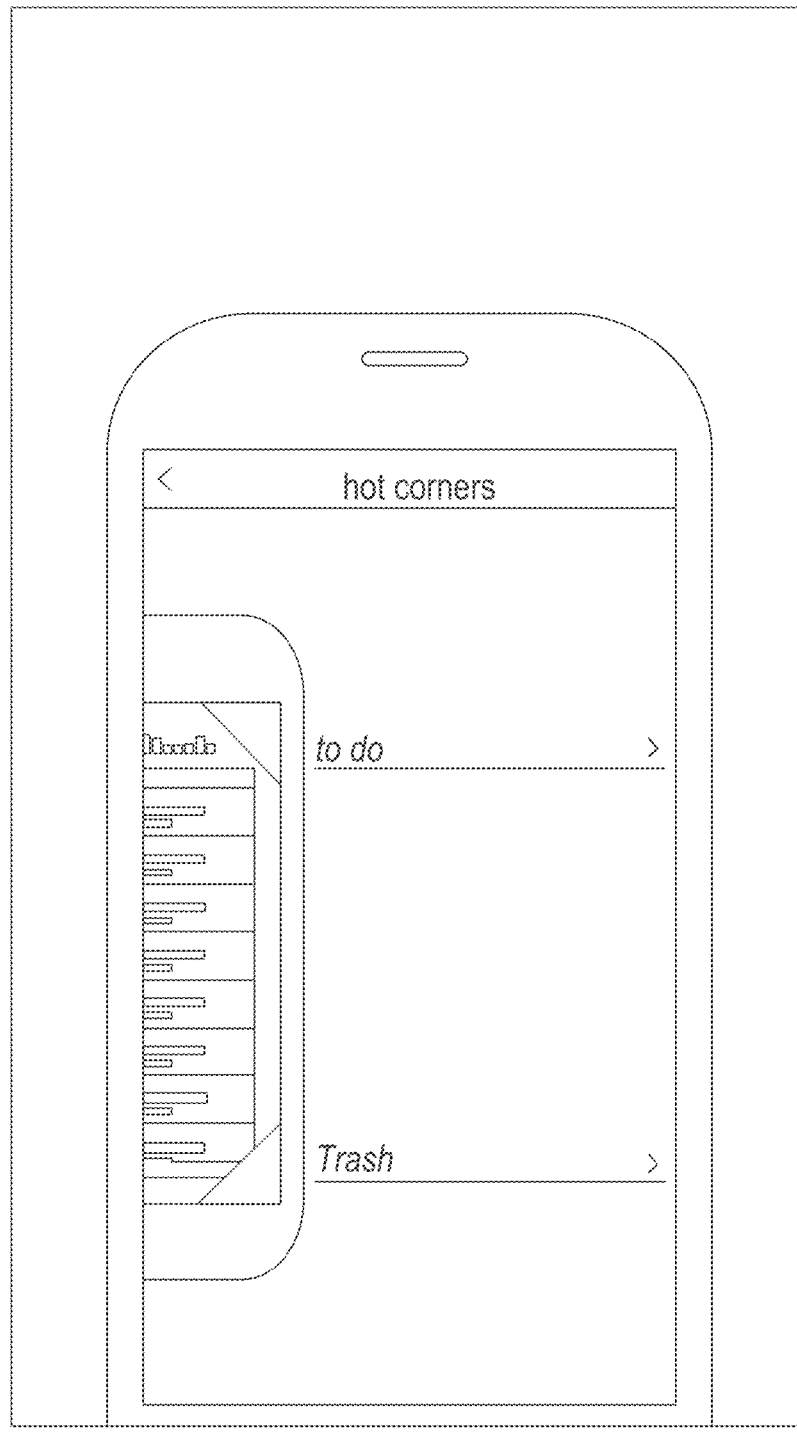
FIG. 27 is an illustration of customizing the hot corners, according to one embodiment.

FIG. 27 is an illustration of customizing the hot corners, according to one embodiment. The system receives an input from the user associating a particular folder, or a particular action with a screen corner. The particular folder may be an email folder, or a folder associated with the device. The particular action may be reply to an email, reply all to an email, forward an email, save all attachments associated with an email, or other email actions.

Figure 28:
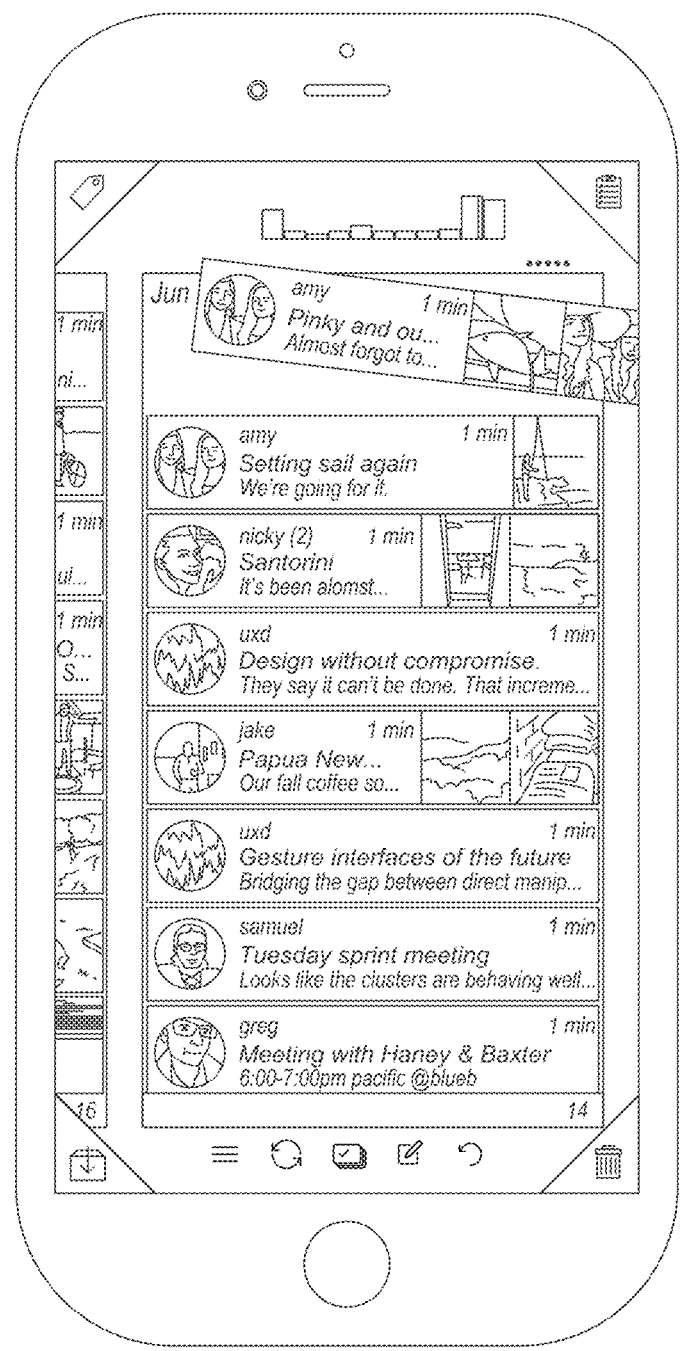
FIG. 28 is an illustration of the system main user interface, according to one embodiment.

FIG. 28 is an illustration of the system main user interface, according to one embodiment. The system displays attachment previews in the daily email list. If the user selects an attachment preview, the system displays the attachment without opening the email.

Figure 29:
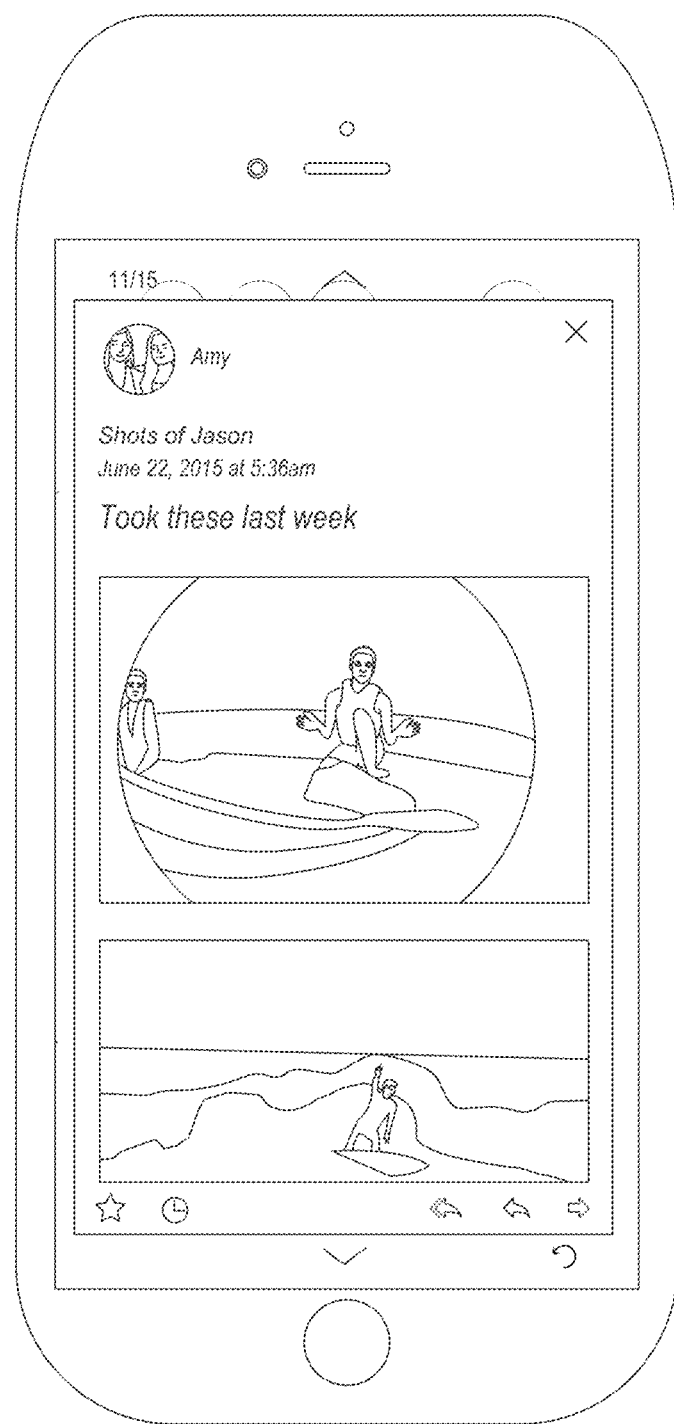
FIG. 29 is an illustration of the system user interface for reading an email, according to one embodiment.

FIG. 29 is an illustration of the system user interface for reading an email, according to one embodiment. If the system is displaying an email for reading, the system displays the email position in the daily email list on the screen, such as 11/15, meaning the displayed email is the 11th email out of 15 emails received on that time period. The system displays attachments so that the attachments fit on the device screen. The system receives gesture-based inputs from the user to organize email. For example, if the system receives a left wrist flick gesture, the system archives the email. If the system receives input comprising the user grabbing an email by the subject and dragging it to one of the screen corners, the system performs the function associated with the selected screen corner.

Figure 30:
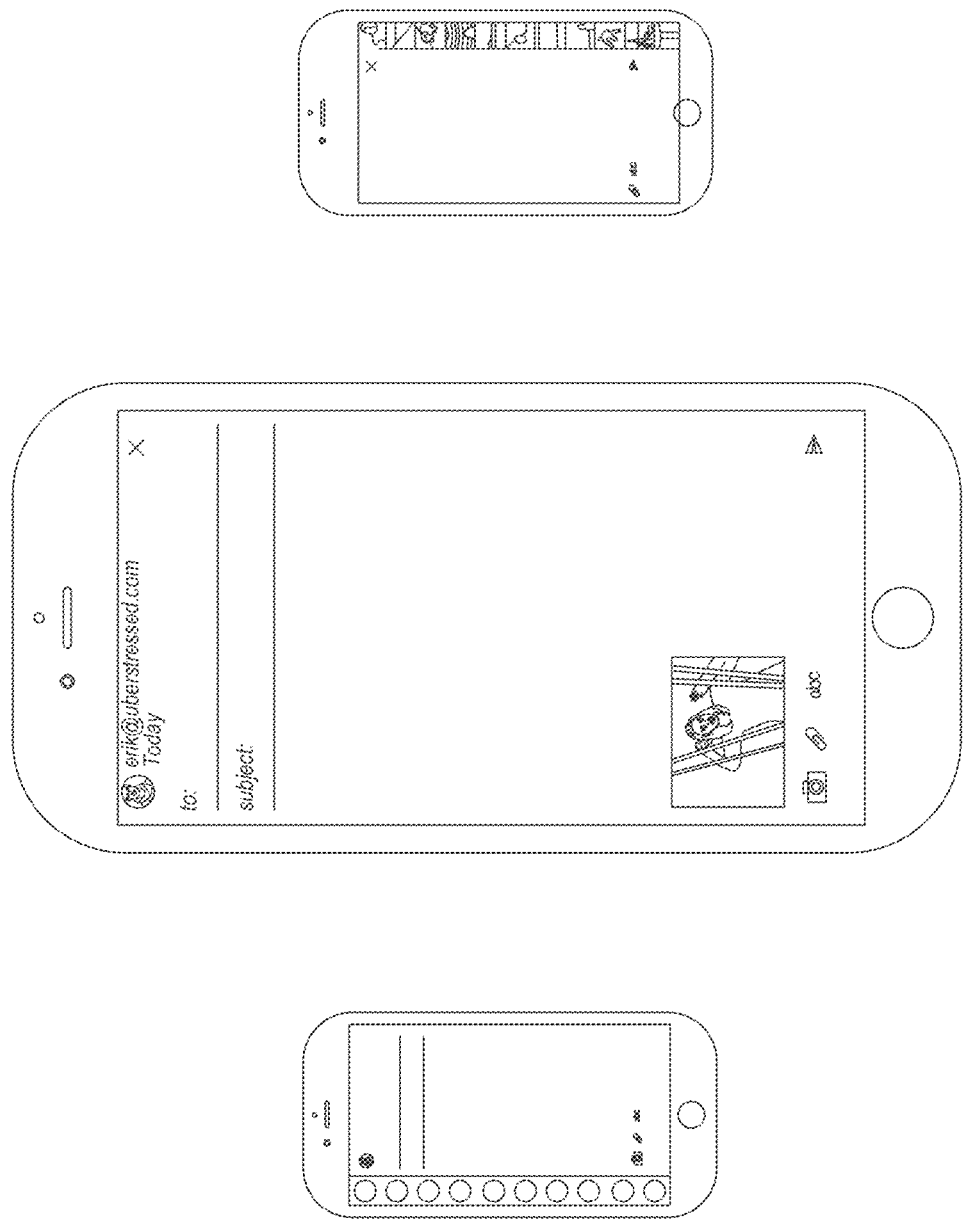
FIG. 30 is an illustration of the system user interface for composing an email, according to one embodiment.

FIG. 30 is an illustration of the system user interface for composing an email, according to one embodiment. If the system is receiving an input from the user for composing an email, the system may receive gesture-based inputs from the user to display a VIP contact, or to display recent photos. The VIP contact may be a frequent contact or a contact that the user places on the VIP contact list. For example, the system receives an input that the user has slid the screen from left to the right, the system displays a list of images associated with the user's frequent contacts. If the system receives an input that the user has slid the screen from right to the left, the system displays a list of recent photos. If the system is receiving an input from the user for composing an email, the system displays several icons with corresponding functions: an icon for attaching photos associated with the device, an icon for adding photos associated with a cloud service such as iCloud®, Dropbox®, Google Drive®, an icon for quick handwriting conversion, etc. The system may receive a gesture-based input to allow the user to annotate an email photo attachment. For example, if the system receives an input from the user consisting of tapping a photo attachment, the system displays the photo attachment, and allows the user to annotate it.

Figure 31:
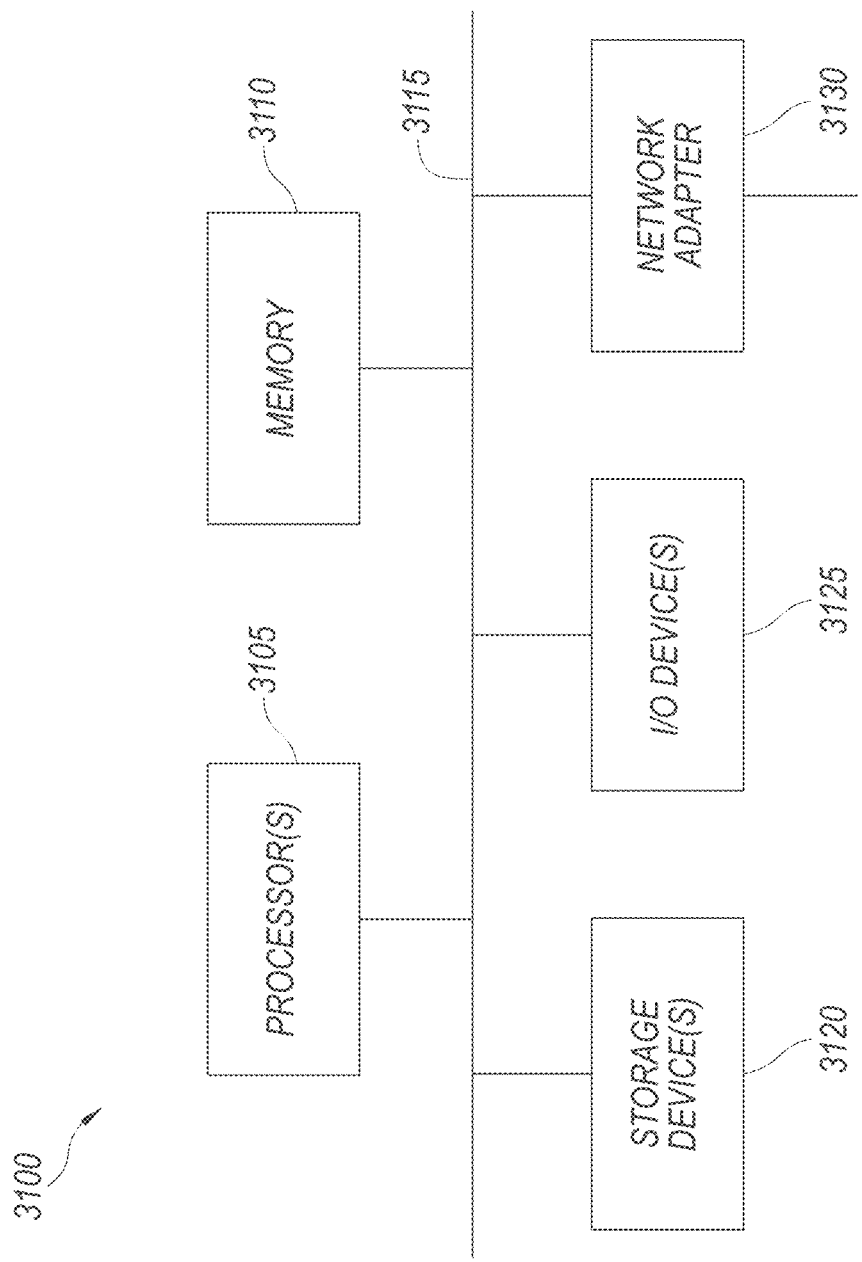
FIG. 31 is a block diagram of a computer system as may be used to implement certain features of some of the embodiments.

FIG. 31 is a block diagram of a computer system as may be used to implement certain features of some of the embodiments. The computer system may be any user device such as a mobile device, a tablet PC, a personal digital assistant (PDA), a cellular telephone, an iPhone, an iPad, a Blackberry, a processor, a telephone, a web appliance, a console, a hand-held console, a (hand-held) gaming device, a music player, any portable, mobile, hand-held device, wearable device (e.g., a watch), or a machine equipped with motion detection technology (e.g., a gyroscope, accelerometer, a plurality of motion sensors, etc.) and capable of executing a set of instructions (sequential or otherwise) that specify actions to be taken by that machine. In an embodiment, the computer system may be a virtual reality adaption of the system described herein. For example, a user's motions may be detected and correlated with a virtual representation of the interface described herein provided to a user.

The computing system 3100 may include one or more central processing units ("processors") 3105, memory 3110, input/output devices 3125 (e.g., keyboard and pointing devices, touch devices, display devices), storage devices 3120 (e.g., disk drives), and network adapters 3130 (e.g., network interfaces) that are connected to an interconnect 3115. The interconnect 3115 is illustrated as an abstraction that represents any one or more separate physical buses, point to point connections, or both connected by appropriate bridges, adapters, or controllers. The interconnect 3115, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 3194 bus, also called "Firewire".

The memory 3110 and storage devices 3120 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media may include computer-readable storage media (e.g., "non-transitory, media) and computer-readable transmission media.

The instructions stored in memory 3110 may be implemented as software and/or firmware to program the processor(s) 3105 to carry out actions described above. In some embodiments, such software or firmware may be initially provided to the processing system 3100 by downloading it from a remote system through the computing system 3100 (e.g., via network adapter 3130).

The various embodiments introduced herein may be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Figure 32:
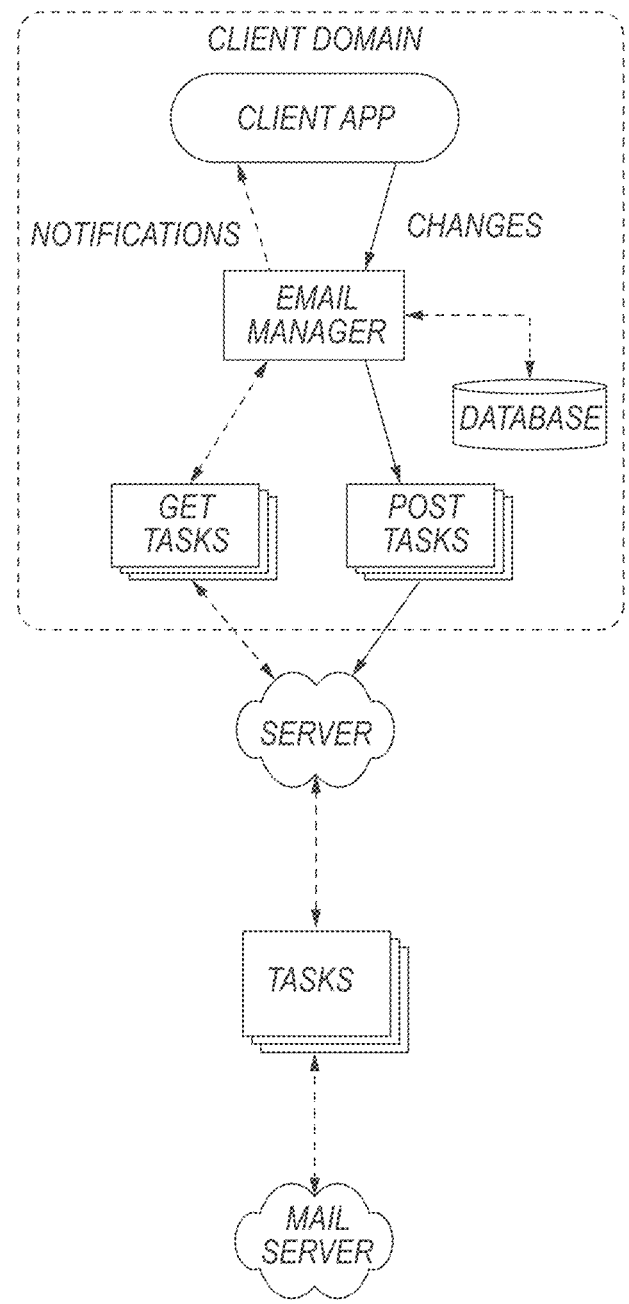
FIG. 32 is a block diagram illustrating an abstracted architecture of the system, according to one embodiment.

FIG. 32 is a block diagram illustrating an abstracted architecture of the system, according to an embodiment. In an embodiment, the system may include a remote server for facilitating communication between a client domain and an email server (e.g., mail server). The client domain may be configured to execute one or more processes via a local processor (e.g., the one or more processors 3105 of FIG. 31). For example, the client application may receive notifications from an email manager and provide changes to the email manager. The email manager may store data associated with one or more emails in a local database. The email manager may receive tasks ("GET Tasks") from a remote server and transmit tasks ("POST Tasks") to the remote server. The remote server may communicate with a mail server by, for example, receiving and/or transmitting tasks to the mail server.

Figure 33:
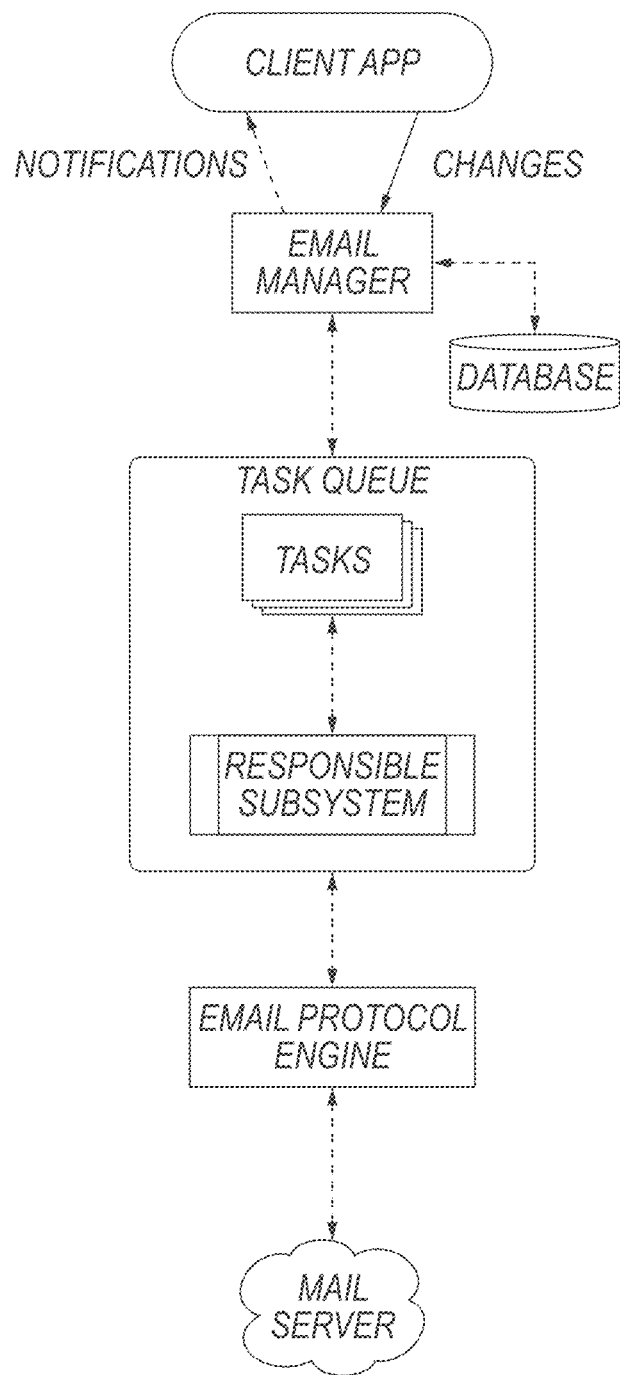
FIG. 33 is a block diagram illustrating an abstracted architecture of the system, according to one embodiment.

FIG. 33 is a block diagram illustrating an abstracted architecture of the system, according to an embodiment. In an embodiment, the system may include a client domain configured to communicate directly with an email server (e.g., mail server). The client domain may be configured to execute one or more processes via a local processor (e.g., the one or more processors 3105 of FIG. 31). For example, the local processor may execute instructions to perform a method for managing a task queue, as described below with reference to FIG. 27. In another example, the client application may receive notifications from an email manager and provide changes to the email manager. The email manager may store data associated with one or more emails in a local database. The email manager may receive and/or transmit tasks (e.g., tasks having valid authorization) in a tasks queue via an email protocol engine to a mail server.

Figure 34:
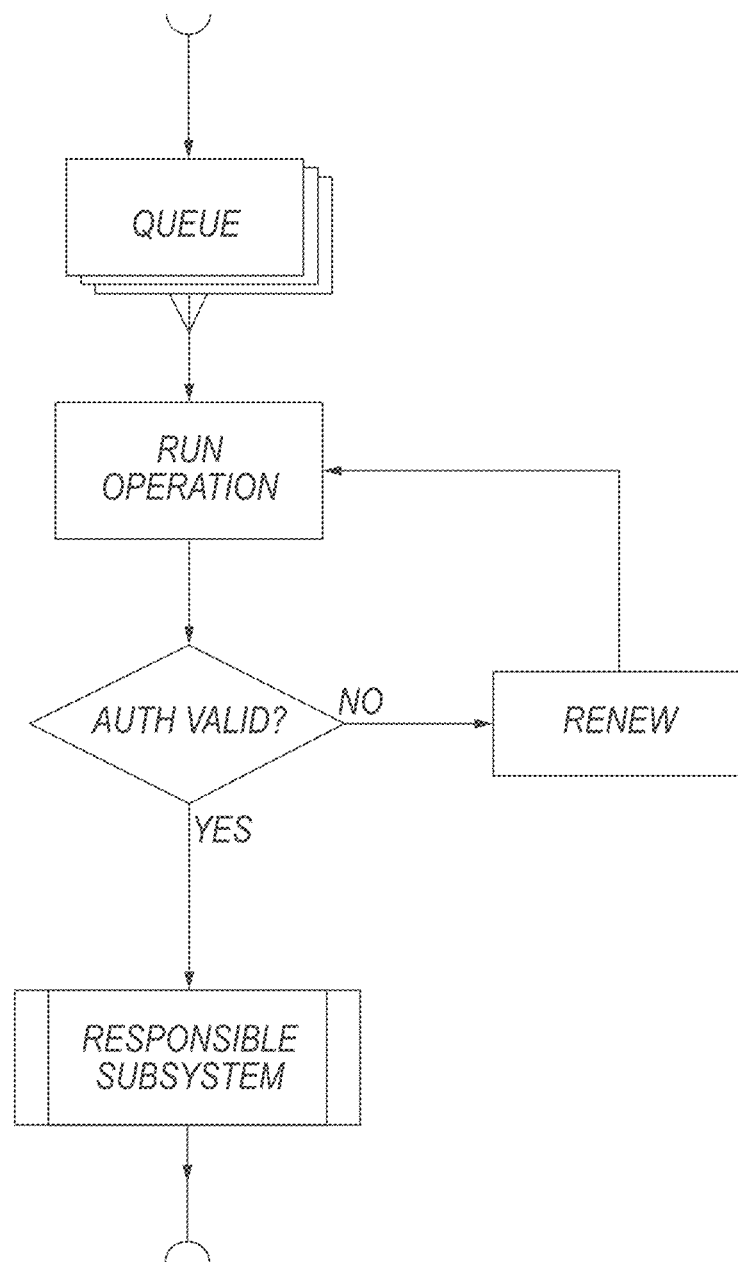
FIG. 34 is a block diagram illustrating a method for managing a task queue, according to an embodiment.

FIG. 34 is a block diagram illustrating a method for managing a task queue, according to an embodiment. One or more tasks may be received from the email manager and maintained in a queue. A local processor (e.g., the one or more processors 3105 of FIG. 31) may run an operation (e.g., by executing instructions stored in a local database) and determine if valid authorization to perform the task is the queue exists. If valid authorization exists, a responsible subsystem may be identified to perform and/or manage the task. For example, a responsible subsystem (e.g., a communication device) may be identified to transmit a message via the email protocol engine to the mail server.

What is claimed is:

1. A method comprising:
causing display of a graphical display on a visual display of a user device, the graphical display being associated with a plurality of electronic messages, each electronic message of the plurality of electronic messages being associated with a time period;
causing display of a first plurality of message tiles in a first vertical list on the visual display of the user device, the first plurality of message tiles being associated with a first portion of the graphical display;
detecting a gesture from a user of the user device while displaying the first plurality of message tiles in the vertical list on the visual display of the user device, wherein the gesture is associated with a sender of electronic messages; and
in response to detecting the gesture, changing the display of the first plurality of message tiles in the first vertical list to display a second plurality of message tiles associated with a second portion of the graphical display,
wherein the second portion of the graphical display is a second vertical list of a plurality of message tiles associated with the sender of electronic messages.

2. The method of claim 1, wherein the gesture includes a touch input on a surface of the visual display.

3. The method of claim 1, wherein the gesture is one of a plurality of gestures, wherein each of the plurality of gestures is associated with one of a plurality of predetermined senders of electronic messages.

4. The method of claim 1, wherein the gesture is associated with a predetermined group of senders of electronic messages.

5. The method of claim 1, wherein the gesture is a first gesture, the method further comprising:
detecting a second gesture from the user of the user device; and
changing the display of the second plurality of message tiles in the vertical list to display to display a third portion of the graphical display.

6. The method of claim 5, wherein the third portion of the graphical display is a list of attachments from the sender of electronic messages.

7. The method of claim 6 further comprising:
detecting a third gesture from the user of the user device; and
changing the display of the third portion of the graphical display to display a preview of the attachments from the sender of electronic messages.

8. The method of claim 1 further comprising:
displaying a first and second histogram associated with the first and second vertical lists, respectively, where an X-axis of the histogram represents a plurality of time periods, and a Y-axis of the histogram represents a number of electronic messages in the plurality of time periods.

9. A method comprising:
causing display of a graphical display on a visual display of a user device, the graphical display including multiple graphical tiles in a particular chronological order, wherein each graphical tile represents an electronic message;
detecting a gesture from a user of the user device while displaying the multiple graphical tiles in a vertical list on the visual display of the user device,
wherein the gesture is associated with any of text, image, and document of one of the multiple graphical tiles; and
in response to detecting the gesture, changing the display of the multiple message tiles in the vertical list to display a preview of the text, image, or document of the graphical tile.

10. The method of claim 9, wherein the gesture includes a touch input on a surface of the visual display.

11. The method of claim 9, wherein the gesture is one of a plurality of gestures, wherein each of the plurality of gestures is associated with one of types of files to be displayed.

12. The method of claim 9, wherein the gesture is a first gesture, the method further comprising:
detecting a second gesture from the user of the user device; and
opening the text, image, or document of the graphical tile being previewed.

13. The method of claim 9, wherein the preview further includes playing a video of the graphical tile in response to detecting the gesture.

14. A non-transitory computer-readable storage medium storing instructions, which, when executed by one or more data processors of a system, cause the system to:
display a graphical display on a visual display of a user device, the graphical display being associated with a plurality of electronic messages, each electronic message of the plurality of electronic messages being associated with a time period;
display a first plurality of message tiles in a first vertical list on the visual display of the user device, the first plurality of message tiles being associated with a first portion of the graphical display;
detect a gesture from a user of the user device while displaying the first plurality of message tiles in the vertical list on the visual display of the user device, wherein the gesture is associated with a sender of electronic messages; and
in response to detecting the gesture, change the display of the first plurality of message tiles in the first vertical list to display a second plurality of message tiles associated with a second portion of the graphical display,
wherein the second portion of the graphical display is a second vertical list of a plurality of message tiles associated with the sender of electronic messages.

15. The non-transitory computer-readable storage medium of claim 14, wherein the gesture includes a touch input on a surface of the visual display.

16. The non-transitory computer-readable storage medium of claim 14, wherein the gesture is one of a plurality of gestures, wherein each of the plurality of gestures is associated with one of a plurality of predetermined senders of electronic messages.

17. The non-transitory computer-readable storage medium of claim 14, wherein the gesture is associated with a predetermined group of senders of electronic messages.

18. The non-transitory computer-readable storage medium of claim 14, wherein the gesture is a first gesture, the non-transitory computer-readable storage medium including further instructions which, when executed by the one or more processors of the system, cause the system to:
   detect a second gesture from the user of the user device; and
   change the display of the second plurality of message tiles in the vertical list to display to display a third portion of the graphical display.

19. The non-transitory computer-readable storage medium of claim 18, wherein the third portion of the graphical display is a list of attachments from the sender of electronic messages.

20. The non-transitory computer-readable storage medium of claim 19 including further instructions which, when executed by the one or more processors of the system, cause the system to:
   detect a third gesture from the user of the user device; and
   change the display of the third portion of the graphical display to display a preview of the attachments from the sender of electronic messages.

* * * * *